United States Patent [19]

Hara

[11] Patent Number: 5,740,415
[45] Date of Patent: Apr. 14, 1998

[54] INSTRUCTION SUPPLYING APPARATUS WITH A BRANCH TARGET BUFFER HAVING THE CONTENTS SO UPDATED AS TO ENHANCE BRANCH PREDICTION ACCURACY

[75] Inventor: Tetsuya Hara, Hyogo, Japan

[73] Assignee: Mitsubishi Denki Kabushiki Kaisha, Tokyo, Japan

[21] Appl. No.: 538,494

[22] Filed: Oct. 3, 1995

[30] Foreign Application Priority Data

Oct. 12, 1994 [JP] Japan ................... 6-246346

[51] Int. Cl.⁶ .................. G06F 9/00; G06F 9/32
[52] U.S. Cl. ............ 395/585; 395/581; 395/580
[58] Field of Search ................... 395/585, 581, 395/580

[56] References Cited

U.S. PATENT DOCUMENTS

| | | | |
|---|---|---|---|
| 5,530,825 | 6/1996 | Black et al. | 395/421.03 |
| 5,584,001 | 12/1996 | Hoyt et al. | 395/585 |
| 5,628,021 | 5/1997 | Iadonato et al. | 395/800 |

OTHER PUBLICATIONS

"Branch Prediction Strategies and Branch Target...", J.K. F. Lee et al., IEEE, Computer vol. 15, No. 1, Jan. 1984, pp. 6–22, cited on page four of the specification.

"Computer Architecture: Quantative Approach", D. A. Patterson, Morgan-Kaufman Publishers, published 1990, pp. 307–314.

*Primary Examiner*—Krisna Lim
*Attorney, Agent, or Firm*—Lowe, Price, LeBlanc & Becker

[57] ABSTRACT

A branch execution unit processes operand data which is supplied from an instruction decoder with branch instruction information which is read from a branch target buffer, carries out branch prediction and execution, and forms a branch probability flag which is generated in relation to a branch instruction for supplying to a branch target buffer registration/update decision mechanism. In registration of a branch instruction which is non-registered in the BTB registration/update decision mechanism, the registration or non-registration is carried out in accordance with the value of the branch probability flag. Thus, it is possible to prevent a branch instruction having a low branch probability from being registered in the branch target buffer, thereby preventing reduction of branch prediction accuracy. The branch prediction is executed with employment of only a validity bit. Thus provided is an instruction processing apparatus including a branch target buffer which can be readily constructed with high branch prediction accuracy and causes no cycle penalty upon registration of a branch instruction or updating of the content thereof.

27 Claims, 33 Drawing Sheets

(*) always-t = 1 : BRANCHING PROBABLE

= 0 : BRANCHING LESS PROBABLE

F I G. 3

| PREDICTION | RESULT | PREDICTION HIT/MISS | always-t | BTB-we | V | WRITE OPERATION |
|---|---|---|---|---|---|---|
| not-taken | Not-Taken | HIT | * | 0 | * | NO |
| | Taken | MISS | * | 1 | 1 | REGISTER |
| taken | Not-Taken | MISS | 0 | 1 | 0 | UPDATE |
| | | | 1 | 0 | * | NO |
| | Taken | HIT | * | 0 | * | NO |

\* : DON'T CARE (ARBITRARY)

V : VALIDITY BIT TO BE WRITTEN IN BRANCH TARGET BUFFER

FIG. 10
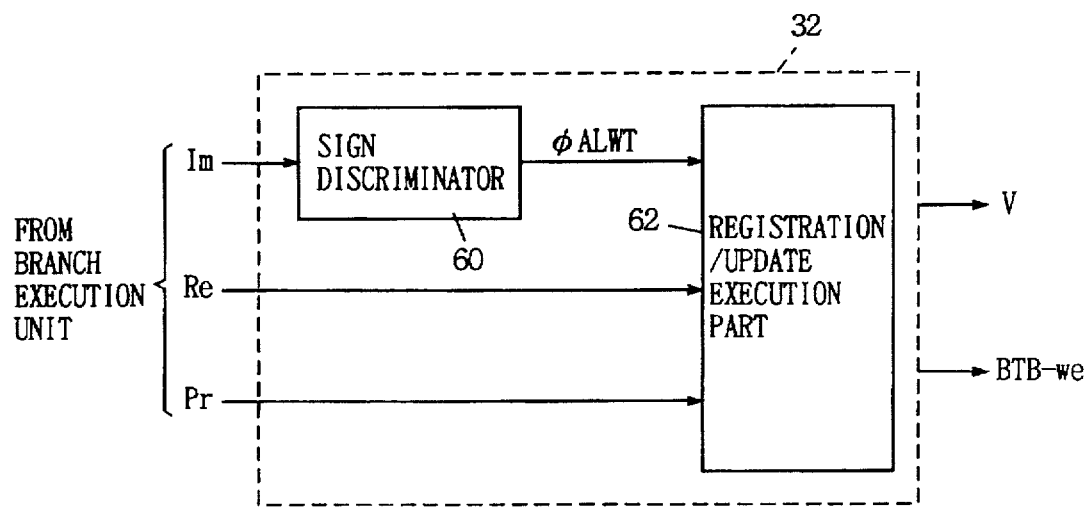
FIG. 11
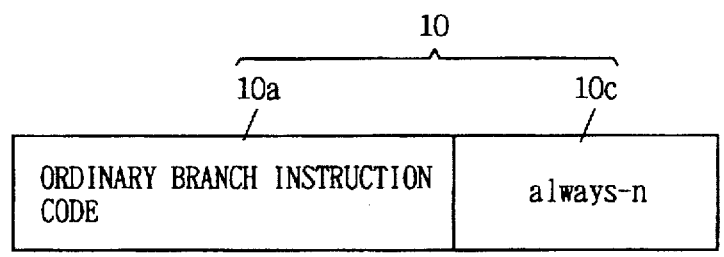
FIG. 12
| PREDICTION | RESULT | PREDICTION HIT/MISS | always-n | BTB-we | V | WRITE OPERATION |
|---|---|---|---|---|---|---|
| not-taken | Not-Taken | HIT | * | 0 | * | NO |
| | Taken | MISS | 1 | 0 | * | NO |
| | | | 0 | 1 | 1 | REGIST |
| taken | Not-Taken | MISS | * | 1 | 0 | UPDATE |
| | Taken | HIT | 1 | 1 | 0 | UPDATE |
| | | | 0 | 0 | * | NO |

BEXP: (1, 1) > (1, 0) > (0, 1) > (0, 0)

FIG. 23

| PREDICTION | RESULT | BRANCH EXPECTED VALUE | REGISTERED INITIAL STATE |
|---|---|---|---|
| not-taken | Not-Taken | * | — |
| | Taken | always-t=1 | STATE A |
| | | always-t=0 | STATE B |
| taken | * | * | — |

* :DON'T CARE, — :NON-REGISTERED

FIG. 27

| PREDICTION | RESULT | BHCV | BTB-we | | V | | BHC-we | | BHC OPERATION OPR | NEXT PREDICTION |
|---|---|---|---|---|---|---|---|---|---|---|
| | | | CYCLE n | CYCLE (n+1) | CYCLE n | CYCLE (n+1) | CYCLE n | CYCLE (n+1) | | |
| not-taken | Not-Taken | * | 0 | 0 | * | * | 0 | | * | not-taken |
| | Taken | * | 1 | 0 | 1 | * | 1 | | SET "0" | taken |
| taken | Not-Taken | 0 | 0 | 1 | * | 0 | 0 | 1 | "0" | not-taken |
| | | AT LEAST 1 | 0 | 0 | * | * | 0 | 1 | DECREMENT | taken |
| | Taken | * | 0 | 0 | * | * | 1 | * | INCREMENT | taken | always-t :

locally-t :

likely-n :

always-n :

FIG. 40  PRIOR ART

| INSTRUCTION | I | II | III | IV | V |
|---|---|---|---|---|---|
| A | IF | ID | EX | WB | |
| B | | IF | ID | EX | WB |
| C | | | IF | ID | EX | WB |
| D | | | | IF | ID | EX |

FIG. 41  PRIOR ART

| INSTRUCTION | I | II | III | IV | V |
|---|---|---|---|---|---|
| A | IF | ID | EX | WB | |
| BR | | IF | ID | EX | WB |
| C' | | | | | IF | t : taken PREDICTION       T : Taken EXECUTION
n : not-taken PREDICTION   N : Not-Taken EXECUTION

FIG. 46 PRIOR ART

| INSTRUCTION | CYCLE (n-2) | CYCLE (n-1) | | CYCLE n | |
|---|---|---|---|---|---|
| A1 (BRANCH INSTRUCTION) | IC READING, BTB READING | ID | BEX | BTB WRITING | |
| A2 | | IC READING, BTB READING | | ID | ALU |
| A3 | | | | IC READING, BTB READING | |

IC: INSTRUCTION MEMORY    ID: INSTRUCTION DECODER
BEX: BRANCH EXECUTION UNIT    ALU: ARITHMETIC AND LOGIC UNIT
BTB: BRANCH TARGET BUFFER

INSTRUCTION SUPPLYING APPARATUS WITH A BRANCH TARGET BUFFER HAVING THE CONTENTS SO UPDATED AS TO ENHANCE BRANCH PREDICTION ACCURACY

BACKGROUND OF THE INVENTION

1. Field of the Invention

The present invention relates to an instruction processing apparatus, and more particularly, it relates to a mechanism for predicting a branch to be caused by a branch instruction in an instruction processing apparatus which executes instructions in a pipeline mode.

2. Description of the Background Art

FIG. 40 illustrates an exemplary processing sequence in executing instructions in a pipeline manner. Referring to FIG. 40, four pipeline stages include an instruction fetch stage IF for fetching an instruction from an instruction memory, an instruction decoding stage ID for decoding the fetched instruction, an execution stage EX for executing the decoded instruction in a processing unit, and a write back stage WB for writing the result of the processing in a register or the like. In this pipeline mode, instructions are executed in the following manner:

In a cycle I, an instruction A is fetched from the instruction memory (IF stage). Then, the instruction A is decoded (ID stage) and an instruction B is fetched from the instruction memory in parallel therewith (IF stage) in a cycle II.

In a cycle III, the decoded instruction A is executed (EX stage), while the instruction B is decoded in the decoding stage ID. At this time, still another instruction C is fetched from the instruction memory (IF stage).

In a cycle IV, the result of execution of the instruction A is written in a register or the like (WB stage), the instruction B is executed (EX stage), and the instruction C is decoded (ID stage). At this time, a further instruction D is fetched from the instruction memory (IF stage).

As hereinabove described, all pipeline stages IF to WB execute processing after the cycle IV, so that one instruction is equivalently executed in one machine cycle (cycle period of each of the cycles I, II, . . . ). Therefore, the instructions can be executed at a high speed in the pipeline manner.

Consider that the instruction sequence includes a branch instruction BR, as shown in FIG. 41. Referring to FIG. 41, the instruction A is introduced into the pipeline stage IF at the cycle I, and successively introduced into the stages ID, EX and WB, to be subjected to processing. However, when the branch instruction BR is introduced into the decoding stage ID in the cycle III, and it is decoded therein, so that a determination is made as to whether or not the instruction is a branch instruction and then an identification is made as to whether or not a branch is taken by this branch instruction. Referring to FIG. 41, the branch instruction BR is a conditional branch instruction, for example, which is executed in the execution stage EX in the execution cycle IV so that presence/absence of branching is decided and a subsequent instruction C' is introduced into the instruction fetch stage IF in accordance with the result of execution of the branch instruction BR.

In the case of the branch instruction BR, stages executing no processing (vacant stages) are caused in the pipeline stages as shown in FIG. 41, to reduce instruction processing efficiency. In order to solve this problem, various instruction processing systems are proposed for efficiently processing instructions upon occurrence of such a branch instruction.

These systems include a "branch prediction system" of predicting presence/absence of a branch caused by a branch instruction and introducing a subsequent instruction into a pipeline stage in accordance with the prediction. According to this system, instructions including a branch instruction are continuously introduced into pipeline stages in accordance with the branch prediction, whereby reduction of processing efficiency is suppressed. In this case, disturbance of the pipeline is reduced as accuracy of the prediction is improved, whereby reduction in performance of the instruction processing apparatus can be suppressed. One of such branch prediction systems is a system employing a branch target buffer (BTB), which is proposed in "Branch Prediction Strategies and Branch Target Buffer Design" by J. K. F. Lee et al., IEEE, Computer Vol. 15, No. 1, January 1984, pp. 6–22, for example.

FIG. 42 illustrates an exemplary structure of a branch target buffer 1. Referring to FIG. 42, the branch target buffer 1 includes a register file 2 including a plurality of entries 1a. Each entry 1a includes a validity bit field 3a storing a validity bit V indicating whether or not information stored in this entry 1a is valid or available, a branch target specifying field 3b storing branch instruction information specifying a branch instruction stored in this entry 1a, a hysteresis information field 3c storing information as to the hysteresis of presence/absence of past branchings of the branch instruction, and a branch target information field 3d storing branch target information such as a branch target address storing a branch target instruction which is executed following this branch instruction. In this register file 2, each entry 1a is selected in accordance with prescribed bits of an address signal which is outputted from a program counter 5 supplying addresses of instructions in an instruction memory 4. The address signal (part of an instruction fetch address) from the program counter 5 is supplied to an address decoder 6 included in the branch target buffer 1 and decoded therein, so that the content of the corresponding entry 1a is read out. In place of the address decoder 6, the branch target buffer 1 may employ an associative storage element (content addressable memory) such as a TLB (address conversion buffer: translation look-aside buffer). In order to simplify the illustration, the following description is made on a structure of reading the content of a corresponding entry 1a from the register file 2 with decoding by the address decoder 6. However, this will not eliminate application to a structure such as a TLB from the range of application of the present invention.

An instruction which is read from the instruction memory 4 is supplied to an instruction decoder 7 and decoded therein. An instruction executing sequence employing this branch target buffer 1 is now described with reference to a flow chart shown in FIG. 43.

First, the program counter 5 supplies an instruction fetch address to the instruction memory 4 while supplying a prescribed number of bits of the instruction fetch address to the branch target buffer 1. The instruction is read out from the instruction memory 4 and supplied to the instruction decoder 7. In the branch target buffer 1, on the other hand, the corresponding entry 1a is selected in accordance with an address signal which is supplied from the program counter 5, so that the content of this entry 1a is read out. In accordance with the value of the validity bit V in the field 3a which is included in the read out entry 1a, a determination is made as to whether or not the content of the entry 1a is valid. When the content of this entry 1a is valid, an identification is made as to whether or not the fetched instruction is a branch instruction in accordance with the branch instruction information (e.g., instruction number) of the field 3b. When the branch instruction information is an instruction number, for example, this branch instruction is identified by a determination as to whether or not the number of the fetched instruction matches with the instruction number indicated by the branch instruction information. Alternatively, match/mismatch of the branch instruction information and remaining address signals (those other than the address employed for selecting the entry 1a) outputted from the program counter 5 may be observed to identify whether or not the instruction is a branch instruction. Due to the series of operations, an identification is made as to whether or not the instruction fetched from the instruction memory 4 is a branch instruction which is registered in the branch target buffer 1 (step S2).

When no registered branch instruction is present, the instruction decoder 7 identifies whether or not the fetched instruction is a branch instruction (step S3). If the fetched instruction is not a branch instruction, the decoded instruction is issued to an execution stage EX in order to execute an ordinary instruction (step S4). If a determination is made that the fetched instruction is a branch instruction at the step S3, on the other hand, the information on the branch instruction is stored in the branch target buffer 1, so that the corresponding validity bit V is set in a valid state and the fetched non-registered branch instruction is registered (step S5).

If a determination is made that a registered branch instruction is present at the step S2, on the other hand, branch prediction is made in accordance with the hysteresis information of the field 3c which is included in the read out entry 1a (this branch prediction algorithm is described later in detail), so that the branch target information, i.e., the branch target address which is included in the field 3d is transmitted to the program counter 5 in accordance with the result of the prediction (when branching is predicted) (step S6).

Further, this branch instruction is executed in a branch execution unit which is included in the instruction decoding stage ID, so that presence/absence of branching is decided. A determination is made as to whether or not the decided branch condition matches with the predicted branch condition (step S7). If the decided branch condition matches with the prediction, the instructions are executed in continuation. Further, hysteresis information of the branch target buffer is updated at need (when the hysteresis information includes a plurality of bits) (step S8).

If a determination is made that the decided branch condition mismatches with the prediction at the step S7, i.e., when the prediction is erroneous, on the other hand, the fetched branch target instruction is invalidated and instruction fetching is carried out in accordance with a correct address, while the corresponding entry 1a of the branch target buffer 1 is updated (this branch target buffer updating operation is also described later) (step S9).

The branch prediction algorithm is now described specifically. This branch prediction algorithm depends on whether the hysteresis information is multibit information or one-bit information. The branch target algorithm for multibit hysteresis information and that for one-bit hysteresis information are now described in order.

First, terms employed in the following description are defined.

(1) Taken execution: Branching holds (a branch is taken) as the result of execution of a branch instruction.

(2) Not-Taken execution: No branching holds (no branch is caused or taken) as the result of execution of a branch instruction.

(3) taken prediction: Holding of branching is predicted in branch prediction.

(4) not-taken prediction: Holding of no branching is predicted in branch prediction.

In the branch prediction system employing multibit hysteresis information, branch prediction and updating of the branch target buffer are carried out in the following procedure:

Prediction: The content of a target entry is read from the branch target buffer, so that branch prediction is made in accordance with the multibit hysteresis information included in the entry when a branch instruction is registered therein.

Registration: When a branch instruction subjected to Taken execution is not registered in the branch target buffer, this branch instruction is registered therein.

Updating: The result of execution is reflected in the hysteresis information of the branch instruction upon completion of execution of each branch instruction.

FIG. 44 is a state transition diagram showing a branch prediction algorithm which is based on 2-bit hysteresis information. Referring to FIG. 44, four stages A to D are expressed by the 2-bit hysteresis information. When the hysteresis information indicates the state A or B, taken prediction (t) is made as branch prediction. When the hysteresis information indicates the state C or D, on the other hand, not-taken prediction (n) is made. When a branch instruction is executed, the hysteresis information is updated so that state transition is caused along arrows in FIG. 44 in accordance with the execution state. When the hysteresis information indicates the state B and taken prediction is made, for example, the state B is updated to the state A upon occurrence of Taken execution, while the state B is updated to the state C upon occurrence of Not-Taken execution. The branch prediction employing multibit hysteresis information has the following advantages:

Consider a loop processing structure shown in FIG. 45. This loop processing structure repetitively executes a processing function (or statement) P1 over a plurality of times. A conditional expression P2 is adapted to determine whether or not the result of execution of the processing function (or statement) P1 satisfies a prescribed condition, so that the process returns to the processing function (or statement) P1 again or escapes from this loop in accordance with the result of the determination. FIG. 45 shows results YES and NO determined in accordance with the conditional expression P2 respectively. Consider that the conditional expression P2 includes a branch instruction, so that the loop is circulated (the processing function or statement P1 is repetitively executed) or the process escapes from the loop in accordance with the branch instruction.

When no branch instruction is registered, i.e., when the loop processing is carried out first, branch prediction is the not-taken prediction. In the loop structure, the processing function (or statement) P1 is repetitively and continuously executed a plurality of times, whereby a backward branch is caused by the conditional expression P2, and the result of execution of this branch instruction is Taken execution. The non-registered branch instruction is registered in the branch target buffer after the first execution, while the hysteresis information is set in an initial state indicating the state A or B at this time. This initial state is predeterminedly set in a fixed manner.

When the processing (or statement) P1 is executed and then the branch instruction of the conditional expression P2 is executed, branch prediction is taken prediction, the result of branch execution is Taken execution, and the branch prediction hits. The branch prediction of this branch instruction thereafter hits so far as this loop is repetitively executed. At this time, the hysteresis information of the branch instruction is set in the state A. When the process finally escapes from the loop, the branch prediction is taken prediction, the branch execution result is Not-Taken execution, and the branch prediction mishits. In this case, the state A of the branch instruction is updated to the state B. When the processing of this loop structure is executed first, prediction misses are caused twice when the process enters and escapes from the loop respectively. Once the branch instruction is registered in the branch target buffer, however, a prediction miss is caused merely in escape from the loop in the subsequent loop structure processing, and branch prediction can be made in high accuracy.

When one-bit hysteresis information is employed, on the other hand, branch prediction and updating of the branch target buffer are carried out in the following procedure: In this case, the hysteresis information of the branch information is expressed by the validity bit V (see FIG. 42).

Branch Prediction: The content of the corresponding entry is read from the branch target buffer. When the validity bit of the read out entry is valid, i.e., when the instruction fetched from the instruction memory is a branch instruction and already registered in the branch target buffer, taken prediction is made. If the instruction is non-registered, on the other hand, not-taken prediction is made.

Registration: When the result of execution of the branch instruction is Taken execution and this branch instruction is not registered in the branch target buffer, the same is registered therein (validation of the validity bit V).

Updating of Hysteresis Information: When the result of execution of the branch instruction is Not-Taken execution and this branch instruction is registered in the branch target buffer, this branch instruction is deleted from the corresponding entry of the branch target buffer (invalidation of the validity bit V).

As hereinabove described, writing to the branch target buffer is executed only when the branch prediction is missed, i.e., (i) in case of not-taken prediction and Taken execution (registration of the branch instruction), or (ii) in case of taken prediction and Not-Taken execution (invalidation of the registered branch instruction) in the one-bit hysteresis system. Therefore, the number of times of writing into the branch target buffer is small and only either reading or writing from or into the branch target buffer is carried out in a certain instruction processing cycle, whereby it is not necessary to carry out both of writing and reading in one cycle and the branch target buffer can be readily constructed in a simple structure.

FIG. 46 illustrates an access sequence to the branch target buffer (BTB) in case of carrying out branch prediction based on multibit hysteresis information. In a cycle (n–2), an instruction memory (IC) is accessed as to an instruction A1, so that the instruction A1 is read out. At this time, the content of the corresponding entry is read out from the branch target buffer (BTB) in a parallel manner, so that a determination is made as to whether or not the branch instruction information included in the corresponding entry specifies the instruction A1. If the instruction A1 is a branch instruction, an instruction decoding stage ID carries out decoding in a cycle (n–1), so that the branch instruction is executed in a branch execution unit (BEX).

In this cycle (n–1), a next instruction A2 is fetched and the content of the corresponding entry is read out from the branch target buffer (BTB) for determining whether the instruction A2 is a branch instruction or not. When the instruction A2 is not registered in the branch target buffer, not-taken prediction is regularly made as branch prediction.

In a cycle n, the content of the branch target buffer (BTB) is reloaded if the instruction A1 is a branch instruction. Namely, the hysteresis information is updated when the instruction A1 is already registered in the branch target buffer (BTB). Also when the hysteresis information is set in the state A shown in FIG. 44, the hysteresis information update processing is executed in the branch target buffer. When the instruction A1 is not registered in the branch target buffer and subjected to Taken execution, on the other hand, the corresponding entry is reloaded in accordance with the instruction A1.

In this cycle n, access to the instruction memory (IC) is made for an instruction A3 (instruction fetch), while the content of the corresponding entry is read from the branch target buffer (BTB). Reading of the branch target buffer (BTB) is carried out every cycle, and hence resource contention of the branch target buffer takes place in the cycle n. In order to cope with such contention, the following countermeasures are conceivable:

(1) In the cycle n, the instruction fetch operation for reading the instruction from the instruction memory is stopped and only writing in the branch target buffer is carried out. In a next cycle (n+1), instruction fetch from the instruction memory and reading of a corresponding entry from the branch target buffer are carried out. In this countermeasure, the instruction fetch operation (instruction reading from the instruction memory) is stopped every writing to the branch target buffer, and one-cycle penalty is caused in the pipeline.

(2) In the cycle n, only writing is carried out on the branch target buffer and the instruction fetch operation is carried out, while no entry is read from the branch target buffer. In this case, an instruction which is read from the instruction memory is defined as not being registered in the branch target buffer, and not-taken prediction must be made. This is because the instruction fetched in this cycle may not be a branch instruction. If the instruction fetched from the instruction memory is a branch instruction which is registered in the branch target buffer, therefore, effective prediction is hindered and the prediction accuracy is reduced.

(3) The branch target buffer is structured to be capable of reading and writing in one cycle. In this countermeasure (3), both of reading and writing of the branch target buffer are carried out dissimilarly to the countermeasures (1) and (2), and hence instruction fetch, branch target buffer reading and branch target writing can be carried out with neither stall in the pipeline nor reduction of processing performance. When the operation is made with a high-speed clock, however, the structure of the branch target buffer is complicated for carrying out both of writing and reading in such a high-speed cycle.

While every countermeasure has an advantage, it is necessary to carry out writing in the branch target buffer every execution of the branch instruction for updating the hysteresis information/registering the branch instruction in the branch prediction system employing the multibit hysteresis information, regardless of hit/miss of branch prediction. When the countermeasure (1) or (2) is employed, however, cycle penalty or prediction interference results every execution of the branch instruction to extremely reduce the performance, and hence these countermeasures cannot be utilized. Therefore, it is inevitably necessary to employ a branch target buffer which can carry out writing and reading in one cycle. In order to implement such a branch target buffer, conceivable are two systems of:

a) providing a data write port and a data read port independently of each other in a two-port structure; and (b) applying a high-speed buffer which is accessible in a cycle half that for fetching an instruction from an instruction memory to the branch target buffer. In the case of the system (a), it is necessary to provide a data write path and a data read path independently of each other due to the two-port structure and entry selection systems for data writing and for data reading must also be provided independently of each other, leading to increase in hardware amount. The branch target buffer requires a certain number of entries (it is assumed that at least 256 entries are preferable) in order to increase the hit rate of branch prediction. Therefore, the hardware amount is large even in case of a one-port structure, and it is unpreferable to further increase the hardware amount since the device scale is increased.

On the other hand, the system (b) has such a problem that it is difficult to implement a buffer having a large memory capacity (256 entries) which is accessible at a high speed with a small occupied area. When the memory capacity (entry number) is increased, lengths of internal signal interconnection lines are also increased, leading to increase in signal propagation delay. Thus, it is difficult to implement a buffer which is accessible at a high speed.

While the system of carrying out branch prediction on the basis of multibit hysteresis information requires a high-speed buffer which can carry out writing/reading in one cycle as described above, it is difficult to implement such a high-speed buffer as described above. Implementation of the high-speed buffer is further difficult when the clock speed is increased and the cycle time is shortened.

When a non-registered branch instruction is registered in the branch target buffer, the initial value of its hysteresis information is set at a predetermined value. The predetermined initial value is fixedly set regardless of whether the probability of branching of the corresponding branch instruction is high or low. When the initial state is set in the state A shown in FIG. 44, for example, and a branch instruction having a low branch probability which is accidentally subjected to Taken execution is registered, no not-taken prediction takes place unless the branch instruction is subjected to Not-Taken execution continuously twice, and thus the branch prediction mishits at these times, to reduce the branch prediction hit rate.

Further, the branch prediction system based on one-bit hysteresis information has the following disadvantage:

Consider processing of the loop structure shown in FIG. 45. When a backward branch probability is high, a mishit of branch prediction is caused due to taken prediction/Not-Taken execution in case of escape from the loop. At this time, this branch instruction is deleted from the branch target buffer in the branch prediction system employing one-bit hysteresis information. When this loop is again executed, therefore, a mishit of not-taken prediction/Taken execution is regularly caused first. When a loop structure processing is carried out, therefore, branch prediction mishits are caused twice in total at entering the loop and at escaping from the loop, leading to low branch prediction accuracy.

Further, a conventional branch prediction system employing a branch target buffer has the following disadvantages, regardless of the bit number of the hysteresis information:

In view of high integration, the occupied area and the cost, the entry number of the branch target buffer is limited to 256, for example. Each entry of the branch target buffer is specified by a part of an output (instruction fetch address) of a program counter (see FIG. 42). Therefore, a plurality of branch instructions are allotted to a single entry of the branch target buffer, and resource contention is caused with respect to the entry of the branch target buffer. There is a high probability that a branch instruction which is registered in the branch target buffer is subjected to taken prediction (the registered branch instruction is regularly subjected to taken prediction in the case of one-bit hysteresis information), while a branch instruction which is non-registered in the branch target buffer is subjected to not-taken prediction, on the other hand. Therefore, a branch instruction having a high branch probability must be registered in the branch target buffer. However, a non-registered branch instruction which is subjected to Taken execution is unconditionally registered in the branch target buffer. When the non-registered branch instruction has a low branch probability and an entry for registering the same originally registers a branch instruction having a high branch probability, the branch instruction having a high branch probability is erased. Thus, branch prediction for the registered branch instruction is missed. When the branch instruction having a low branch probability is registered, next branch prediction is taken prediction, and there is a high possibility that the result of actual branch execution is Not-Taken execution and the prediction is missed. Thus, the branch prediction accuracy is disadvantageously deteriorated by such a non-registered branch instruction having a low branch probability.

SUMMARY OF THE INVENTION

An object of the present invention is to provide an instruction processing apparatus which causes no performance deterioration even at the presence of a branch instruction.

Another object of the present invention is to provide an instruction processing apparatus including a branch prediction mechanism having high branch prediction accuracy (hit rate).

Still another object of the present invention is to provide an instruction processing apparatus including a branch target buffer which can carry out writing/reading without reducing processing performance and prediction accuracy.

A further object of the present invention is to provide an instruction processing apparatus which can selectively register only a branch instruction having a high branch probability in a branch target buffer.

An instruction processing apparatus according to one aspect of the present invention includes a branch target buffer having a plurality of entries each at least storing branch instruction specifying information and 1-bit validity bit indicating validity/invalidity of the branch instruction, prediction circuitry for predicting presence/absence of a branch by the branch instruction in accordance with a validity bit included in information which is stored in a corresponding entry of the branch target buffer when a supplied instruction is a branch instruction, and branch determination circuitry for executing the branch instruction and determining whether or not the prediction made by the branch prediction circuitry is correct in accordance with the result of the execution. The branch instruction includes an instruction part indicating the processing to be executed, and a branch probability indicating part indicating whether or not a possibility of a branch caused by the branch instruction is high.

This instruction processing apparatus further includes change circuitry for changing the content of the corresponding entry of the branch target buffer in accordance with data of the branch probability indicating part. This change circuitry includes a section for invalidating the valid bit when the validity bit included in the corresponding entry indicates validness and the branch probability indicating part indicates that the possibility of branching is small.

The content of the corresponding entry of the branch target buffer is invalidated when the branch probability indicating part included in the branch instruction indicates that the branch probability is small, whereby there is a high possibility that only a branch instruction having a high branch probability is stored in the branch target buffer and the branch prediction accuracy is improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a list of branch instruction registration/update operations in the first embodiment of the present invention;

FIG. 10 schematically illustrates the structure of a BTB registration/update decision mechanism which is employed in the second embodiment of the present invention;

FIG. 11 schematically illustrates the configuration of a branch instruction which is employed in a third embodiment of the present invention;

FIG. 12 is a list of registration/update operations of a branch target buffer in the third embodiment of the present invention;

FIG. 23 is a list of operations in the sixth embodiment of the present invention;

FIG. 27 is a list of operations in the seventh embodiment of the present invention;

FIG. 40 illustrates pipeline processing in a conventional instruction processing apparatus;

FIG. 41 illustrates vacancy of the pipeline in relation to a branch instruction in the conventional instruction processing apparatus;

FIG. 46 illustrates disadvantages of the conventional instruction processing apparatus employing a branch target buffer.

DESCRIPTION OF THE PREFERRED EMBODIMENTS

[Embodiment 1]

Figure 1:
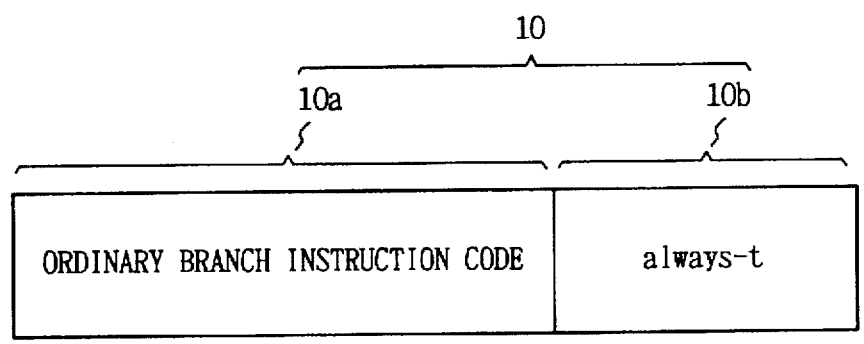
FIG. 1 schematically illustrates the configuration of a branch instruction code which is employed in the first embodiment of the present invention.

FIG. 1 illustrates the structure of an instruction code 10 which is employed in an instruction processing apparatus according to a first embodiment of the present invention. Referring to FIG. 1, the instruction code 10 includes an instruction code field 10a storing an ordinary instruction code which is similar to a conventional one, and a branch probability indicating field 10b storing a flag, always-t, indicating the possibility of branching (hereinafter referred to as a branch probability) when the instruction stored in the instruction code field 10a is a branch instruction. The instruction code field 10a stores an operation code (op code) indicating the processing content of the instruction (what is done according to the instruction), operand data employed in an operation in the processing, and the like. In the case of a branch instruction, the instruction code field 10a also stores an address for storing an instruction which is first processed after branching, i.e., a branch target address.

The flag always-t which is stored in the branch probability indicating field 10b is set by a compiler in compilation of a program, in accordance with the instruction. The flag always-t is set at "1" when the probability of a branch taken according to the branch instruction is high, while it is reset to "0" otherwise. The previously mentioned literature by J. K. F. Lee describes examples of branch instructions having high and low branch probabilities respectively. For example, a branch instruction of a backward branch which is employed for loop control has a high branch probability because branch is generally taken, and a branch instruction which is employed for a subroutine call also has a high branch probability due to its regular branching, while a branch instruction which is employed as "NOP (no-operation)" has a small branch probability due to no branching thereof.

According to the first embodiment, branch target prediction and registration/updating of a branch target buffer are carried out through the branch target buffer of a one-bit hysteresis system holding 1-bit hysteresis information.

Figure 2:
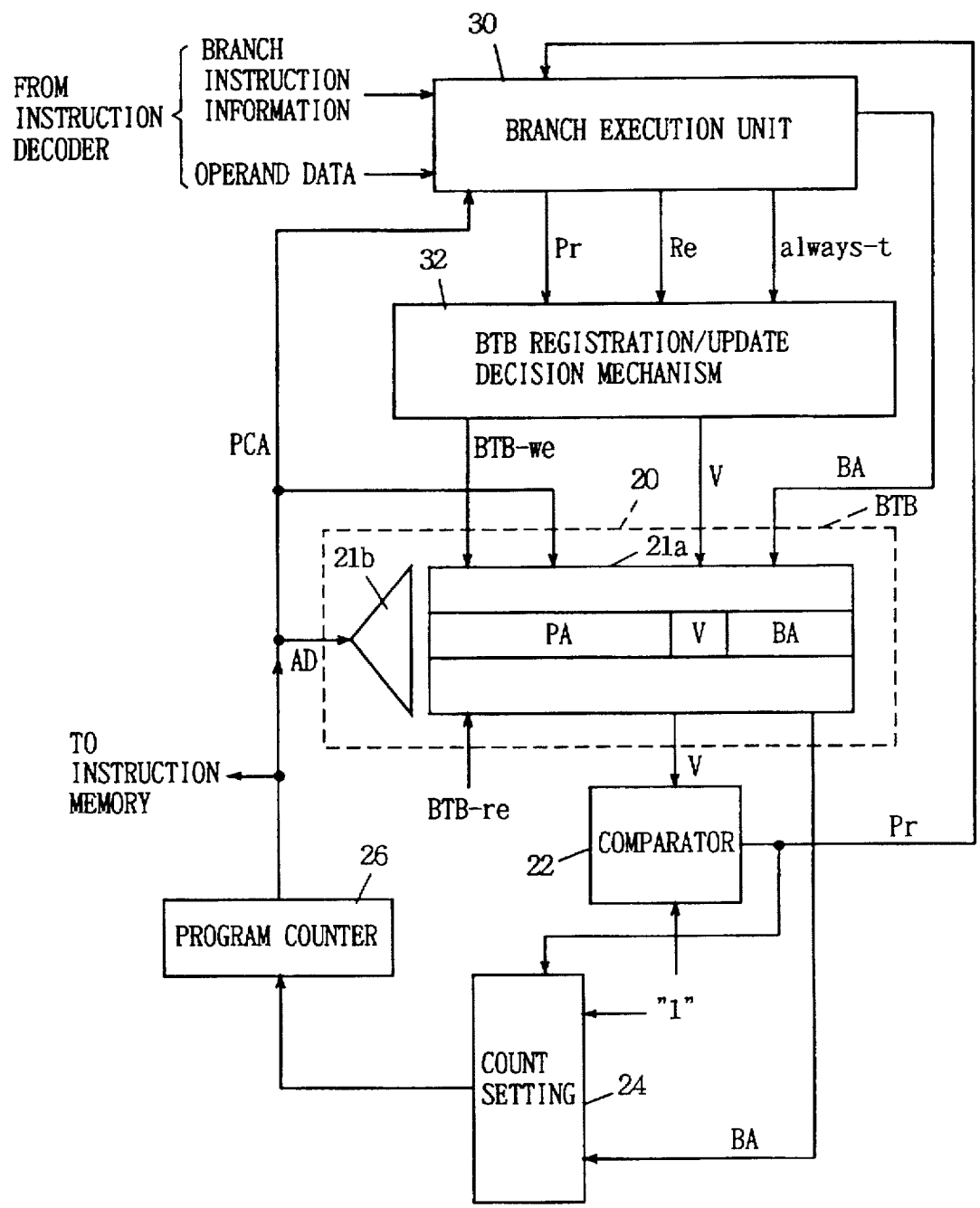
FIG. 2 schematically illustrates the overall structure of an instruction processing apparatus according to a first embodiment of the present invention.

FIG. 2 schematically illustrates the overall structure of an instruction processing apparatus according to the first embodiment of the present invention. Referring to FIG. 2, the instruction processing apparatus includes a branch target buffer 20 which stores information related to branch target instructions. This branch target buffer 20 includes a writable/readable buffer circuit 21a having a plurality of entries for storing the information, and a selector 21b for selecting a corresponding entry in accordance with a supplied address signal AD. Each of the entries included in the buffer circuit 21a stores branch instruction specifying information (instruction number etc.) PA, a branch target address BA indicating an address storing an instruction which is subsequently executed following the branch instruction, and a validity bit V indicating whether or not a branch instruction is registered in the entry. The validity bit V indicates that a branch instruction is registered in the entry when the same is "1", while indicating that no branch instruction is registered in the entry when the same is "0". The selector 21b may be a decoding circuit which decodes the address signal AD for selecting the corresponding entry, or may utilize a structure such as an associative storage structure carrying out a retrieval operation with the address signal AD as retrieval data and reading the content of a matching entry. In order to simplify the illustration, the selector 21b is hereinafter described as decoding the address signal AD for selecting the corresponding entry of the buffer circuit 21a.

The instruction processing apparatus further includes a comparator 22 for detecting match/mismatch of the validity bit V read from the branch target buffer 20 and a fixed value "1", and a count setting circuit 24 which selects one of the fixed value "1" and the branch target address BA read from the branch target buffer 20 in accordance with an output signal of the comparator 22 for setting a count incrementation value of a program counter 26 and a count value thereof in a next cycle, i.e., an instruction fetch address PCA. The count value which is outputted from the program counter 26, i.e., the instruction fetch address PCA, is supplied to an instruction memory (not shown), while a part thereof is supplied to the branch target buffer 20 as the address signal AD. As to the branch instruction specifying information PA, remaining bits of the count value from the program counter 26, i.e., the instruction fetch address PCA, excluding the address signal AD are employed, for example.

The instruction processing apparatus further includes a branch execution unit 30 which receives branch instruction information (operation (op.) code etc.) and operand data from an instruction decoder (not shown) and executes the branch instruction for forming a signal Re indicating the result of the execution, and a BTB registration/update decision mechanism 32 which decides entry updating and branch instruction registration in the branch target buffer 20 in accordance with an output signal of the branch execution unit 30 while controlling the registration/update operation.

The branch execution unit 30 is supplied with the branch probability flag always-t which is included in the branch instruction code, so that this branch probability flag always-t is supplied to the BTB registration/update decision mechanism 32. The branch execution unit 30 is indicated receiving a branch prediction signal Pr from the comparator 22 for supplying to the BTB registration/update decision mechanism 32. Alternatively, the branch prediction signal Pr may be directly supplied to the BTB registration/update decision mechanism 32 not through the branch execution unit 30. While the branch execution unit 30 is indicated receiving and latching the instruction fetch address PCA from the program counter 26, the instruction fetch address PCA from the program counter 26 may be included in the information indicated as branch instruction information in FIG. 2. In order to clarify the flow of the signal, the instruction fetch address PCA is illustrated being independent of the branch instruction information supplied from the instruction decoder. The branch execution unit 30 latches the instruction fetch address PCA which is supplied from the program counter 26 as described later, and supplies the latched instruction fetch address PCA to the branch target buffer 20 in a write operation on its entry. The operation is now briefly described.

In order for an instruction to be fetched from the instruction memory, the instruction fetch address PCA is outputted from the program counter 26, and supplied to the instruction memory (not clearly shown) and the branch target buffer 20. In parallel with the operation for fetching the instruction from the instruction memory, the corresponding entry is selected in the branch target buffer 20 in accordance with the address signal AD which is a part of the instruction fetch address PCA. A read indicating signal BTB-re is activated and the branch target buffer 20 is set in a read mode, so that the content of the selected entry is read out. The validity bit V included in the selected entry is supplied to the comparator 22, while the branch target address BA is supplied to the count setting circuit 24. The comparator 22 compares the supplied validity bit V with the fixed value "1", and generates the branch prediction signal Pr in accordance with the result of the comparison for supplying the same to the branch execution unit 30 and the count setting circuit 24. When the validity bit V indicates "1", the comparator 22 sets the signal Pr in a state indicating the taken prediction. When the branch prediction signal Pr from the comparator 22 indicates taken prediction, the count setting circuit 24 selects the branch target address BA which is read out from the branch target buffer 20 and sets the count value of the program counter 26 at a value corresponding to the branch target address A. The program counter 26 adds a current count thereof and the count received from the count setting circuit 24 to generate an instruction fetch address. When the branch prediction signal Pr indicates the not-taken prediction, on the other hand, the count setting circuit 24 selects the fixed value "1", and increments the count value of the program counter 26, i.e., a current instruction fetch address, by 1.

When the instruction supplied from the instruction decoder is a branch instruction, the branch execution unit 30 receives the operand data, the operation code and the branch probability flag always-t included in the branch instruction and executes the branch instruction. The branch execution unit 30 sets the signal Re in a state indicating either Taken execution or Not-Taken execution in accordance with whether or not a branch is taken in response to the result of execution of the branch instruction. At this time, the branch execution unit 30 supplies the instruction fetch address (output count value of the program counter 26) PCA which is supplied in relation to the branch instruction to the branch target buffer 20 as branch instruction specifying information. The branch execution unit 30 further supplies the branch target address BA which is included in the branch instruction to the branch target buffer 20.

The BTB registration/update decision mechanism 32 decides whether or not writing must be carried out in a corresponding entry of the branch target buffer 20 in accordance with the branch prediction signal Pr, the branch execution result indicating signal Re and the branch probability flag always-t supplied from the branch execution unit 30, and carries out a necessary operation in accordance with the result of the decision. The BTB registration/update decision mechanism 32, the operations and the structure of which are described later in detail, carries out the following operations:

Registration: When the branch prediction signal Pr indicates not-taken prediction and the branch execution result indicating signal Re indicates Taken execution, information related to the branch instruction is stored in the corresponding entry of the branch target buffer 20, so that the branch instruction is registered.

Updating: When the branch prediction signal Pr indicates taken prediction and the branch execution result indicating signal Re indicates Not-Taken execution, the following operation is carried out in response to the value of the branch probability flag always-t: (i) When the branch probability flag always-t is reset (the value is "0"), the branch instruction is invalidated in the branch target buffer 20 and registration thereof is deleted. (ii) When the branch probability flag always-t is set (the value is "1"), no writing in the branch target buffer 20 is carried out but the content of the corresponding entry is maintained.

Due to the aforementioned structure, the branch instruction is still registered in the branch target buffer 20 when the branch instruction registered in the branch target buffer 20 has a high branch probability, even if the branch instruction is subjected to Not-Taken execution. Thus, the branch target buffer 20 stores instructions having high branch probabilities, whereby branch prediction accuracy is improved.

FIG. 3 is a list of control operations which are carried out by the BTB registration/update decision mechanism 32 shown in FIG. 1. The operations of the BTB registration/update decision mechanism 32 shown in FIG. 1 are now described in detail with reference to FIG. 3.

(1) In case of not-taken prediction:

When the validity bit V which is included in the corresponding entry read from the branch target buffer 20 is "0", the branch instruction is regarded as not being registered and not-taken prediction is carried out, so that the signal Pr is set at a "0" state.

(a) When the branch execution result is not-taken prediction:

When no branch is caused by the branch instruction, the branch execution result indicating signal Re supplied from the branch execution unit 30 (see FIG. 1) is set in a state indicating Not-Taken execution. This state is not-taken prediction/Not-Taken execution, and the prediction hits. In this case, a branch target buffer write enable signal BTB-we is set at "0" regardless of the value of the probability flag always-t of the branch instruction since no branch is caused by a non-registered branch instruction, and no writing in the branch target buffer 20 is carried out.

(b) In case of Taken Execution:

When the branch execution result indicating signal Re indicates Taken execution, this is not-taken prediction/Taken execution, i.e., a prediction miss. In this case, a branch is caused by a non-registered branch instruction, and hence writing in the branch target buffer 20 is carried out regardless of the value of the branch probability flag always-t. Namely, the branch target buffer write enable signal BTB-we is set in a state indicating a data write mode of "1", and the validity flag V is set at "1", to be written in the corresponding entry with information related to the branch information, i.e., the branch target address BA, and the branch instruction specifying information (instruction number: prescribed bit of the instruction fetch address PCA from the program counter 26), so that the branch instruction is registered.

(II) In case of taken prediction:

When the validity bit V included in the entry which is read from the branch target buffer 20 is "1", the branch instruction is registered and the taken prediction is carried out.

(a) In case of Not-Taken execution:

When no branch is caused (branch is not taken) by the result of execution of the branch instruction, the branch execution result indicating signal Re is set in a state indicating Not-Taken execution. This is taken prediction/Not-Taken execution, i.e., a prediction miss. At this time, writing in the branch target buffer 20 is carried out or the content of the corresponding entry of the branch target buffer 20 is maintained in accordance with the value of the branch probability flag always-t.

(a1) When the branch probability flag always-t is "0":

This state indicates that the branch instruction has a small branch probability. In this case, the branch target buffer write enable signal BTB-we is changed to "1" and the validity bit V is converted to "0", and writing in the corresponding entry of the branch target buffer 20 is carried out. The validity bit V is set at "0" and its content is invalidated, so that the corresponding branch instruction is deleted from the registration.

(a2) When the branch probability flag always-t is "1":

In this case, the probability of a branch caused by the branch instruction is high and hence no updating of the corresponding entry of the corresponding branch target buffer 20 is carried out. The branch target buffer write enable signal BTB-we is set in a state of "0", and no write operation is carried out with respect to the branch target buffer 20.

(b) In case of Taken execution:

When a branch is caused by the branch instruction, the branch execution result indicating signal Re is set in a state indicating Taken execution. This state is taken prediction/ Taken execution, i.e., a prediction hit. A branch is caused by the registered branch instruction, the branch target buffer write enable signal BTB-we is set in a state of "0", no data write operation in the branch target buffer 20 is carried out, and the registration of the branch instruction is maintained. Once a branch instruction having a high branch probability is registered in the branch target buffer 20 by setting the branch probability flag always-t, the registration in the branch target buffer 20 is not invalidated even if a Not-Taken execution state takes place. Therefore, a branch instruction which is employed for loop processing or the like is not invalidated in the branch target buffer 20 but the registration is maintained even if a Not-Taken execution state takes place in loop escaping. When the loop is again executed, therefore, taken prediction can be made with respect to the branch instruction and branch prediction can be made in accuracy similar to that of a branch target buffer having multibit hysteresis information, while a branch prediction hit rate of a similar value can be expected. In addition, the hysteresis information as employed is of one bit, and a write operation to the branch target buffer 20 is required only when the branch prediction is missed, similarly to the one-bit hysteresis system. Therefore, the branch target buffer 20 is subjected to only either reading or writing in most cycles with no requirement for high-speed operability, whereby construction of the branch target buffer 20 is simplified.

Figure 4:
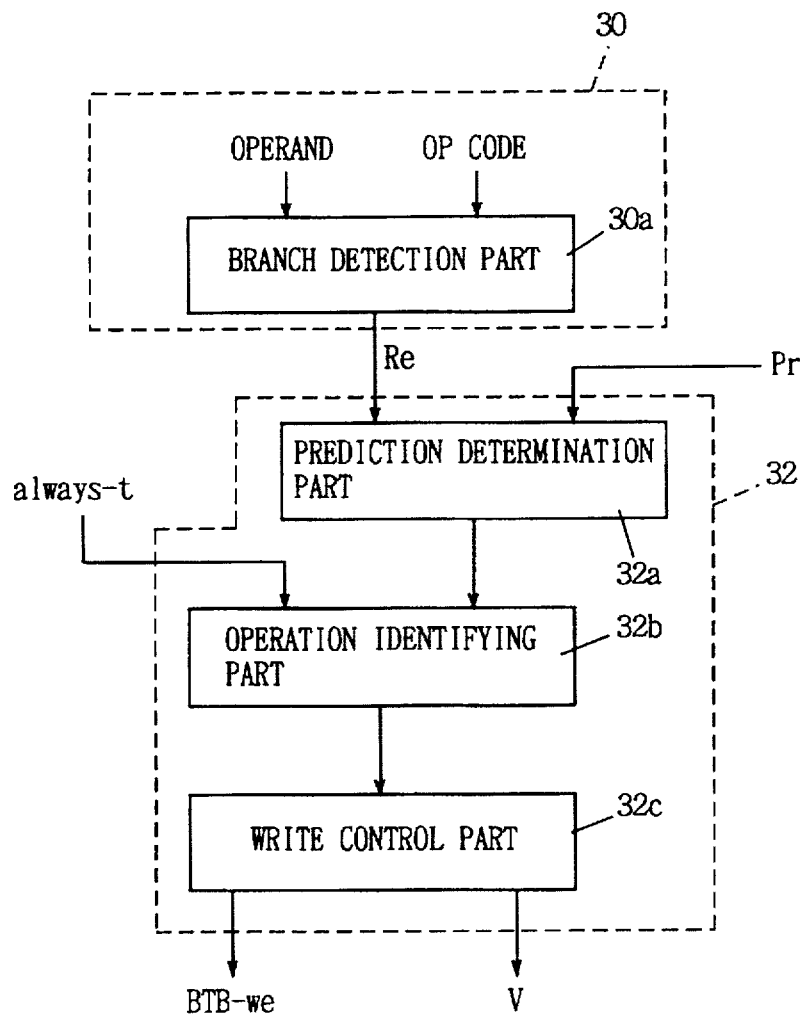
FIG. 4 illustrates specific structures of a branch execution unit and a BTB registration/update decision mechanism shown in FIG. 1.

FIG. 4 is a block diagram schematically illustrating the structure of the BTB registration/update decision mechanism 32 shown in FIG. 2. Referring to FIG. 4, the branch execution unit 30 is illustrated including a branch detection part 30a which detects presence/absence of branching through the operand data and the op code. This branch detection part 30a detects presence/absence of branching when the branch instruction is a conditional branching. When the branch instruction is an unconditional branching, on the other hand, the instruction decoder may generate a signal indicating branching. When both are to be included, a structure of ORing a signal from the instruction decoder indicating a branch caused by the unconditional branch instruction and the branch execution result signal Re from the branch detection part 30a may be utilized.

The BTB registration/update decision mechanism 32 includes a prediction determination part 32a for determining prediction hit/miss in accordance with the branch execution result indicating signal Re from the branch execution unit 30 and the branch prediction signal Pr and identifying which one of the four prediction hit/miss states shown in FIG. 3 is determined, an operation identifying part 32b for deciding an operation to be subsequently carried out in accordance with an output signal of the prediction determination part 32a and the branch probability flag always-t, and a write control part 32c which controls a data write operation to the branch target buffer 20 in accordance with an output signal of the operation identifying part 32b. The write control part 32c outputs the branch target buffer write enable signal BTB-we and the validity bit V.

Referring to FIG. 4, the branch prediction signal Pr and the branch probability flag always-t are indicated being supplied from the exterior of the branch execution unit 30. This is because the branch prediction signal Pr is directly supplied from the comparator 22 shown in FIG. 2 while the branch probability flag always-t is extracted by the instruction decoder and directly supplied to the BTB registration/ update decision mechanism 32. Alternatively, both of the branch prediction signal Pr and the branch probability flag always-t may be supplied from the branch execution unit 30, as shown in FIG. 2.

The prediction determination part 32a detects a prediction miss state in accordance with the signals Re and Pr, determines whether the prediction miss is taken prediction/Taken execution or taken prediction/Not-Taken execution, and supplies a signal indicating the result of the determination to the operation identifying part 32b. When the output signal from the prediction determination part 32a indicates not-taken prediction/Taken execution, the operation identifying part 32b supplies the write control part 32c with a signal indicating branch instruction registration regardless of the value of the branch probability flag always-t.

When the output signal of the prediction determination part 32a indicates taken prediction/Not-Taken execution, on the other hand, the operation identifying part 32b supplies the write control part 32c with a signal indicating an operation to be subsequently carried out in accordance with the value of the branch probability flag always-t. Namely, the operation identifying part 32b supplies the write control part 32c with a control signal for invalidating the content of the corresponding entry when the branch probability flag always-t is "0". On the other hand, the operation identifying part 32b supplies the write control part 32c with a write inhibition signal when the value of the branch probability flag always-t is "1". Therefore, the write control part 32c carries out a write operation in the branch target buffer 20 only in a registration operation in the case of not-taken prediction/Taken execution and in an update operation in the case of taken prediction/Not-Taken execution where always-t="0". The write control part 32c sets the validity bit V at "1" and "0" in the registering operation and in the update operation, respectively.

In accordance with the aforementioned method of registering the branch instruction in the branch target buffer 20, the registered state of the branch instruction whose branch probability flag always-t is set at "1" is basically maintained once the same is registered in the branch target buffer 20. In the following two cases, however, the branch instruction whose branch probability flag always-t registered in the branch target buffer 20 is set at "1" is invalidated. Thus, non-registration of a branch instruction to be registered is prevented.

Figure 5:
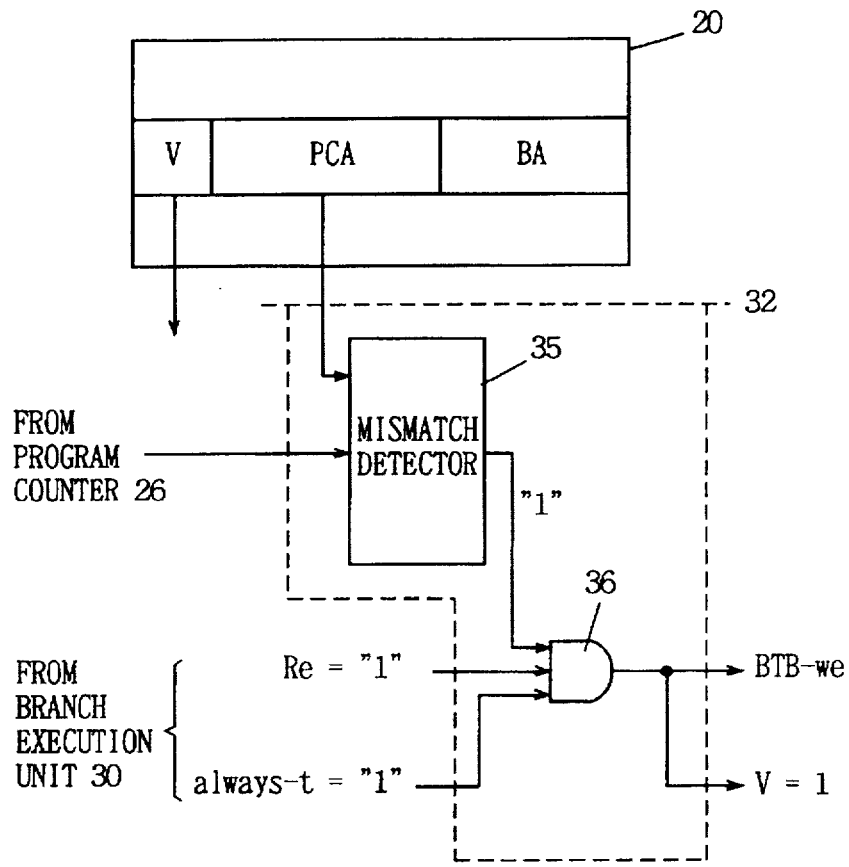
FIG. 5 illustrates another specific structure of the BTB registration/update decision mechanism shown in FIG. 1.

(1) FIG. 5 illustrates a structure for overwriting a branch instruction having a high branch probability. Referring to FIG. 5, the BTB registration/update decision mechanism 32 includes a mismatch detector 35 for detecting a mismatch of the branch instruction specifying information PCA included in the corresponding entry read from the branch target buffer 20 and the instruction fetch address PCA from the program counter 26, and a gate circuit 36 which receives the branch execution result indicating signal Re from the branch execution unit 30 and the branch probability flag always-t of a new branch instruction supplied from the branch execution unit 30 for carrying out registration in the branch target buffer 20.

The gate circuit 36 activates the branch target buffer write enable signal BTB-we and sets the validity flag V at "1" when an output signal from the mismatch detector 35 indicates a mismatch ("1"), the branch execution result indicating signal Re indicates branching ("1") and the branch probability flag always-t of the newly supplied branch instruction indicates a high probability ("1"). When a branch is caused or taken by a non-registered branch instruction having a high branch probability, therefore, the content of the corresponding entry of the branch target buffer 20 is reloaded by the new branch instruction.

In the structure shown in FIG. 5, the instruction fetch address PCA outputted from the program counter 26 itself is entirely employed as the branch instruction specifying information. Alternatively, an address part of the instruction fetch address PCA outputted from the program counter 26 excluding the address signal for addressing the branch target buffer 20 may be employed as the branch instruction specifying information.

(2) When the branch target buffer 20 shares an address tag with an instruction cache memory, i.e., when it has the same number of entries (number of sets), if a cache miss is caused in the instruction cache memory, and substitution of a cache block is carried out in the instruction cache memory, a branch instruction included in an instruction group to be substituted is set in the invalid state in the branch target buffer 20.

Figure 6:
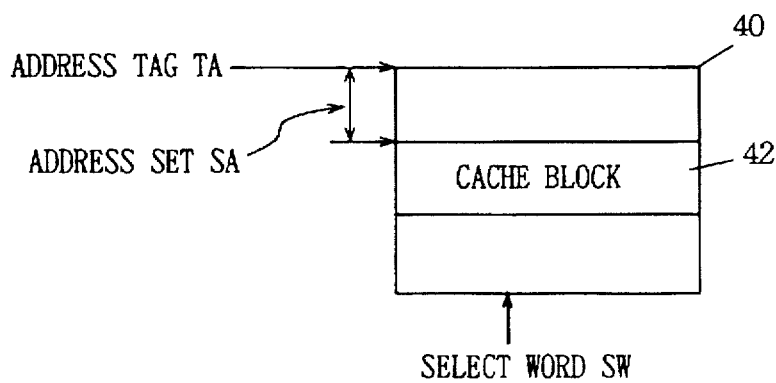
FIG. 6 illustrates an address tag which is employed in the first embodiment of the present invention.

Namely, the instruction cache memory stores necessary instructions/data having high frequencies of accessing required among those stored in a main memory, in order to attain high-speed access. In this case as shown in FIG. 6, a memory region is divided along a region 40 which is specified by an address tag TA in address regions of the main memory. The instruction cache memory stores a data lump, i.e., a cache block 42 specified by an address set SA with the address tag Ta serving as a head address. The corresponding instruction is read from the cache block 42 in accordance with a select word SW. This select word SW also includes a way address when the instruction cache memory stores instructions in a set associative system.

Figure 7:
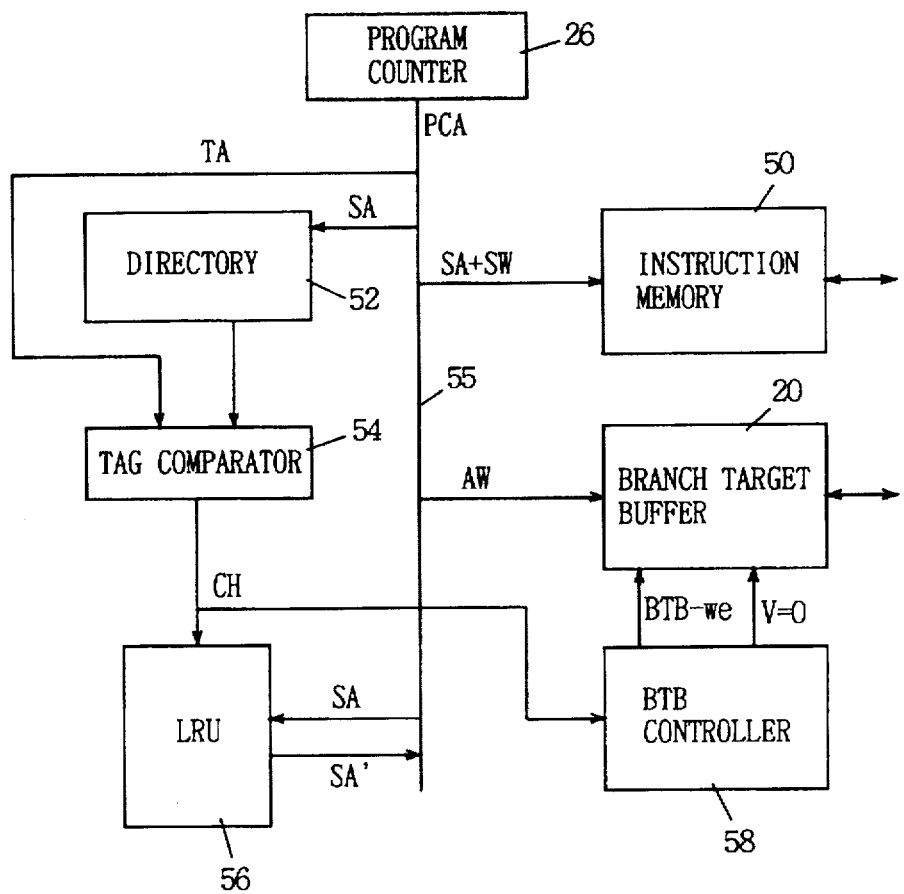
FIG. 7 schematically illustrates the overall structure of an instruction processing apparatus system according to the first embodiment of the present invention.

FIG. 7 illustrates a structure for invalidating the content of the branch target buffer 20 in response to a cache miss/hit in the instruction memory. The instruction fetch address PCA outputted from the program counter 26 includes the address tag TA, the address set SA and the select word SW. The address set SA is supplied to a directory 52, while the address set SA and the select word SW are supplied to an instruction memory 50. The instruction memory 50 reads out the corresponding instruction in accordance with the address set SA and the select word SW. In the directory 52, the address tag TA including the address set SA which is stored in the instruction memory 50 is stored in a region which is specified by the address set SA. Therefore, the address tag TA of a currently addressed cache block which is stored in the instruction memory 50 is read from the directory 52.

An output of the directory 52 and the address tag TA from the program counter 26 are supplied to a tag comparator 54, to be subjected to determination of match/mismatch. If the tag comparator 54 indicates a match, this is a cache hit indicating that the instruction memory 50 stores a necessary instruction, and the instruction read from the instruction memory 50 is supplied to the instruction decoder. If an output signal CH of the tag comparator 54 indicates a mismatch, on the other hand, this is a cache miss and the instruction memory 50 stores no necessary instruction, and hence a corresponding instruction group is read from the main memory and stored in the instruction memory 50.

At this time, an address signal SA' which is outputted from an LRU logic 56 decides which instruction group is substituted in the instruction memory 50. This LRU logic 56 stores the address of a cache block which has been accessed least recently, and outputs and supplies this address to the instruction memory 50 upon occurrence of a cache miss. In accordance with the address signal SA' from the LRU logic 56, the cache block in the instruction memory 50 is rewritten. The branch target buffer 20 is supplied with an address signal AW forming a part of the instruction fetch address PCA from the program counter 26, to read the content of the corresponding entry.

A BTB controller 58 activates the buffer write enable signal BTB-we and sets the validity flag V at "0" of an invalid state in accordance with a signal CH indicating the cache miss received from the tag comparator 54. The branch target buffer 20 successively invalidates the contents of the corresponding entries in accordance with the address signal SA' outputted from the LRU logic 56. When the numbers of entries and sets of the instruction memory 50 and the branch target buffer 20 are identical to each other, the branch instruction in the region indicated by the address set SA (SA') is invalidated. If the storage capacity of the branch target buffer 20 is smaller than that of the instruction memory 50 and the address signal AW includes the address set SA, the corresponding entry of the branch target buffer 20 is also invalidated in accordance with the address set SA.

The BTB controller 58 is included in the BTB registration/update decision mechanism 32 shown in FIG. 2. Thus, it is possible to prevent an unused branch instruction from being stored in the branch target buffer 20 thereby preventing erroneous branch prediction. When a branch instruction is newly supplied, further, it is possible to make writing in the corresponding entry of the branch target buffer 20 in accordance with the result of branch execution and the value of the branch probability flag, thereby preventing resource contention of the branch target buffer 20 for effectively storing branch instructions and preventing reduction of branch prediction accuracy.

According to the first embodiment of the present invention, as hereinabove described, branch prediction is carried out in accordance with the value of the validity bit, whereby a possibility of simultaneously carrying out reading and writing of the branch target buffer in one cycle is extremely small similarly to branch prediction in accordance with the one-bit hysteresis system while branch prediction interference and cycle penalty are remarkably reduced. Further, the branch instruction is registered in the branch target buffer 20 while the branch target buffer 20 is changed in accordance with the branch probability flag which is provided on the branch instruction, whereby it is possible to attain a branch prediction hit rate which is substantially identical to that of a multibit hysteresis system.

[Embodiment 2]

Figure 8:
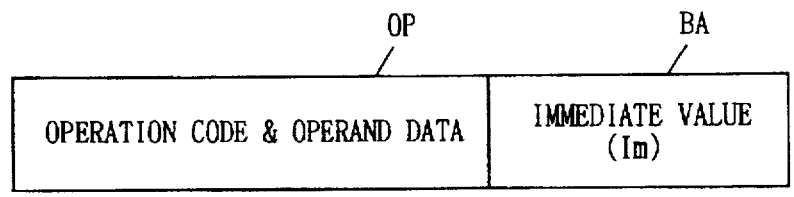
FIG. 8 schematically illustrates the configuration of a branch instruction which is employed in a second embodiment of the present invention.

FIG. 8 illustrates an exemplary structure of a branch instruction. Referring to FIG. 8, the branch instruction includes an operation code part OP including an instruction code and operand data to be processed, and a branch target address BA indicating the address of the instruction executed in the occurrence of branching. The branch target address BA is expressed in an immediate value (Im) indicating a relative address with reference to the address of the branch instruction.

Figure 9:
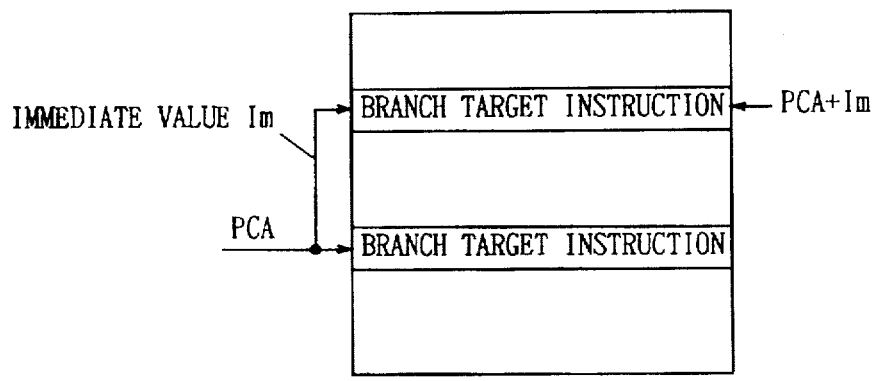
FIG. 9 illustrates an immediate value shown in FIG. 8.

As shown in FIG. 9, the address of a branch target instruction in an instruction memory is provided by the sum of an address PCA of the branch instruction and the immediate value Im included in this branch instruction. The branch target address BA which is selected by the count setting circuit 24 in branching as shown in FIG. 2 is added to the current count value of the program counter 26.

A branch instruction causing backward branch such as loop control has a branching probability of about 90% on the average, while a branching instruction carrying out a forward branch has a branch probability of about 50% on the average (refer to "Computer Architecture: Quantitative Approach" by D. A. Patterson, Morgan.Kaufmann Publishers, published 1990, pp. 307–314). Namely, it is expected that a branch probability flag always-t of a backward branch instruction is set at "1". On the other hand, most of forward branch instructions are conceivably not much biased in branch direction. Therefore, it is conceivable that most branch instructions whose branch probability flags always-t must be "1" are occupied by backward branch instructions. An immediate value Im which is included in an instruction code of a backward branch instruction is negative, and hence it is possible to substantially predict the branch probability by identifying the sign of the immediate value Im.

FIG. 10 illustrates the structure of a principal part of an instruction processing apparatus according to a second embodiment of the present invention. This figure shows the structure of a part corresponding to the BTB registration/update decision mechanism 32 shown in FIGS. 2 and 4. The remaining structure can be prepared from that shown in FIG. 2. Referring to FIG. 10, the BTB registration/update decision mechanism 32 includes a sign discriminator 60 for discriminating the sign of an immediate value Im which is included in a supplied branch instruction, and a registration/update execution part 62 which decides an operation to be carried out with respect to BTB in accordance with an output signal φALWT of the sign discriminator 60, a branch execution result indicating signal Re and a branch prediction signal Pr, and executes the decided operation.

The sign discriminator 60 outputs the signal φALWT indicating the positive/negative sign of the immediate value Im by the value of the most significant (sign) bit of the immediate value Im, for example. The output signal φALWT from the sign discriminator 60 is set at "1" when the immediate value Im is positive, and is set at "0" when the immediate value Im is negative. Namely, the signal φALWT can be handled as that identical to the branch probability flag always-t in the first embodiment. The registration/update execution part 62 utilizes this signal φALWT as the flag always-t, decides states of a validity bit V and a BTB write enable signal BTB-we in accordance with the logic shown in FIG. 3 for outputting. Therefore, the operation of the BTB registration/update execution part 62 is identical to that of the BTB registration/update decision mechanism 32 in the first embodiment.

According to the second embodiment, it is not necessary to change the structure of an instruction code field of a branch instruction, but a branch instruction having a high branch probability can be readily preferentially stored in a branch target buffer through an existent object code. The branch target buffer can be readily constructed similarly to the case of branch prediction according to the one-bit hysteresis system and a branch prediction hit rate which is similar to that of branch prediction according to the multibit hysteresis system can be attained since branch prediction is carried out in accordance with the validity bit V.

[Embodiment 3]

FIG. 11 schematically illustrates the structure of a branch instruction which is employed in a third embodiment of the present invention. Referring to FIG. 11, a branch instruction code 10 includes an instruction code field 10a storing an ordinary branch instruction code, and a branch probability indicating field 10c storing a branch probability flag always-n indicating the value of the branch probability of this branch instruction. This branch probability flag always-n is set at "1" when the probability of a branch caused (taken) by the related branch instruction is low, while it is set at otherwise. Instructions having low branch probabilities include a branch instruction which is employed as "NOP" as described above, a branch instruction which is employed for loading a register and the like, as described in the aforementioned literature by Lee et al. This branch probability flag always-n is set/reset by a compiler in compilation of the instruction codes.

A branch target buffer has the same structure as that shown in FIG. 1, so that branch prediction is made depending on whether a validity bit V stored therein is "1" or "0". Namely, taken prediction is made when the validity bit V stored in the corresponding entry is "1", while not-taken prediction is made when the validity bit V is "0". In other words, taken prediction is made for a registered branch instruction, while not-taken prediction is made for a non-registered branch instruction. This branch prediction is identical to that of the first embodiment. Write operations for the branch target buffer are now described.

FIG. 12 is a list of the write operations in the branch target buffer in the third embodiment of the present invention. The write operations for the branch target buffer according to the third embodiment are now described with reference to FIG. 12.

(1) In case of not-taken prediction:

(a) In case of Not-Taken execution:

This state is a prediction hit because the result of branch instruction execution is Not-Taken execution and this branch instruction is not registered in the branch target buffer, whereby a branch target buffer write enable signal BTB-we is maintained at "0".

(b) In case of Taken execution:

This is a prediction miss, and the branch probability flag always-n is referred to in this case, so that a write operation is carried out in accordance with its value.

(b1) When always-n is "1":

In this state, the branch instruction has a low branch probability and is not registered in the branch target buffer. In this case, therefore, the branch target buffer write enable signal BTB-we is maintained in a state of "0".

(b2) When always-n is "0":

In this case, a branch is caused by a non-registered branch instruction having a branch probability which is not low, whereby the branch target buffer write enable signal BTB-we is set at "1" and the validity bit V is also set at "1" to be stored in the corresponding entry of the branch target buffer with information related to the branch instruction, so that the branch instruction is registered.

(II) In case of taken prediction:

(a) In case of Not-Taken execution:

A branch instruction of Not-Taken execution is invalidated according to the one-bit hysteresis system, regardless of the value of its branch probability flag always-n. Namely, the branch target buffer write enable signal BTB-we is set at "1" and the validity bit V is set at "0" so that writing (registration) into the branch target buffer is carried out.

(b) In case of Taken execution:

The branch probability flag always-n is referred to so that an operation subsequently carried out is decided in accordance with its value.

(b1) When always-n is "1":

In this state, the branch instruction has a low branch probability and a possibility of branching (branch-taken) in next execution is extremely low, whereby this branch instruction is deleted from the branch target buffer. Namely, the branch target buffer write enable signal BTB-we is set at "1" and the validity bit V is set at "0", so that the content of the corresponding entry is invalidated.

(b2) When always-n is "0":

In this state, the branch target buffer enable signal BTB-we is maintained in a state of "0", so that no write operation in the branch target buffer is carried out and the content of the corresponding entry is maintained.

Figure 13:
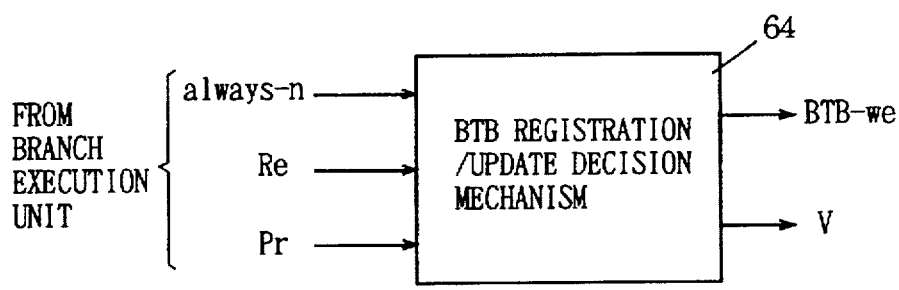
FIG. 13 schematically illustrates the structure of a BTB registration/update mechanism which is employed in the third embodiment of the present invention.

FIG. 13 illustrates a structure for executing the logic shown in FIG. 12. Referring to FIG. 13, a BTB registration/update decision mechanism 64 sets the branch target write enable signal BTB-we and the validity bit V in prescribed states in accordance with states of the branch probability flag always-n, a branch execution result indicating signal Re and a branch prediction signal Pr supplied from a branch execution unit (see FIG. 2). This BTB registration/update decision mechanism 64 is utilized in place of the BTB registration/update decision mechanism 32 in the instruction processing apparatus shown in FIG. 2.

As hereinabove described, branch instructions having low branch probabilities are not registered in the branch target buffer, so that a possibility of occurrence of a prediction miss of taken prediction/Not-Taken execution is reduced and the branch prediction hit rate is improved. Due to this structure, further, a possibility of invalidation of branch instructions having high branch probabilities which are stored in corresponding entries is reduced and the possibility of occurrence of not-taken prediction/Taken execution is reduced, while the branch prediction hit rate is improved.

[Embodiment 4]

Figure 14:
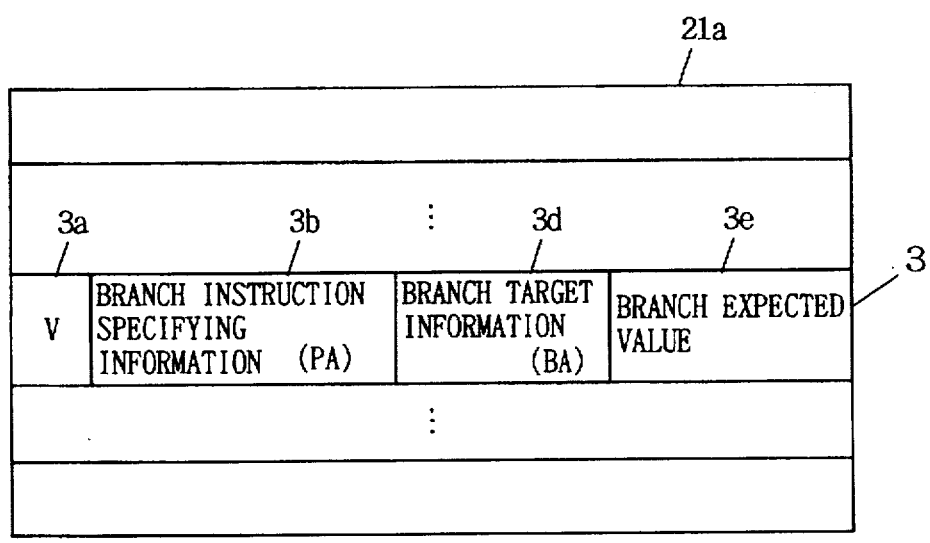
FIG. 14 illustrates the structure of an entry of a branch target buffer which is employed in a fourth embodiment of the present invention.

FIG. 14 illustrates the structure of entries of a branch target buffer 20 which is employed in a fourth embodiment of the present invention. Referring to FIG. 14, a storage region 21a of the branch target buffer 20 includes a plurality of entries 3. Each entry 3 includes a field 3a storing a validity bit V, a field 3b storing information (PA) specifying a branch instruction, a field 3d storing branch target information (BA), and a field 3e storing an expected value of a branch caused by this branch instruction. The branch expected value which is stored in the field 3e may be added to the branch instruction by a compiler, or may be decided by hardware in accordance with an immediate value of the branch instruction to be stored in the corresponding entry. Alternatively, the flags always-t and always-n and the signal φALWT described with reference to the aforementioned embodiments may be written in the branch target buffer 20 respectively. Further, the branch expected value may not be either "0" or "1", but may be a multivalue taking any one of a larger number of values. A structure of generating multiple branch expected values by hardware and writing the values in corresponding entries of the branch target buffer 20 is described later.

Figure 15:
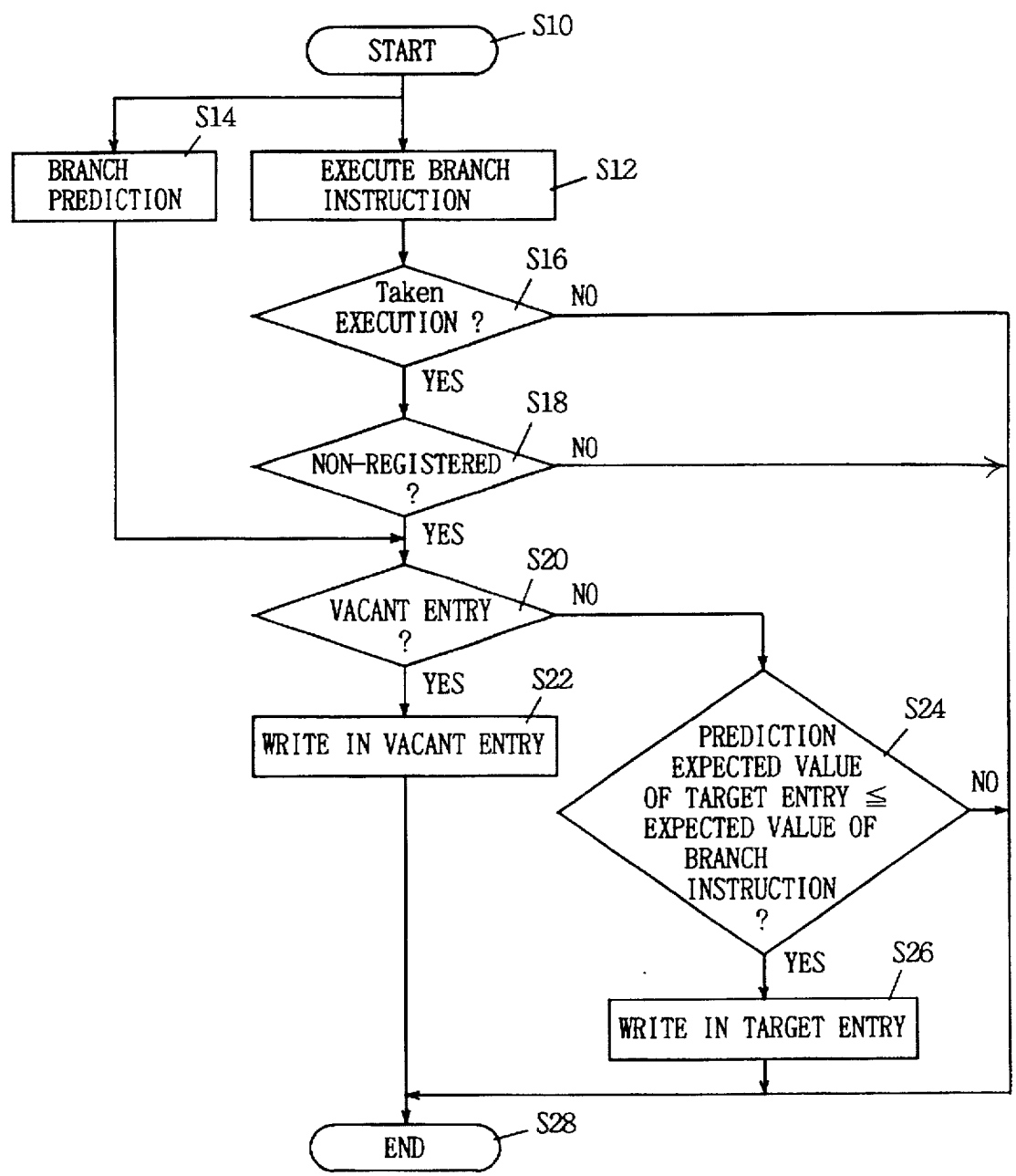
FIG. 15 is a flow chart showing a branch instruction registering operation in the fourth embodiment of the present invention.

FIG. 15 is a flow chart showing a write operation of the branch target buffer 20 in the fourth embodiment of the present invention. With reference to FIGS. 14 and 15, the write operation of the branch target buffer 20 in the fourth embodiment of the present invention is now described.

When a program counter outputs an instruction fetch address, an instruction is read from an instruction memory in accordance with the instruction fetch address, so that a branch instruction is executed (step S12). In parallel with the execution of the branch instruction, the validity bit V which is included in the corresponding entry of the branch target buffer 20 is read in accordance with the instruction fetch address, so that branch prediction is made in accordance with the value of the validity bit V (step S14).

Identification is made as to whether or not a branch is caused (taken) by the branch instruction as the result of the execution of the branch instruction (step S16).

When the result of the execution is Not-Taken execution and no branch is caused, the content of the entry of the branch target buffer 20 is not changed. When the result of the execution is Taken execution, on the other hand, a determination is made as to whether or not the supplied branch instruction is registered in the branch target buffer 20 (step S18). The validity bit V or the branch instruction specifying information (PA) is utilized for the determination, as described later. When the supplied instruction is registered, the content of the branch target buffer 20 is not changed.

If the supplied branch instruction is determined as being non-registered at the step S18, on the other hand, a determination is made as to whether or not the branch target buffer 20 has a vacant entry in accordance with the result of branch prediction (step S20). When the branch prediction indicates not-taken prediction, the validity bit V is "0" and indicates that no registered branch instruction is present in the corresponding entry, so that a vacant entry is detected. When a vacant entry is present, information related to the branch instruction is written therein with the branch expected value thereof (step S22).

When no vacant entry is present, on the other hand, a determination is made as to whether or not the branch expected value included in the field 3e of the target entry is smaller than that of the executed branch instruction (step S24). If the branch expected value of the target entry is larger than that of the executed branch instruction, no writing is made to the branch target buffer 20. If the branch expected value of the executed branch instruction is larger than that included in the field 3e of the target entry, on the other hand, information related to the executed branch instruction is written in the target entry, so that the executed branch instruction is registered (step S26).

Due to the aforementioned processing operation, registered branch instructions having high branch probabilities are prevented from being updated by those having low branch probabilities, so that the branch prediction hit rate reduction is prevented. The specific structure of this embodiment is now described.

Figure 16:
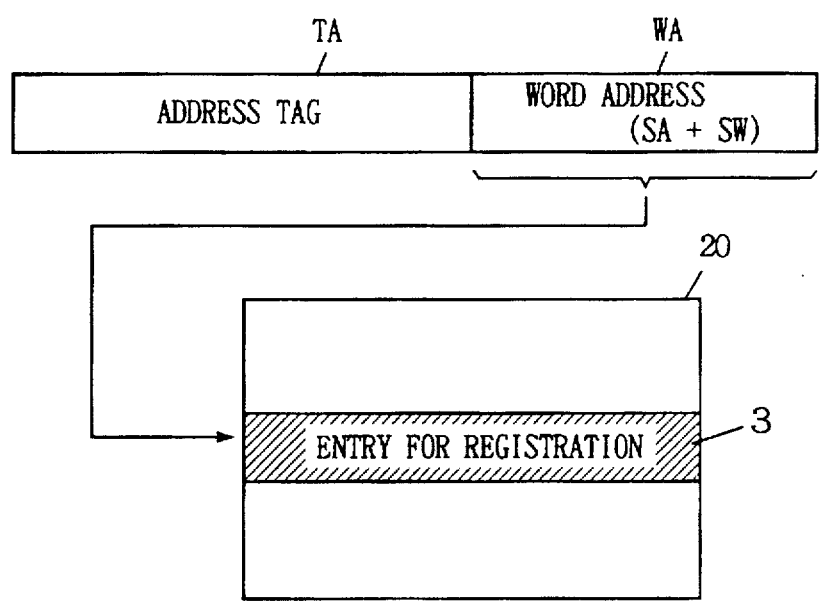
FIG. 16 illustrates an exemplary structure of a branch target buffer in registration of a branch instruction in the fourth embodiment of the present invention.

(I) When the branch target buffer 20 is of a direct mapping system:

When an address region of the branch target buffer 20 for storing a branch instruction is specified by direct mapping, the branch target buffer 20 is addressed by a word address WA of the instruction fetch address which is outputted from the program counter. The word address WA includes a set address SA and an address SW of a corresponding word in the set. An address tag TA is stored in the field 3b shown in FIG. 14 as information specifying a branch instruction in the corresponding entry 3. It is assumed here that the set number (number of sets) of the instruction memory is equal to the entry number (number of entries) of the branch target buffer 20. When the entry number of the branch target buffer 20 is smaller than the set number of the instruction memory, addressing may be made by a prescribed number of lowest bits of the word address WA shown in FIG. 16. In this case, the branch instruction specifying information included in the field 3b shown in FIG. 14 includes the address tag TA and highest bits of the word address WA. Alternatively, only a set address of the instruction fetch address which is outputted from the program counter may be utilized for addressing the entry of the branch target buffer 20.

In the case of direct mapping, the number of the entry for writing an executed branch instruction, i.e., an entry for registration, is one. When the entry 3 for registration is vacant, information related to the executed branch instruction is written in this entry 3, so that the branch instruction is registered. In the case of this direct mapping, a determination on registration/non-registration and presence/absence of a vacant entry is made simply in accordance with the value of the validity bit V.

When the entry for registration is not vacant, i.e., when the validity bit V is "1", the branch expected value included in the executed branch instruction is compared with that stored in the entry 3 for registration. When the branch expected value stored in the entry 3 for registration is larger than that of the executed branch instruction, the executed branch instruction is not registered.

When the branch expected value stored in the entry 3 for registration is not more than that of the executed branch instruction, on the other hand, the executed branch instruction is registered.

Figure 17:
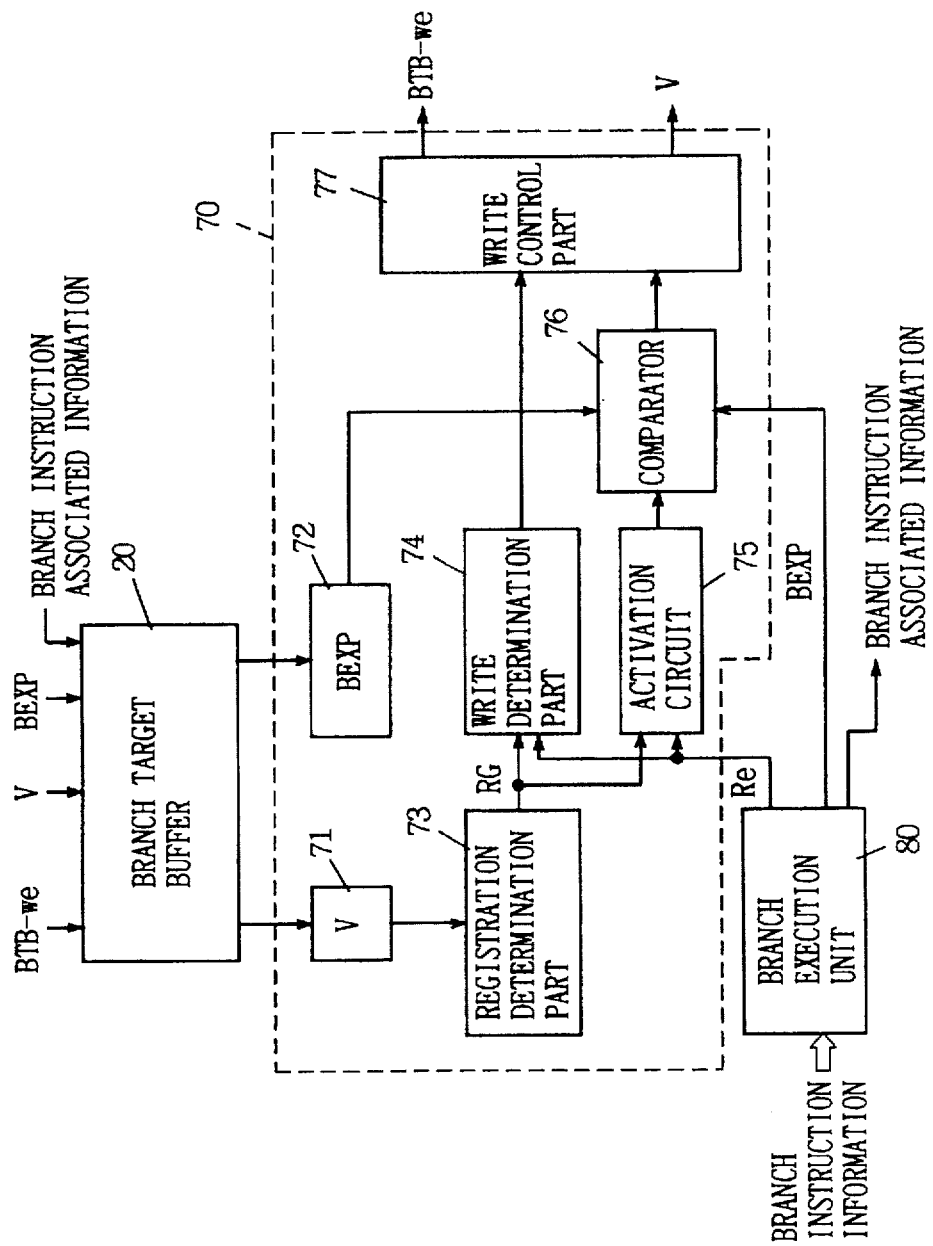
FIG. 17 schematically illustrates a structure for controlling the branch instruction registering operation in the structure of the branch target buffer shown in FIG. 16.

FIG. 17 illustrates a structure for making registration in the branch target buffer 20 in relation to registration/updating of a branch target buffer of the direct mapping system. Referring to FIG. 17, a branch registration control part 70 includes a latch 71 storing the validity bit V which is read from the corresponding entry of the branch target buffer 20, a latch 72 storing a branch expected value BEXP which is read from the corresponding entry, a registration determination part 73 for determining whether or not the executed branch information is registered in the branch target buffer 20 in accordance with the value of the validity bit V stored in the latch 71, a write determination part 74 for determining whether or not writing in the branch target buffer 20 is made in accordance with a branch execution result indicating signal Re from a branch execution unit 80 and a registration indicating signal RG outputted from the registration determination part 73, an activation circuit 75 generating an active signal in accordance with the branch execution result indicating signal Re from the branch execution unit 80, a comparator 76 which is activated in response to the output signal of the activation circuit 75 for comparing the branch expected value BEXP stored in the latch 72 with the branch expected value BEXP supplied from the branch execution unit 80, and a write control part 77 for setting states of a branch target buffer write enable signal BTB-we and the validity bit V in accordance with output signals of the write determination part 74 and the comparator 76.

The branch execution unit 80 receives branch instruction information, executes the branch instruction, and outputs the branch instruction execution result indicating signal Re as well as the information related to the executed branch instruction and the branch expected value BEXP thereof.

The registration determination part 73 determines that the branch instruction being executed is registered in the branch target buffer 20 when the validity bit V stored in the latch 71 is "1", to set a registration determination signal RG at "1". The write determination part 74 supplies the write control part 77 with a signal instructing writing of the corresponding executed branch instruction when the branch execution result indicating signal Re from the branch execution unit 80 indicates Taken execution and the registration indicating signal RG from the registration determination part 73 indicates non-registration.

The activation circuit 75 outputs an active state signal when the execution result indicating signal Re from the branch execution unit 80 indicates Taken execution and the registration indicating signal RG outputted from the registration determination part 73 indicates registration. The comparator 76 is activated in response to the active state signal from the activation circuit 75, compares the branch expected value BEXP of the latch 72 with that from the branch execution unit 80, and outputs a signal indicating writing of the executed branch instruction to the write control part 77 when the branch expected value from the branch execution unit 80 is larger than that from the latch 72.

The write control part 77 activates the branch target buffer write enable signal BTB-we and sets the validity bit V at "1" for supplying to the branch target buffer 20 when either the write determination part 74 or the comparator 76 instructs writing. Thus, a branch instruction having a large branch expected value is registered in the branch target buffer 20, and the same is prevented from being replaced by that having a small branch expected value.

FIG. 17 shows a structure of controlling writing in the branch target buffer 20 in case of Not-Taken execution. This is because maintenance/invalidation of registration is carried out in accordance with the value of multibit hysteresis information when the multibit hysteresis information is utilized in accordance with the field structure of the entries of the branch target buffer 20, or the validity bit V of the corresponding entry is simply invalidated or the validity bit V is selectively invalidated in accordance with the branch expected value of the branch instruction when only the validity bit V is utilized in the one-bit hysteresis system, and either one of these structures is applicable (such structures are described later).

Figure 18:
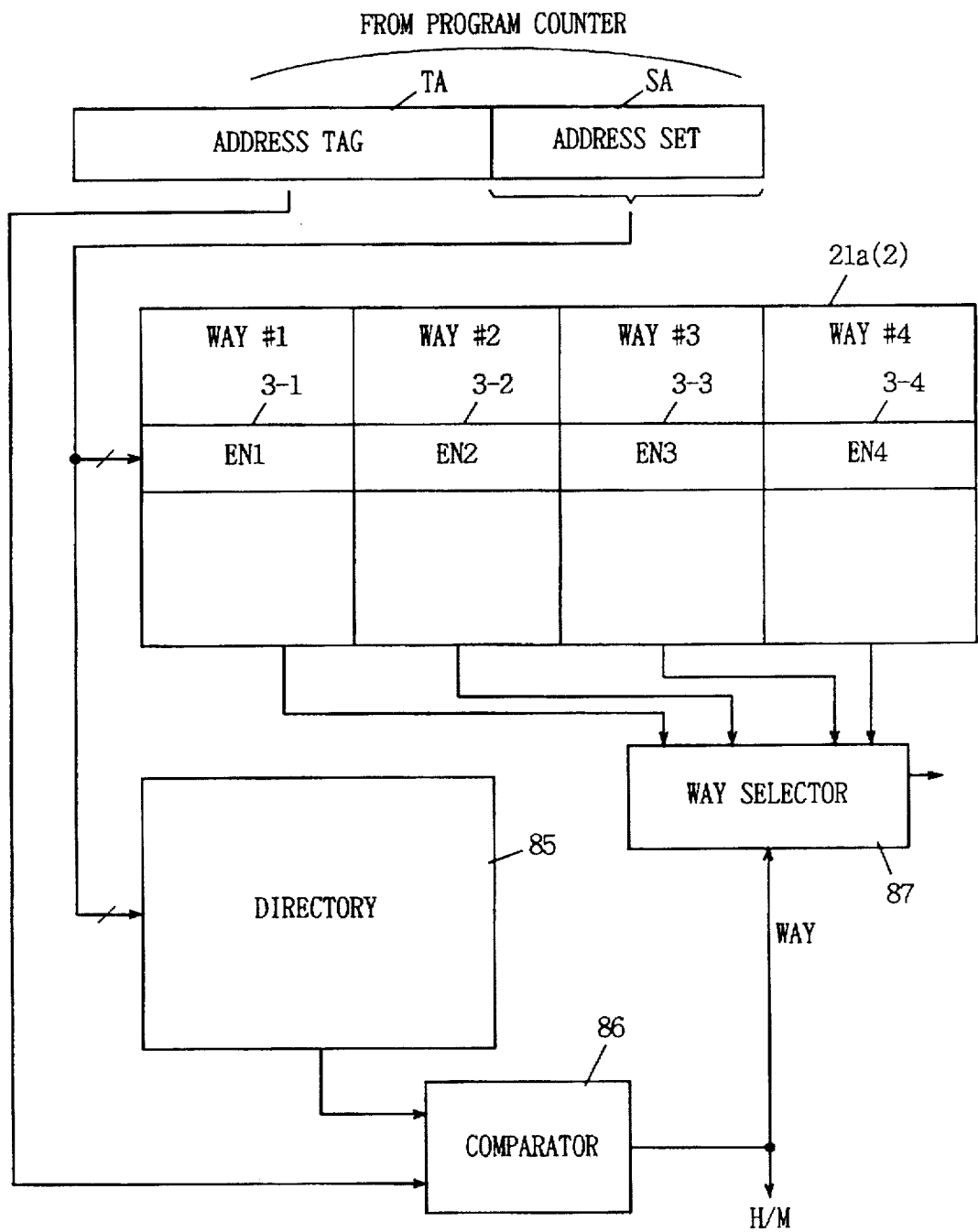
FIG. 18 illustrates another structure of the branch target buffer which is employed in the fourth embodiment of the present invention.

(II) When the branch target buffer 20 has a set associative structure:

Description is now made on a branch target buffer 20 having a four-way set associative system including four ways, as shown in FIG. 18. The number of the ways is arbitrary. In the case of the four-way set associative system, a prescribed number of address bits are employed as an address tag TA, while another prescribed number of address bits are utilized as an address set SA in an instruction fetch address which is outputted from a program counter. The contents of corresponding entries of the branch target buffer 20 are read by the address set SA. Since the branch target buffer 20 is of the four-way set associative system, contents EN1 to EN4 which are stored in four entries 3-1 to 3-4 are simultaneously selected in accordance with the set address SA.

The address set SA is also supplied to a directory 85. The directory 85 stores address tags TA of branch instructions which are stored in ways #1 to #4 respectively in a region indicated by the set address SA, and outputs the address tags TA corresponding to the respective ways #1 to #4 in accordance with the set address SA. A comparator 86 compares the four address tags TA outputted from the directory 85 with an address tag TA, which is formed by prescribed address bits, supplied from the program counter simultaneously with respect to the four ways #1 to #4, and outputs a way address WAY and a hit/miss indicating signal H/M in accordance with the results of the comparison.

A way selector 87 selects the content of one way from the contents EN1 to EN4 of the four entries in accordance with the way address WAY for outputting. When the output signal H/M of the comparator 86 indicates a miss, it means that the executed branch instruction is not registered in the branch target buffer 20, and hence not-taken prediction is made in this case. Namely, the hit/miss indicating signal H/M is also utilized as a signal indicating registration/non-registration of the branch instruction, and employed for branch prediction. When the output signal H/M of the comparator 86 indicates a hit, on the other hand, branch prediction is made in accordance with the content ENi of the entry which is selected by the way selector 87.

In the case of such a four-way set associative system, there are present four positions of entries (any one of the ways #1 to #4) for registering Taken-executed non-registered branch instructions. In this case, a non-registered branch instruction is registered in the following procedure:

When a vacant entry is present, the non-registered branch instruction is registered in this vacant entry (writing is carried out). Presence/absence of the vacant entry is detected by observing the values of validity bits which are included in the contents EN1 to EN4 read from the entries 3-1 to 3-4 shown in FIG. 18. An identification is made as to whether or not the supplied branch instruction is non-registered by indication of a miss by the signal H/M outputted from the comparator 86 or comparison of branch instruction information.

When no vacant entry is present, an entry storing a branch instruction having the smallest branch expected value is first detected. Then, the detected minimum branch expected value is compared with the branch expected value of the non-registered branch instruction. When the branch expected value of the non-registered branch instruction is in excess of the detected minimum branch expected value, the non-registered branch instruction is registered in place of the branch instruction having the detected minimum branch expected value. When the minimum branch expected value is larger than the branch expected value of the non-registered branch instruction, on the other hand, the non-registered branch instruction is not registered.

Figure 19:
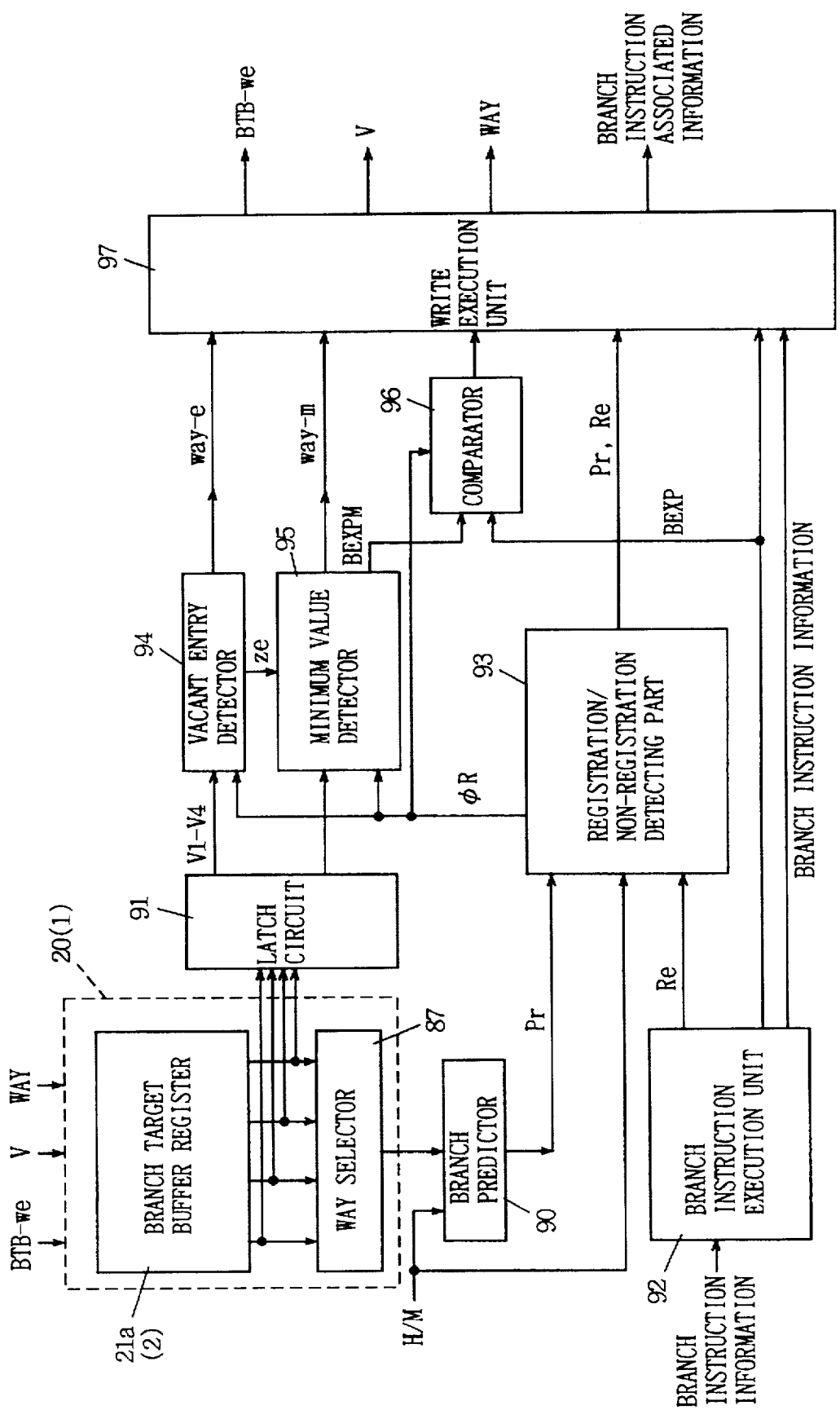
FIG. 19 schematically illustrates the structure of a control system for registering the branch instruction in the structure of the branch target buffer shown in FIG. 18.

Due to the aforementioned series of operations, the entry of the branch target buffer 20 is updated only when the branch expected value of a newly supplied branch instruction is in excess of that of a registered branch instruction, so that the branch expected value of the entry of the branch target buffer 20 after updating is not smaller than that before substitution. Thus, it is possible to prevent the substitution of the entry contents from reducing the branch prediction hit rate. FIG. 19 illustrates a structure for registering/non-registering the non-registered branch instruction. The structure shown in FIG. 19 corresponds to the registration/update decision mechanism shown in FIG. 2.

The registration/update decision mechanism includes a branch predictor 90 which performs branch prediction of a supplied branch instruction in accordance with the validity bit V included in an entry which is read from the branch target buffer 20 and the hit/miss indicating signal H/M shown in FIG. 18 and outputs a branch prediction signal Pr indicating the result of the prediction, a latch circuit 91 for latching validity bits and branch expected values of four entries which are read in parallel with each other from the branch target buffer 20 respectively, a registration/non-registration detection part 93 for detecting whether or not the supplied instruction is a registered branch instruction in accordance with the branch execution result indicating signal Re outputted from a branch execution unit 92, the branch prediction signal Pr and the hit/miss indicating signal H/M, a vacant entry detector 94 which is activated in response to a non-registration detecting signal φR from the registration/non-registration detection part 93 for receiving validity bits V1 to V4 of the four entries from the latch circuit 91 and detecting whether or not a vacant entry is present while outputting a signal way-e indicating the vacant entry, a minimum value detector 95 which is activated in response to the non-registration detecting signal φR from the registration/non-registration detection part 93 and a vacant entry absence detecting signal ze from the vacant entry detector 94 for detecting an entry having the minimum branch expected value from the branch expected values of the four entries from the latch circuit 91 and outputting a way signal way-m indicating the entry, a comparator 96 which is activated in response to the non-registration detecting signal φR from the registration/non-registration detection part 93 for comparing the minimum branch expected value from the minimum value detector 95 with a branch expected value BEXP of the branch instruction outputted from the branch instruction execution unit 92 and outputting a signal indicating the result of the comparison, and a write execution unit 97 receiving the signal way-e outputted from the vacant entry detector 94, the output signal way-m from the minimum value detector 95, the output signal of the comparator 96, the output signals Pr and Re from the registration/non-registration detection part 93, the branch expected value from the branch instruction execution unit 92 and other branch instruction information and performing writing in the branch target buffer 20.

The branch predictor 90 sets the branch prediction signal Pr in a state of not-taken prediction when the validity bit V included in the entry which is selected by the way selector 87 of the branch target buffer 20 indicates "0" of an invalid state or the hit/miss signal H/M indicates a miss.

The registration/non-registration detection part 93 sets the non-registration detecting signal φR in an active state in the following states: (i) When the branch execution result indicating signal Re indicates Taken execution and the hit/miss indicating signal H/M indicates a miss state: This state indicates that the executed branch instruction is not registered in the branch target buffer 20 and there is a possibility of registration of the executed branch instruction. (ii) When the branch execution result indicating signal Re indicates Taken execution and the branch prediction signal Pr indicates not-taken prediction: This case also includes such a state that the hit/miss signal H/M indicates a miss. However, there is a case where the hit-miss signal H/M may indicate a hit state when a branch instruction whose validity bit V is simply set in an invalid "0" state in the branch target buffer 20, and thus the non-registered detection signal φR is set in an active state indicating a non-registered state also in this state, in order to cope with such a state.

The registration/non-registration detection part 93 maintains the non-registration detecting signal φR in an inactive state when the branch prediction signal Pr indicates taken prediction or the branch execution result indicating signal Re indicates Not-Taken execution.

The vacant entry detector 94 is activated when the non-registration detecting signal φR from the registration/non-registration detection part 93 is in an active state, to output the signal way-e indicating a way having a validity bit showing an invalid state among the validity bits V1 to V4 supplied from the latch circuit 91. This vacant entry detector 94 can be formed by a gate structure of receiving the respective validity bits V1 to V4 in a first input thereof while receiving the non-registration detecting signal φR in a second input thereof for operating as a buffer when the non-registration detecting signal φR is in an active state and outputting the corresponding one of the validity bits V1 to V4. The signal way-e is a 4-bit signal which bit is provided in correspondence to each of the ways #1 to #4 and activated when the corresponding way is a vacant entry, for example.

The minimum value detector 95 is activated when both of the non-registration detecting signal φR from the registration/non-registration detection part 93 and the vacant entry absence detecting signal ze from the vacant entry detector 94 are in active states for selecting the minimum value from the respective branch expected values of the ways outputted from the latch circuit 91 and outputting the signal way-m indicating the way having the minimum branch expected value. This signal way-m also has a structure of a 4-bit signal which bit is provided in correspondence to each of the respective ways, for example.

The comparator 96 is activated in response to the non-registration detecting signal φR, for comparing a minimum branch expected value BEXPM outputted from the minimum value detector 95 with the branch expected value BEXP supplied from the branch instruction execution unit 92 and outputting a signal based on the result of the comparison. When BEXP≧BEXPM, the comparator 96 outputs a signal indicating replacement. The comparator 96 is not supplied with the vacant entry absence detecting signal ze from the vacant entry detector 94. This is because the signal way-m indicates no way when the minimum value detector 95 is inactive and hence the output signal of the comparator 96 is set in a neglected state in this state.

The write execution unit 97 identifies an operation to be carried out with respect to the branch target buffer 20 in accordance with the signals way-e and way-m, the output signal of the comparator 96, and the branch prediction signal Pr and the branch execution result indicating signal Re supplied through the registration/non-registration detection part 93, and carries out writing/non-writing of branch instruction relating information including the branch instruction information and the branch expected value supplied from the branch instruction execution unit 92.

When the signal way-e indicates one way, the write execution unit 97 activates the branch target buffer write enable signal BTB-we, converts the validity bit V to a valid state of "1", sets a way signal WAY in a state specifying the way corresponding to the signal way-e, and writes the branch instruction relating information in the corresponding entry. When the output signal of the comparator 96 indicates writing, on the other hand, the write execution unit 97 sets the signal WAY to indicate the way corresponding to the signal way-m from the minimum value detector 95, activates the write enable signal BTB-we, and sets the validity bit V at "1" indicating a valid state.

In case of Not-Taken execution, the write execution unit 97 carries out no registration of the branch instruction in the branch target buffer 20. At this time, the structure of any one of the aforementioned first to third embodiments and embodiments described later may be applied. This embodiment is directed to only an operation of registering a Taken-executed non-registered branch instruction in the branch target buffer 20.

When a non-registered branch instruction is registered, the write execution unit 97 stores the tag of the branch instruction (non-registered instruction) in the corresponding way of the directory 85 shown in FIG. 18.

According to the fourth embodiment of the present invention, as hereinabove described, a non-registered branch instruction is registered in accordance with the relation between the branch expected value of the non-registered branch instruction and that stored in an entry for registration, whereby it is possible to prevent reduction of the branch expected value caused by substitution of the content of the entry of the branch target buffer, thereby preventing reduction of the branch prediction hit rate.

[Embodiment 5]

Figure 20:
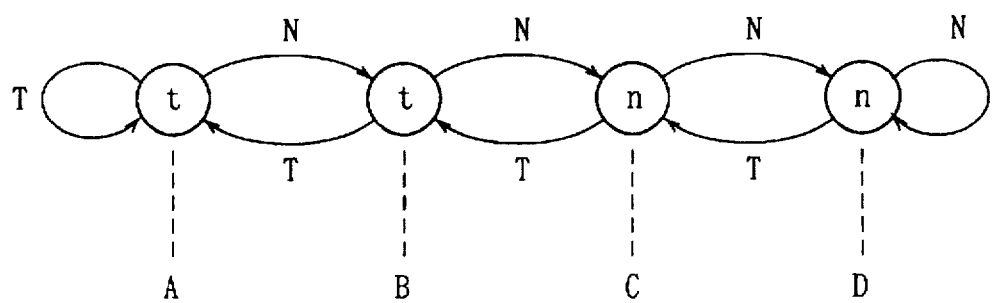
FIG. 20 illustrates an operation of a fifth embodiment of the present invention.

FIG. 20 illustrates the structure of branch expected values in a fifth embodiment of the present invention. In the case of a multibit hysteresis system, branch prediction is carried out in accordance with multibit hysteresis information (in a conventional case). As shown in FIG. 20, four states A, B, C and D can be set when 2-bit hysteresis information is employed. Branch expected values BEXP are allotted to the states A to D respectively. For example, the states A, B, C and D are made to correspond to branch expected values (1, 1), (1, 0), (0, 1) and (0, 0) respectively. Namely, the hysteresis information itself is utilized as branch expected value information. In this case, the branch expected values of the states A–D are A>B>C>D.

Figure 21:
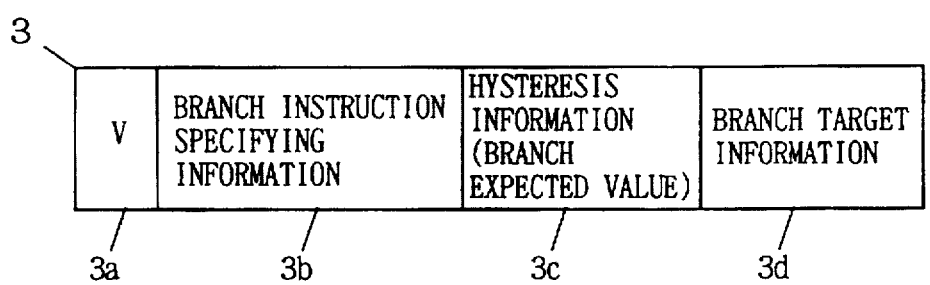
FIG. 21 schematically illustrates the structure of an entry in a branch target buffer in the fifth embodiment of the present invention.

A branch instruction is registered in a similar manner to the fourth embodiment in the case of Taken execution by a non-registered branch instruction. In this case, it is not necessary to employ an additional field for a branch expected value. Namely, a validity bit V is stored in a field 3a, branch instruction specifying information is stored in a field 3b, hysteresis information is stored in a field 3c as a branch expected value, and branch target information is stored in a field 3d in an entry 3, as shown in FIG. 21. In this case, the hysteresis information of the field 3c is utilized as a branch expected value BEXP and the structure shown in FIGS. 18 and 19 is utilized to carry out a registering operation on Taken execution of the non-registered branch instruction.

Branch prediction may be made in accordance with only the value of the validity bit V, while registration/non-registration of the branch instruction may be identified by the validity bit V similarly to the prior art so that branch prediction is made in accordance with the hysteresis information with respect to a registered branch instruction. In an update operation, on the other hand, the hysteresis information and the validity bit V are updated similarly to the first embodiment.

According to the fifth embodiment, as hereinabove described, the branch expected value of a branch instruction which is stored in a branch target buffer is not reduced below that before substitution similarly to the fourth embodiment, whereby it is possible to prevent the branch prediction hit rate from reduction upon registration of a non-registered branch instruction.

Further, a branch expected value which is stored in an entry of the branch target buffer reflects the result of execution of the branch instruction (hysteresis information is updated by Not-Taken execution and Taken execution, whereby the branch expected value is also updated in response), and hence the branch expected value is dynamically changed also with respect to a branch instruction which is hard to statically (previously fixedly) predict, whereby effective substitution is enabled.

In addition, no additional field is required for holding the branch expected value in the entry of the branch target buffer, whereby the branch target buffer is prevented from increase in scale.

[Embodiment 6]

Figure 22:
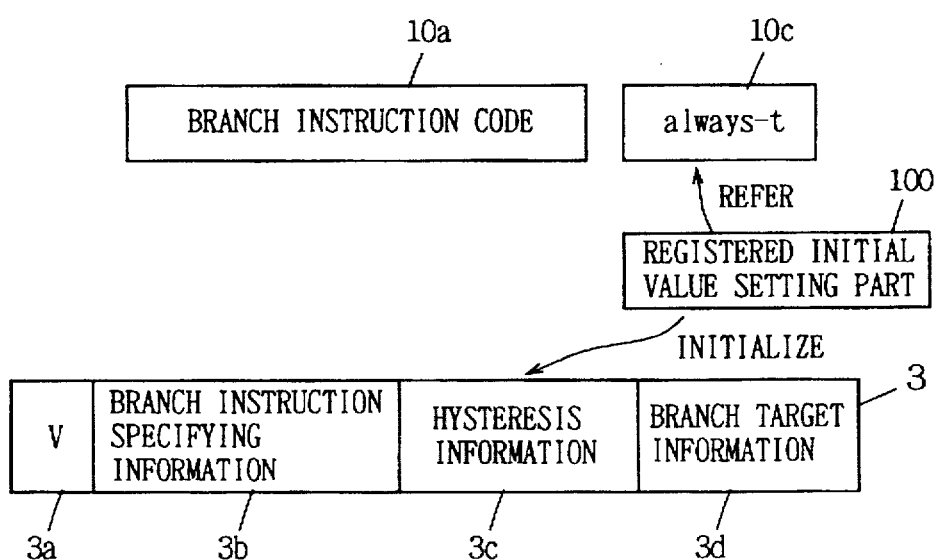
FIG. 22 illustrates an operation of a sixth embodiment of the present invention.

FIG. 22 illustrates a registering operation in an instruction processing apparatus according to a sixth embodiment of the present invention. Referring to FIG. 22, a branch probability flag always-t is provided on a branch instruction code 10a. This branch probability flag always-t may be linked with the branch instruction code 10a by a compiler, to be stored in a field 10c in the instruction code 10a. Alternatively, the branch probability flag always-t may be formed by hardware, similarly to the third embodiment.

An entry 3 includes a field 3a storing a validity bit V, a field 3b storing information (instruction number) specifying a branch instruction, a field 3c storing multibit hysteresis information, and a field 3d storing branch target information (branch target address). A registered initial value setting part 100 refers to the branch probability flag always-t in registration of the branch instruction (in case of not-taken prediction and Taken execution), sets the value of the hysteresis information of the branch instruction to be registered in accordance with the value, and stores the set value in the field 3c.

The branch probability flag always-t is set at "1" and "0" when the branch instruction has a high branch probability and when it has a low branch probability, respectively.

FIG. 23 is a list of initialization rules of the hysteresis information. Referring to FIG. 23, the hysteresis information includes two bits, and is set in any one of the four states A, B, C and D shown in FIG. 20, for example. The registering operation is now described with reference to FIGS. 22 and 23.

A branch instruction is registered in the case of not-taken prediction and Taken execution. When the branch probability flag always-t is "1", i.e., when the branch probability is high, the initial state of the hysteresis information is set in the state A shown in FIG. 20. When the branch probability flag always-t is "0" and the branch probability of the branch instruction to be registered is low, on the other hand, the initial state of the hysteresis information is set in the state B shown in FIG. 20. In other states, the branch instruction is not registered but an update operation/updating hysteresis information is carried out. The hysteresis information may be updated in the same operation as that utilized in a conventional multibit hysteresis system branch target buffer. Alternatively, the hysteresis information and the validity bit may be updated in accordance with branch prediction and a result of branch execution, similarly to the first embodiment.

When a multibit hysteresis system branch target buffer is employed and the hysteresis information indicates the states C and D shown in FIG. 20, not-taken prediction takes place. Branch instruction registration is made with respect to only a non-registered branch instruction. Therefore, the registered initial value setting part 100 shown in FIG. 22 has a function of identifying whether or not the branch instruction is registered. According to this registration identifying function, the branch instruction is determined as being registered when the value of the validity bit V included in the selected entry indicates a valid state of "1".

Figure 24:
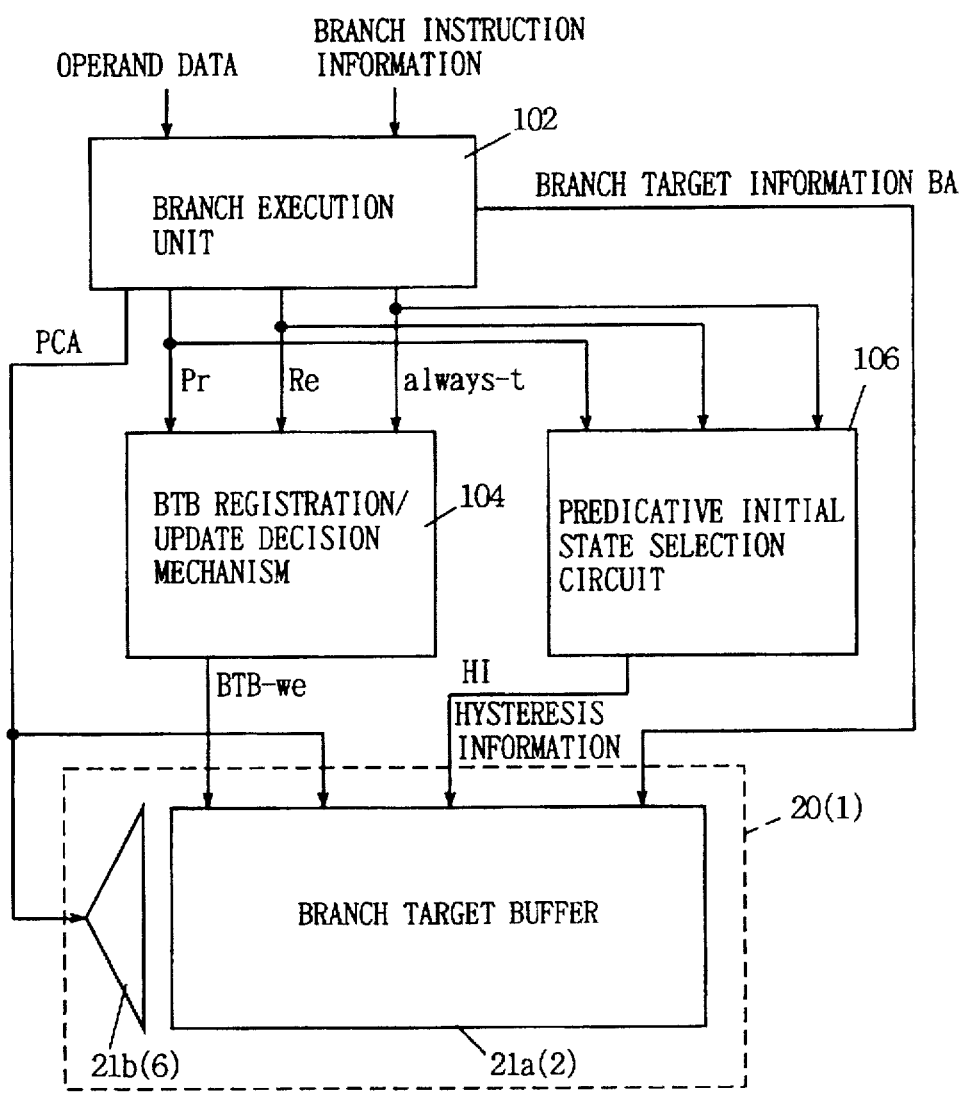
FIG. 24 schematically illustrates the structure of a write system for a branch target buffer according to the sixth embodiment of the present invention.

FIG. 24 schematically illustrates the structure of a branch target buffer write part of the instruction processing apparatus according to the sixth embodiment of the present invention. Referring to FIG. 24, the branch target buffer write part includes a branch execution unit 102 which receives operand data from an instruction decoder (not shown) and branch instruction information read from a branch target buffer 20 for executing the branch instruction, and outputs a branch prediction signal Pr, a branch execution result indicating signal Re and the branch probability flag always-t in accordance with the branch instruction information read from the corresponding entry of the branch target buffer 20 while outputting an instruction fetch address PCA of the branch instruction and branch target information BA, a BTB registration/update decision mechanism 104 which makes a determination as to whether or not writing is performed in the corresponding entry of the branch target buffer 20 (registration/update operation) in accordance with the states of the branch prediction signal Pr, the branch execution result indicating signal Re and the branch probability flag always-t, and a predicative initial state selection circuit 106 which sets an initial value HI of hysteresis information of the branch information to be registered in accordance with the branch prediction signal Pr, the branch execution result indicating signal Re and the branch probability flag always-t for outputting.

The branch execution unit 102 outputs the branch prediction signal Pr in accordance with the validity bit V and the hysteresis information included in the branch instruction information read from the corresponding entry of the branch target buffer 20. It also executes processing of the operand data supplied from the instruction decoder (not shown), and outputs the branch execution result indicating signal Re indicating whether or not a branch is caused by execution of the branch instruction. Further, the branch execution unit 102 extracts (or forms) the branch probability flag always-t from the branch instruction information in accordance with the method described with reference to the second or third embodiment. The branch execution unit 102 has a function of latching an instruction fetch address PCA of the branch instruction, and supplies the address PCA to the branch target buffer 20. The branch target buffer 20 receives a part of the instruction fetch address PCA in a decoder 21b(6), while receiving the remaining address as branch instruction specifying information for writing in a field of the corresponding entry of the branch target buffer 20.

The BTB registration/update decision mechanism 104 may be formed to decide registration/updating similarly to the structure of the conventional multibit hysteresis system. Alternatively, the hysteresis information included in the corresponding entry may be utilized as the branch expected value when the branch probability flag always-t is "1" so that the branch instruction is selectively registered, similarly to the aforementioned embodiment. In this case, the branch instruction is registered only when the corresponding entry is vacant, if the branch probability flag always-t is "0". The BTB registration/update decision mechanism 104 increments the hysteresis information of the corresponding entry in the case of not-taken prediction/Taken execution, while the mechanism 104 decrements the hysteresis information in the case of taken prediction/Not-Taken execution.

The predicative initial state selection circuit 106 receives the branch prediction signal Pr, the branch execution result indicating signal Re and the branch probability flag always-t, and decides the initial value HI of the hysteresis information of the branch instruction in accordance with the rules shown in FIG. 23. In writing of the hysteresis information in the branch target buffer 20, the initial value HI of the hysteresis information from the predicative initial state selection circuit 106 is written in the corresponding field of the corresponding entry only when the BTB registration/update decision mechanism 104 makes a determination of registration. When the BTB registration/update decision mechanism 104 determines that only updating is carried out, on the other hand, the initial value HI of the hysteresis information from the predicted initial state selection circuit 106 is not written, but updated hysteresis information which is decided by the BTB registration/update decision mechanism 104 is written in the corresponding entry of the branch target buffer 20 with necessary information. While FIG. 24 illustrates the structure as not outputting the validity bit V from the BTB registration/update decision mechanism 104, the validity bit V of the corresponding entry is set in a state of "1" indicating registration upon registration thereof.

According to the structure of the sixth embodiment, the following advantages are attained: When a branch instruction having a low branch probability with the branch probability flag always-t of "0" is accidentally subjected to Not-Taken execution and registered in the branch target buffer 20, the initial state of its hysteresis information enters the state B shown in FIG. 20. If next execution of this branch instruction is Not-Taken execution, the state thereof is updated into the state C, and the next branch prediction is not-taken prediction. As to this branch instruction, therefore, taken prediction takes place only when the branch instruction is first executed after registration. A branch instruction having a low branch probability is subjected to Taken execution successively twice with an extremely low probability, and hence a mishit of branch prediction as to this branch instruction is once, and reduction of prediction accuracy is prevented. Even if a non-registered branch instruction having a low branch probability which is accidentally subjected to Taken execution is registered, only the next prediction on this branch instruction mishits according to this structure, and reduction of branch prediction accuracy can be prevented.

While 2-bit hysteresis information is assumed in the registration rules shown in FIG. 23, the structure of the present invention is also applicable to hysteresis information of a larger bit number.

According to the sixth embodiment, as hereinabove described, the initial state of a branch instruction having a low branch probability is set in a state readily subjected to not-taken prediction while that of a branch instruction having a high branch probability is set in a state hardly subjected to not-taken prediction, whereby it is possible to remarkably suppress an influence exerted on the branch prediction accuracy by a prediction miss resulting from a branch the direction of which is reverse to a usual branch direction caused in an extremely low probability.

[Embodiment 7]

Figure 25:
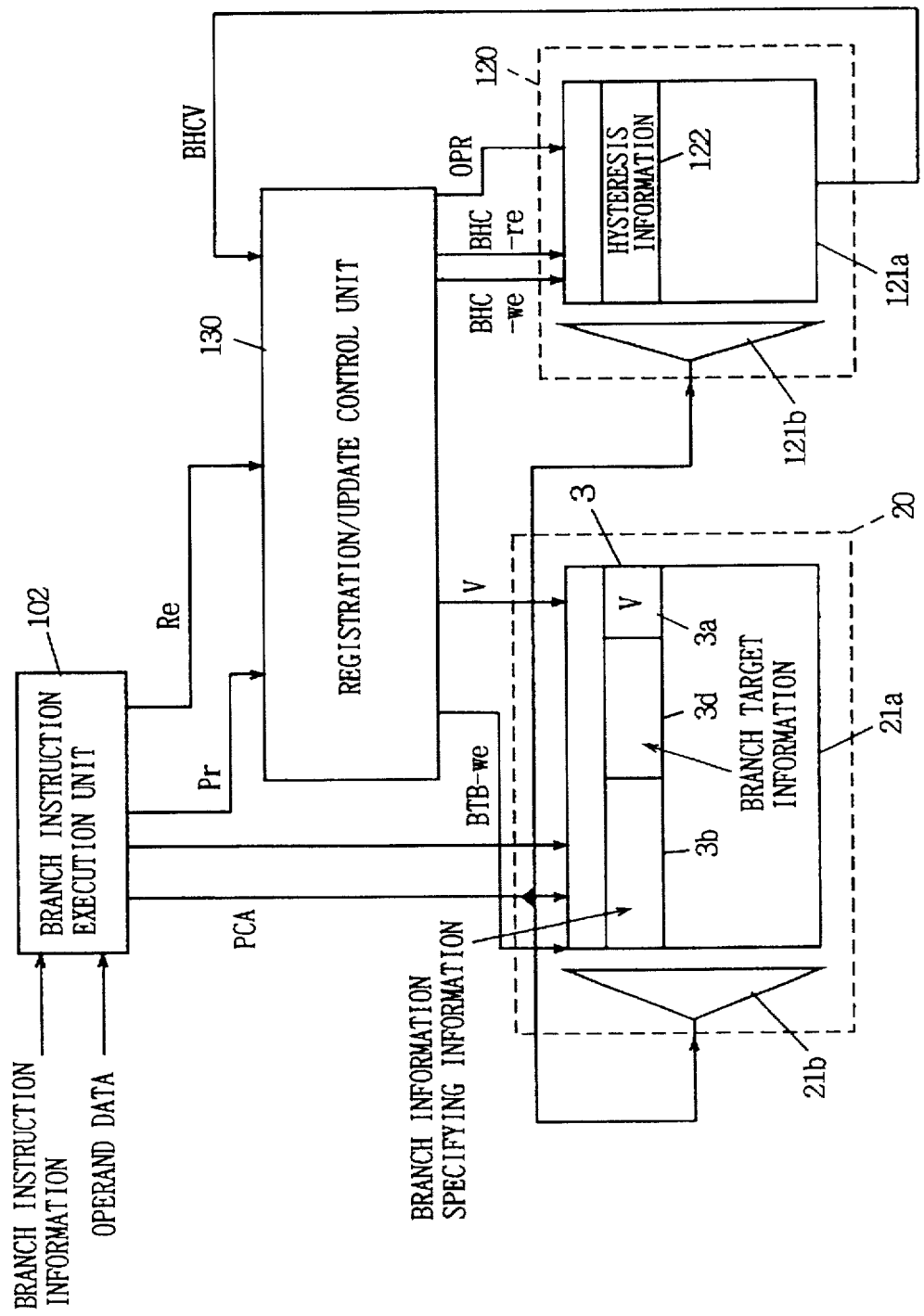
FIG. 25 schematically illustrates the structure of a branch target buffer write system of an instruction processing apparatus according to a seventh embodiment of the present invention.

FIG. 25 schematically illustrates the structure of a part controlling a branch instruction registering/updating operation in an instruction processing apparatus according to a seventh embodiment of the present invention. In the structure shown in FIG. 25, each entry 3 of a branch target buffer register 21a which is included in a branch target buffer 20 contains only a field 3a storing an validity bit V, a field 3b storing branch instruction specifying information, and a field 3d storing branch target information.

A branch hysteresis counter (BHC) 120 whose write/read operation can be controlled is provided independently of the branch target buffer 20. The branch hysteresis counter 120 includes entries 122 which are provided in correspondence to the entries 3 of the branch target buffer 20. Each entry 122 of the branch hysteresis counter 120 stores only hysteresis information as to a branch instruction which is stored in the corresponding entry 3 of the branch target buffer 20. Decoders 21b and 121b which are included in the branch target buffer 20 and the branch hysteresis counter 120 respectively are supplied with the same address (part of an instruction fetch address for the branch instruction) from a branch instruction execution unit 102.

The branch instruction execution unit 102 receives branch instruction information read from the branch target buffer 20 through a reading path (not shown) and operand data supplied from an instruction decoder (not shown), executes the branch instruction in accordance with the operand data, outputs a branch prediction signal Pr in accordance with the validity bit V included in the branch instruction information, outputs a branch execution result indicating signal Re in accordance with the result of the execution of the branch instruction, and outputs an instruction fetch address PCA generated from a program counter for the branch instruction.

The instruction fetch address PCA from the branch instruction execution unit 102 is generated only when information is written in the branch target buffer 20 and the branch hysteresis counter 120. In reading from the branch target buffer 20, an instruction fetch address from a program counter (not shown) is supplied to the branch target buffer 20.

A registration update control unit 130 receives the branch prediction signal Pr and the branch execution result indicating signal Re from the branch instruction execution unit 102 and a hysteresis information value BHCV read from the branch hysteresis counter 120, to output a branch target buffer write enable signal BTB-we and the validity bit V to the branch target buffer 20 as well as a branch hysteresis counter write enable signal BHC-we, a branch hysteresis counter read enable signal BHC-re and an operation indicating signal (data) OPR indicating the content of an operation for the branch hysteresis counter 120 to the branch hysteresis counter 120.

While the structure of the branch hysteresis counter 120 is described later, the entry 122 is formed by a multibit updown counter, for example, so that the count value thereof can be incremented/decremented and set/reset in accordance with the external signal OPR without reading the hysteresis information (count value). The branch target buffer 20 is similar to that described with reference to any of the aforementioned embodiments, and has the structure of a readable/writable register. In correspondence to branch instruction relating information which is stored in the entry 3 of the branch target buffer 20, the corresponding entry 122 of the branch hysteresis counter 120 stores hysteresis information of the corresponding branch instruction. The operation is now briefly described.

In instruction fetching, the content of the corresponding entry 3 is first read from the branch target buffer 20 in accordance with the instruction fetch address from the program counter (not shown). The read out content of the entry 3 is supplied to the branch instruction execution unit 102 with the operand data from the instruction decoder (not shown). The branch instruction execution unit 102 makes branch prediction in accordance with the value of the validity bit V which is included in the read out content of the entry 3, and sets the branch prediction signal Pr at "1" or "0" in accordance with the result of the prediction.

The branch prediction signal Pr is set in a state indicating taken prediction when the validity bit V is "1", while the signal Pr is set in a state indicating not-taken prediction when the bit V is "0" indicating an invalid state. The branch instruction execution unit 102 executes the supplied branch instruction, and outputs the signal Re indicating presence/absence of branching in accordance with the result of the execution. The branch instruction execution unit 102 further transmits a branch target address to the branch target buffer 20 with information specifying the branch instruction, i.e., the instruction fetch address PCA.

The registration update control unit 130 determines operations to be carried out on the branch target buffer 20 and the branch hysteresis counter 120 in accordance with the branch prediction signal Pr and the branch execution result indicating signal Re from the branch instruction execution unit 102, and outputs various control signals in accordance with the results of the determination. The operations carried out by the registration update control unit 130 are described later in detail, while the following operations are briefly described.

In case of a branch prediction hit and a prediction mishit of not-taken prediction/Taken execution, the hysteresis information is updated in the corresponding entry 122 of the branch hysteresis counter 120. In the case of not-taken prediction/Not-Taken execution, however, no branch is caused by a non-registered branch instruction or by a non-branch instruction, and hence the corresponding entries of the branch target buffer 20 and the branch hysteresis counter 120 are not updated.

In the case of a branch prediction mishit of taken prediction/Not-Taken execution, the hysteresis information of the corresponding entry 122 is first read out from the branch hysteresis counter 120, so that next prediction of the branch instruction is decided on the basis of its value BHCV. When the decided next prediction is not-taken prediction, the validity bit V of the corresponding entry 3 is converted to "0" in the branch target buffer 20, so that the branch instruction is set in a non-registered state.

According to the aforementioned operation method, the branch target buffer 20 mainly performs only information reading. The content of the corresponding entry 3 is rewritten in the branch target buffer 20 in registration of a non-registered branch instruction and non-registration of a registered branch instruction. Either case is a branch prediction mishit, which is caused in an extremely small frequency. Therefore, it is not necessary to carry out information reading and information writing in the branch target buffer 20 in all cycles, and therefore the branch target buffer 20 can be constructed by a circuit which operates at a low speed.

On the other hand, information is written in the branch hysteresis counter 120 when a branch instruction is executed. Information reading is carried out in the branch hysteresis counter 120 only in a branch prediction mishit of taken prediction/Not-Taken execution. Also in the branch hysteresis counter 120, therefore, only a data write operation is basically carried out in one cycle and information reading and information writing operations are carried out in each cycle in an extremely small frequency, whereby the branch hysteresis counter 120 can be readily constructed.

Namely, an information reading operation is basically carried out on the branch target buffer 20 for branch prediction, while writing is carried out on the branch hysteresis counter 120 for updating hysteresis information of the branch instruction. In branch prediction, taken prediction is made when the branch instruction is registered in the entry 3 of the branch target buffer 20 (when the validity bit V is "1"), while not-taken prediction is made otherwise. In this case, the hysteresis information is not referred to. Therefore, no information reading operation for the branch hysteresis counter 120 is required at this time. In the branch hysteresis counter 120, the hysteresis information value BHCV of the corresponding entry 122 is incremented when the result of execution of the branch instruction is Taken execution, while the value BHCV is decremented when the result is Not-Taken execution. In this case, only a write operation for the branch hysteresis counter 120 is carried out.

The corresponding hysteresis information is read from the branch hysteresis counter 120 only in the case of taken prediction/Not-Taken execution, so that next prediction is decided in accordance with the value BHCV thereof. In this case, the next branch prediction is made with reference to the hysteresis information, whereby the branch prediction can be made in the same accuracy as the conventional multibit hysteresis system. When the next branch prediction is not-taken prediction, the corresponding branch instruction is invalidated in the branch target buffer 20 (the validity bit V is converted to "0").

According to the structure of the seventh embodiment, only a read operation is generally carried out on the branch target buffer 20 while an information write operation for the branch target buffer 20 is carried out only in case a prediction mishit of taken prediction/Not-Taken execution and in case of not-taken prediction/Taken execution. In the branch hysteresis counter 120, on the other hand, only information writing is carried out in general (only updating of hysteresis information), and the hysteresis information is read only in the case of a prediction mishit of taken prediction/Not-Taken execution. Therefore, only either a write operation or a read operation is generally carried out in one cycle in each of the branch target buffer 20 and the branch hysteresis counter 120, whereby it is possible to solve a requirement for simultaneous performing of reading and writing in one cycle which is a problem of the conventional multibit hysteresis system, and both of the branch target buffer 20 and the branch hysteresis counter 120 can be readily constructed while a prediction hit rate which is close to that of the conventional multibit hysteresis system can be implemented.

Figure 26:
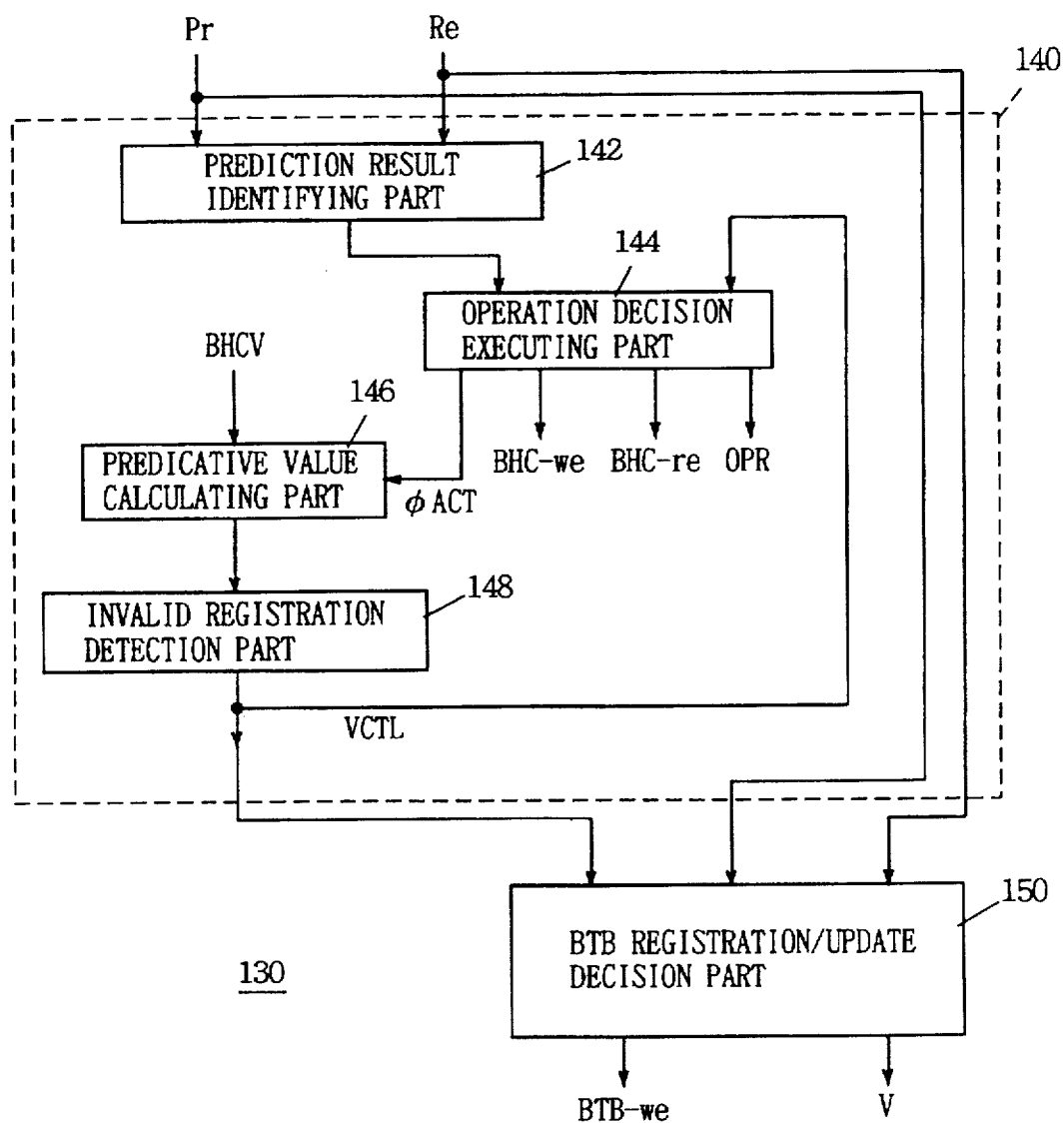
FIG. 26 schematically illustrates structures of a registration update control unit and a BHC registration/update decision part shown in FIG. 25.

FIG. 26 illustrates the structure of the registration update control unit 130 shown in FIG. 25 in further detail. Referring to FIG. 26, the registration update control unit 130 includes a BHC registration/update decision part 140 which controls the operation for the branch hysteresis counter 120 in accordance with the branch prediction signal Pr and the branch instruction execution result indicating signal Re from the branch instruction execution unit 102 shown in FIG. 25, and a BTB registration/update decision part 150 which determines a write operation for the branch target buffer 20 in accordance with an invalid registration detecting signal VCTL, the branch prediction signal Pr and the branch instruction execution result indicating signal Re outputted from the BHC registration/update decision part 140 and carries out a write operation for the branch target buffer 20 in accordance with the result of the determination.

The BTB registration/update decision part 150 outputs the branch target buffer write enable signal BTB-we and the validity bit V. The remaining branch instruction specifying information and branch target information (branch target address) are supplied to the branch target buffer 20 from the branch instruction execution unit 102 shown in FIG. 25.

The BHC registration/update decision part 140 includes a prediction result identifying part 142 identifying a prediction miss/hit and its type in accordance with the branch prediction signal Pr and the branch instruction execution result indicating signal Re and outputting a signal indicating the result of the identification, an operation decision executing part 144 outputting signals BHC-we, BHC-re, OPR and φACT for controlling the operations of the branch hysteresis counter 120 in accordance with an output signal of the prediction result identifying part 142 and an invalid registration detecting signal VCTL from an invalid registration detection part 148 described later, a predicative value calculating part 146 which is activated in response to the activation signal φACT from the operation decision executing part 144 for outputting a next branch predicted value in accordance with the hysteresis information value BHCV read from the branch hysteresis counter 120, and the invalid registration detection part 148 identifying whether or not registration of the branch instruction is to be invalidated in accordance with the calculated next branch predicative value from the predicted value calculating part 146 and outputting the signal VCTL in accordance with the result of the identification.

The prediction result identifying part 142 identifies which state is caused in accordance with combinations of states of the branch prediction signal Pr indicating taken prediction and not-taken prediction and states of the branch instruction execution result indicating signal Re indicating Taken execution and Not-Taken execution.

The operation decision executing part 144 executes updating (incrementation/decrementation) and initialization of the hysteresis information of the branch hysteresis counter 120 in accordance with the output signal from the prediction result identifying part 142. When the signal VCTL from the invalid registration detection part 148 indicates invalid registration, the operation decision executing part 144 initializes the hysteresis information of the corresponding entry at an initial value ("0").

The predicative value calculating part 146 receives the hysteresis information value BHCV read from the branch hysteresis counter 120 under control by the operation decision executing part 144 in the case of taken prediction/Not-Taken execution, and decides a next branch prediction value. The taken prediction/Not-Taken execution is a branch prediction mishit, and the hysteresis information value BHCV is decremented by 1. When a state corresponding to the decremented hysteresis information value BHCV corresponds to not-taken prediction, the invalid registration detection part 148 outputs the signal VCTL indicating invalid registration. Namely, the invalid registration detection part 148 carries out next prediction in accordance with the hysteresis information value calculated by the predicative value calculated part 146, and sets the output signal VCTL in a state indicating invalid registration when the next branch prediction is not-taken prediction. The BTB registration/update decision part 150 sets the validity bit V of the corresponding entry in an invalid state of "0" in accordance with the invalid registration indicating signal VCTL. The operation decision executing part 144 resets the hysteresis information of the corresponding entry in accordance with the invalid registration indicating signal VCTL. This reset operation may not particularly be carried out, since the corresponding entry is set in an invalid state in the branch target buffer 20 and this hysteresis information is not utilized.

FIG. 27 is a list of operations of the BHC registration/update decision part 140 and the BTB registration/update decision part 150. Referring to FIG. 27, it is assumed that the initial value of the hysteresis information value BHCV is set at the minimum value of "0" and this state corresponds to the state of not-taken prediction. It is also assumed that one cycle is required for reading the hysteresis information value from the branch hysteresis counter 120. In addition, it is assumed that the branch instruction execution result indicating signal Re is ascertained immediately before a cycle n, i.e., upon completion of a cycle (n−1). The logics are now briefly described, and then specific examples are described in detail.

(i) In the case of not-taken prediction/Not-Taken execution:

In this state, no branch is caused by a non-registered branch instruction and no writing is carried out for the branch target buffer 20 and the branch hysteresis counter 120. In the branch hysteresis counter 120, however, an operation to be executed in a cycle (n+1) is undetermined since it is decided depending on whether or not the next instruction is a branch instruction.

(ii) In the case of not-taken prediction/Taken execution:

At this time, a branch is caused by a non-registered branch instruction, and hence this branch instruction is registered. Namely, an operation of setting the validity bit V at "1" of a valid state is carried out for the branch target buffer 20 in the cycle n. Also in the branch hysteresis counter 120, the corresponding entry is initialized in the cycle n. An operation carried out for the branch hysteresis counter 120 in the cycle (n+1) is undetermined since it is decided in accordance with a next instruction.

(iii) In the case of taken prediction/Not-Taken execution:

No branch is caused by a registered branch instruction, and this is a prediction mishit. First, the hysteresis information is read from the branch hysteresis counter 120 in the cycle n. The operation to be carried out depends on the value of the hysteresis information value BHCV.

(a) BHCV=0:

This case is a prediction mishit and a negative value results from decrementation of the hysteresis information value BHCV, whereby next prediction is not-taken prediction. Therefore, registration of this branch instruction is invalidated in the cycle (n+1). Namely, the validity bit V of the corresponding entry is set at "0" in the cycle (n+1). Also in the branch hysteresis counter 120, the corresponding hysteresis information is set at the initial value "0" at this time. This operation may not be particularly carried out. Referring to FIG. 27, the next prediction in the case of not-taken prediction/Not-Taken execution is assumed to be taken prediction and that in the case of taken prediction/Not-Taken execution is assumed to be not-taken prediction, since the next prediction is taken prediction in the case of the initial value "0" while it is not-taken prediction in a state where the initial value "0" is further decremented by 1 (the hysteresis information value BHCV is decremented in a prediction mishit).

(b) When BHCV≧1:

In this state, a value exceeding 0 is attained even when the hysteresis information value BHCV read from the corresponding entry of the branch hysteresis counter 120 is decremented by 1 due to the prediction mishit, and hence the next prediction is taken prediction. In this state, only decrementation of the hysteresis information of the corresponding entry of the branch hysteresis counter 120 is carried out in the cycle (n+1).

(iv) In case of taken prediction/Taken execution:

This state is a branch prediction hit, and no write operation is carried out for the branch target buffer 20. In the branch hysteresis counter 120, on the other hand, the hysteresis information value of the corresponding entry is incremented by 1 in the cycle n.

As hereinabove described, reading is carried out in the branch hysteresis counter 120 only in the case of taken prediction/Not-Taken execution. On the other hand, writing is carried out for the branch target buffer 20 in the case of not-taken prediction/Taken execution, and in the case of taken prediction/Not-Taken execution with next prediction of not-taken prediction.

Figure 28:
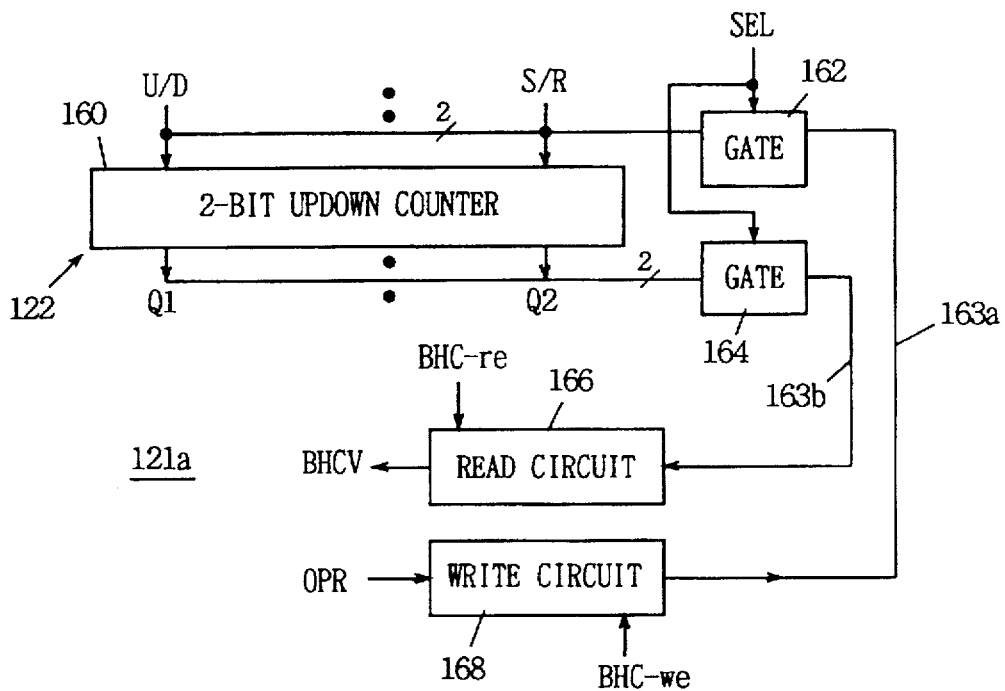
FIG. 28 illustrates an exemplary structure of a branch hysteresis counter which is employed in the seventh embodiment of the present invention.

FIG. 28 illustrates an exemplary structure of the branch hysteresis counter 120. Referring to FIG. 28, a 2-bit updown counter 160 is provided in correspondence to each entry 122 of the branch hysteresis counter 120. While FIG. 28 illustrates a 2-bit updown counter representing four states A–D, an updown counter having a larger bit number may alternatively be employed. The 2-bit updown counter 160 includes an up/down indicating signal input U/D, a set/reset input S/R, and 2-bit outputs Q1 and Q2.

The up/down input U/D and the set/reset input S/R are connected to a write circuit 168 through a gate 162 and an internal bus 163a. The gate 162 is brought into a conducting state in response to a selection signal SEL from the decoder 121b shown in FIG. 25. The 2-bit outputs Q1 and Q2 are connected to the read circuit 166 through a gate 164 and an internal data bus 163b. The gate 164 is also brought into a conducting state in response to the output signal SEL from the decoder 121b.

The read circuit 166 is activated in response to a branch hysteresis counter read enable signal BHC-re, amplifies a signal on the internal bus 163b, and outputs the hysteresis information value BHCV. The write circuit 168 is activated in response to the branch hysteresis counter write enable signal BHC-we, generates an operation control signal in accordance with the operation signal OPR, and transmits the control signal to the inputs U/D and S/R of the updown counter 160 corresponding to the selected entry.

According to the structure shown in FIG. 28, updating of the branch hysteresis counter 120, i.e., a write operation can be carried out with no requirement for reading the count values Q1 and Q2 of the 2-bit updown counter 160 in general.

Figure 29:
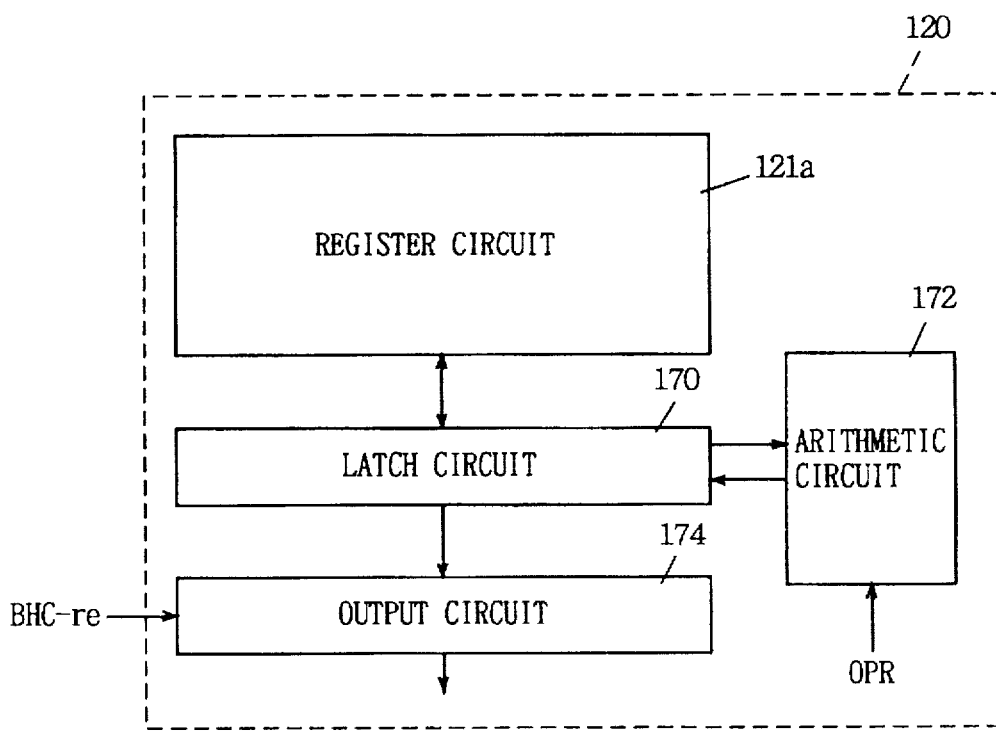
FIG. 29 illustrates another exemplary structure of the branch hysteresis counter which is employed in the seventh embodiment of the present invention.

FIG. 29 illustrates another structure of the branch hysteresis counter 120. Referring to FIG. 29, the branch hysteresis counter 120 includes a register circuit 121a including a register stage which is provided in correspondence to each entry, a latch circuit 170 for reading and latching the content of the corresponding register stage of the register circuit 121a every cycle, an arithmetic circuit 172 performing a prescribed specified operation on data stored in the latch circuit 170 in accordance with an externally supplied operation indicating signal OPR and storing the processed data in the latch circuit 170 again, and an output circuit 174 which is activated in response to the branch hysteresis counter read enable signal BHC-re for outputting the branch hysteresis information stored in the latch circuit 170. In the structure of the branch hysteresis counter 120 shown in FIG. 29, every update operation for the hysteresis information is performed in the interior, and no data is read out to the exterior. Therefore, information reading/writing is performed in each cycle, and the hysteresis information can be updated/ registered at a high speed with no requirement for driving the output circuit 174 every cycle.

Figure 30:
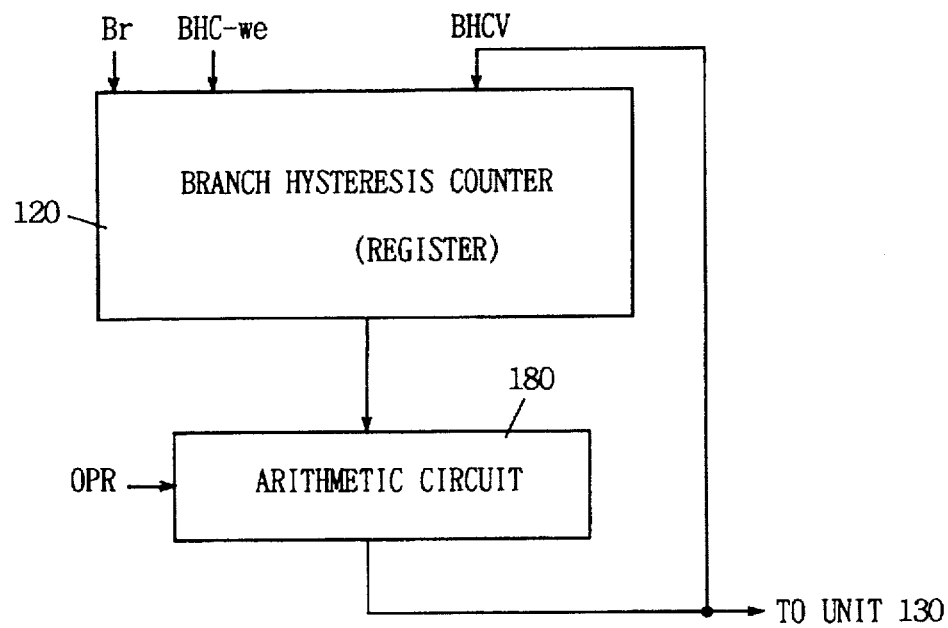
FIG. 30 illustrates still another exemplary structure of the branch hysteresis counter which is employed in the seventh embodiment of the present invention.

FIG. 30 illustrates still another structure of the branch hysteresis counter 120. In the structure shown in FIG. 30, the branch hysteresis counter 120 includes a register stage which is provided in correspondence to each entry, and an arithmetic circuit 180 is provided in the exterior of the branch hysteresis counter 120. The arithmetic circuit 180 is supplied with an operation indicating signal OPR, so that data (hysteresis information) read from the branch hysteresis counter 120 is subjected to a predetermined arithmetic processing and again stored in the corresponding entry (register) of the branch hysteresis counter 120. Data reading from the branch hysteresis counter 120 is carried out only in activation of a branch instruction detecting signal Br indicating that a branch instruction is supplied.

The branch hysteresis counter 120 is not accessed in an ordinary operation. The hysteresis information must be accessed only when a branch instruction is supplied. Therefore, the content of the corresponding entry is read from the branch hysteresis counter 120 when the branch instruction detecting signal Br is activated and is supplied to the arithmetic circuit 180. The branch instruction is detected and thereafter executed, and then the states of the signals BHC-we and OPR are decided in accordance with the result of the execution. Therefore, an information reading cycle and a hysteresis information writing cycle can be executed independently of each other and no high-speed operation is required, whereby prescribed processing can be performed on the hysteresis information with sufficient margin.

While any of the structures of the branch hysteresis counters 120 shown in FIGS. 28 to 30 may be employed, it is assumed that the structure shown in FIG. 28 is employed in the following description, in order to emphasize the write cycle of the branch hysteresis counter 120. In relation to the following detailed description of the operation, a similar operation can be implemented also when the branch hysteresis counter 120 shown in FIG. 29 or 30 is employed. A specific processing operation is now described in detail with reference to FIGS. 31 to 36.

Figure 31:
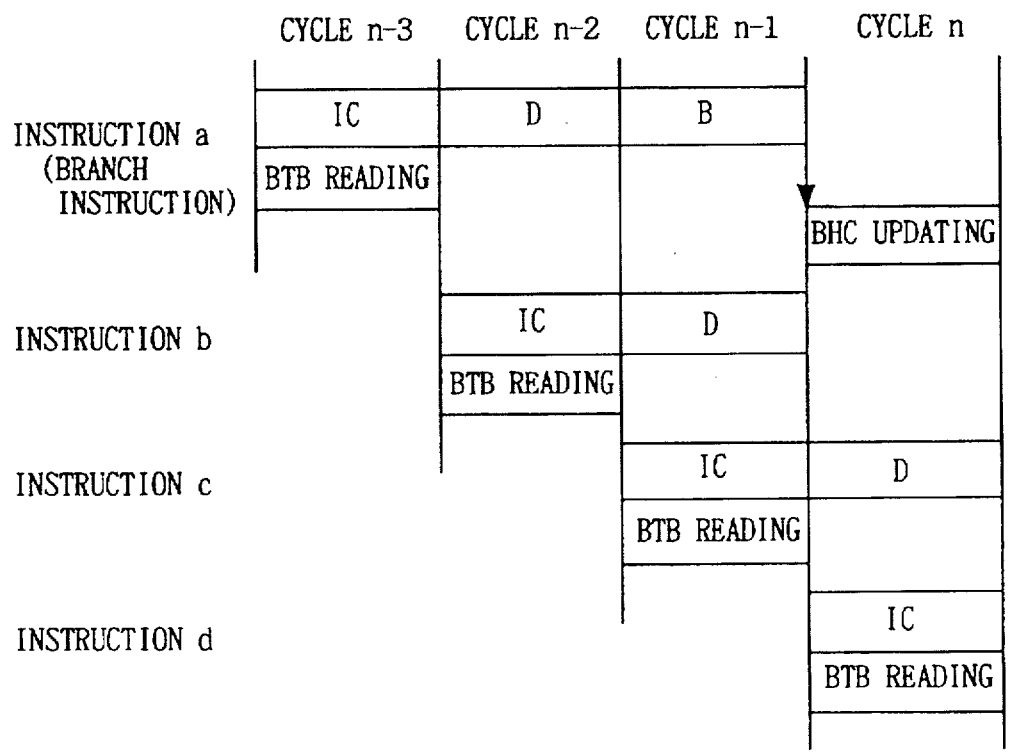
FIG. 31 is a timing chart representing operations of the seventh embodiment of the present invention.
Figure 32:
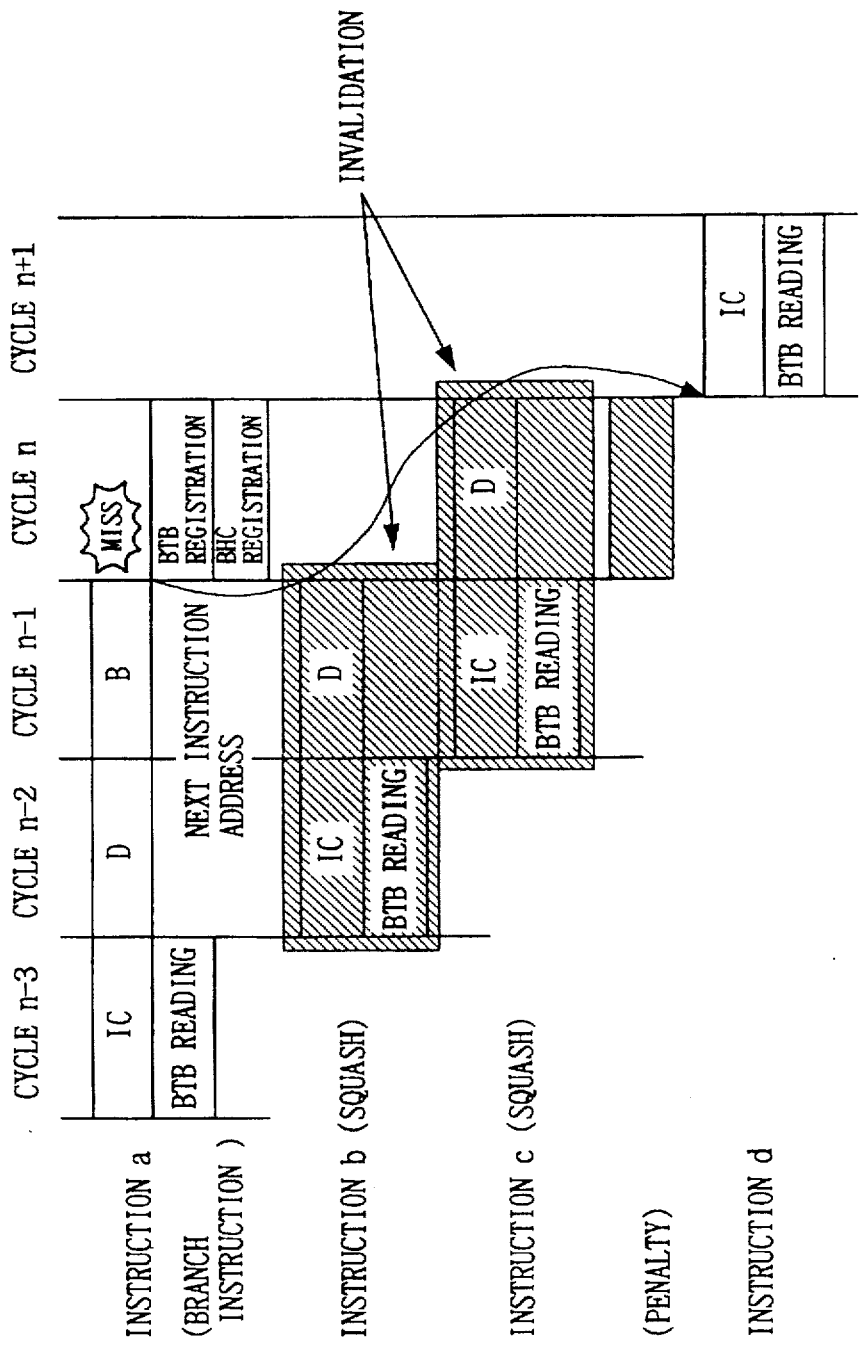
FIG. 32 is a timing chart representing operations of the seventh embodiment of the present invention.

(i) In the case of a branch prediction hit (taken prediction/ Taken execution) (see FIG. 31):

In a cycle (n–3) shown in FIG. 31, an instruction fetch stage IC is executed. Namely, an instruction fetch address is supplied from a program counter to an instruction memory, so that an instruction a is read from the instruction memory. In parallel with the reading of the instruction a, the content of the corresponding entry of the branch target buffer (BTB) is read and branch prediction is made (taken prediction).

In a cycle (n–2), the instruction a is decoded (instruction decoding stage D), and identified to be a branch instruction. In the cycle (n–2), further, a next instruction b is read from the instruction memory, while the content of the corresponding entry is read from the branch target buffer (BTB) in parallel therewith, so that branch prediction is made.

In a cycle (n–1), the instruction a which is a branch instruction is introduced into a branch instruction executing stage (B), and executed. The instruction b is decoded in the decoding stage D. At this time, still another instruction c is introduced into the instruction fetch stage IC and read from the instruction memory, while the content of the corresponding entry is read from the branch target buffer (BTB) in parallel therewith.

Upon completion of the cycle (n–1), branching is detected in the branch instruction executing stage B, and updating (incrementation) of the hysteresis information of the corresponding entry in the branch hysteresis counter (BHC) is carried out in the cycle n. At this time, the instruction b is introduced into the instruction executing stage B in accordance with the result of decoding, the instruction c is introduced into the decoding stage D, and a further instruction d is introduced into the instruction fetch stage IC while the content of the corresponding entry is read from the branch target buffer (BTB).

As shown in FIG. 31, updating of the branch hysteresis counter (BHC) and reading of the content of the branch target buffer (BTB) are carried out in parallel with each other in the cycle n. It is not necessary to stop the pipeline for updating the hysteresis information, no cycle penalty is caused, and branch prediction can be made every cycle, since the branch prediction is made in accordance with the value of the validity bit V stored in the branch target buffer and no hysteresis information is referred to.

(ii) In the case of not-taken prediction/Taken execution (see FIG. 32):

In a cycle (n–3), the instruction a is fetched and the validity bit V is read from the branch target buffer (IC and BTB reading). As to the instruction a, not-taken prediction is made.

In a cycle (n–2), the instruction a is introduced into the decoding stage D, and decoded. At this time, on the instruction b following the instruction a fetching and reading from the branch target buffer are carried out in accordance with branch prediction (IC and BTB reading).

In a cycle (n–1), the instruction a is identified as a branch instruction, and then is executed (branch instruction executing stage B). At this time, the instruction b is introduced into the decoding stage D and the instruction is fetched from the instruction memory, while reading from the corresponding entry of the branch target buffer is carried out and branch prediction is carried out (IC and BTB reading).

When a determination is made that a branch is caused by the instruction a executed in the cycle (n−1), this is a branch prediction mishit, and the instructions b and c are invalidated (squashed) as those which must not be executed. In a cycle n, the instruction a is first registered in the branch target buffer (BTB) in accordance with the branch prediction mishit (writing of branch instruction specifying information, a branch target address and the validity bit). Also in the branch hysteresis counter (BHC), the initial value of the hysteresis information is stored in the corresponding entry in parallel therewith. In this cycle n, no next instruction can be fetched and no reading of the branch target buffer (BTB) is carried out, and one-cycle penalty is caused.

In a cycle (n+1), the next instruction d is fetched in accordance with the branch target address which is included in the instruction a, while the corresponding entry is read from the branch target buffer (IC and BTB reading).

(iii) In the case of taken prediction/Not-Taken execution with next prediction of not-taken prediction (see FIG. 33):

In a cycle (n−3), the instruction a is fetched from the instruction memory (IC stage) and the validity bit of the corresponding entry is read from the branch target buffer, so that branch prediction is made in accordance with the validity bit (BTB reading). This is taken prediction, and a next instruction fetch address is set in accordance with the branch target address read from the branch target buffer.

In a cycle (n−2), the instruction b stored in the branch target address is read from the instruction memory (IC stage), while the content of the corresponding entry is read from the branch target buffer in parallel therewith (BTB reading).

The branch instruction a decoded in the cycle (n−2) is executed in a cycle (n−1) (B stage), and when Not-Taken execution is determined, the instructions b and c are invalidated in the decoding stage (D) respectively. At this time, the address of a fall-through instruction (instruction positioned next to the branch instruction a on instruction codes) is set in the program counter in a cycle n, and reading of the corresponding instruction d and the corresponding entry of the branch target buffer is carried out. In this cycle n, the hysteresis information stored in the corresponding entry is read from the branch hysteresis counter (BHC reading). Next branch prediction of the instruction a is decided in accordance with the read out hysteresis information (see FIG. 27).

When next prediction is decided as not-taken prediction in a cycle (n+1), the validity bit is set in an invalid state in the branch target buffer (BTB updating), while the hysteresis information is reset also in the branch hysteresis counter. This reset operation may not be particularly carried out. Writing (invalidation of the branch instruction) for the branch target buffer is carried out in this cycle (n+1), while no instruction fetch is carried out and one-cycle penalty is caused.

In a cycle (n+2), instruction fetch and BTB reading are carried out with respect to an instruction e.

Figure 33:
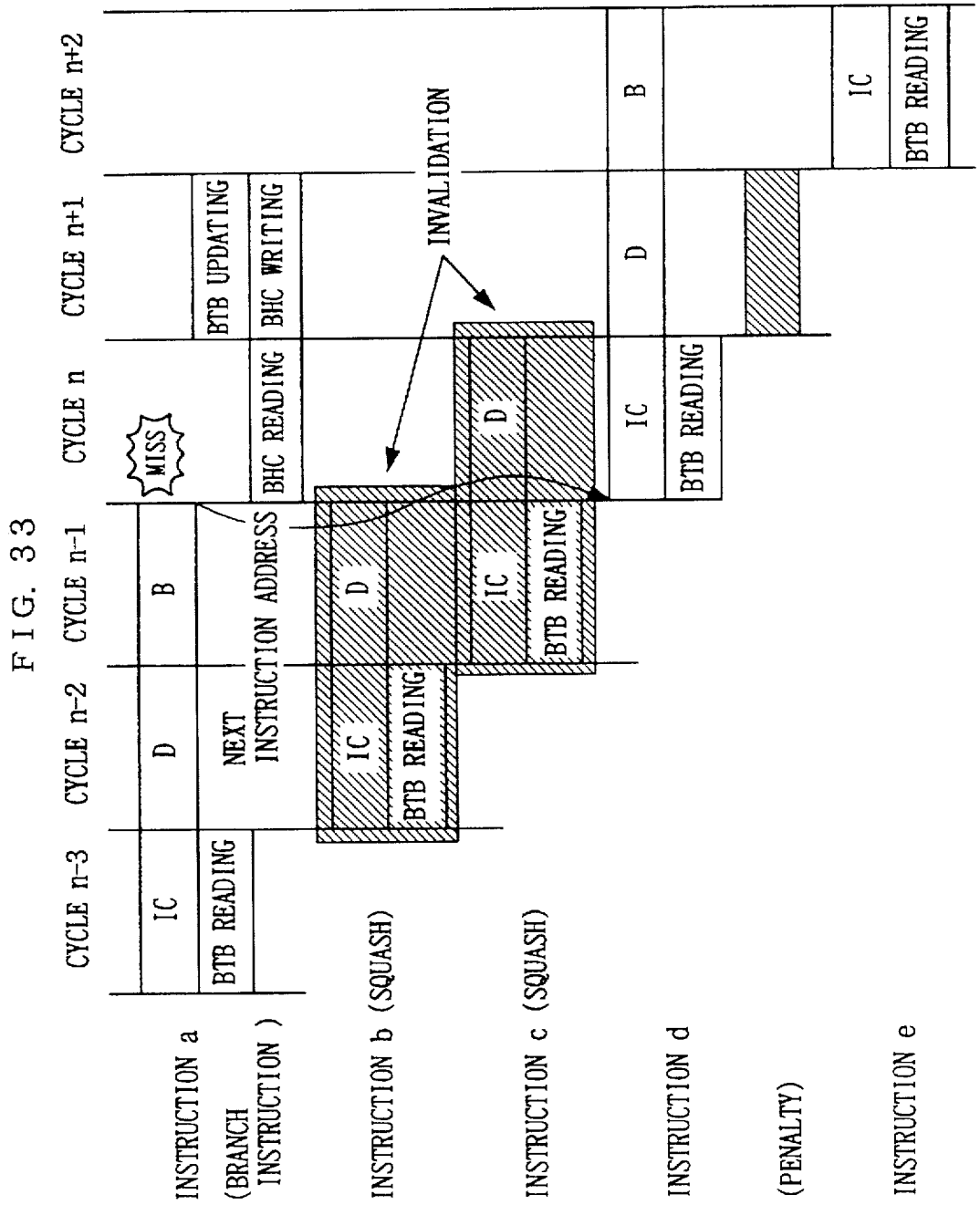
FIG. 33 is a timing chart representing operations of the seventh embodiment of the present invention.
Figure 34:
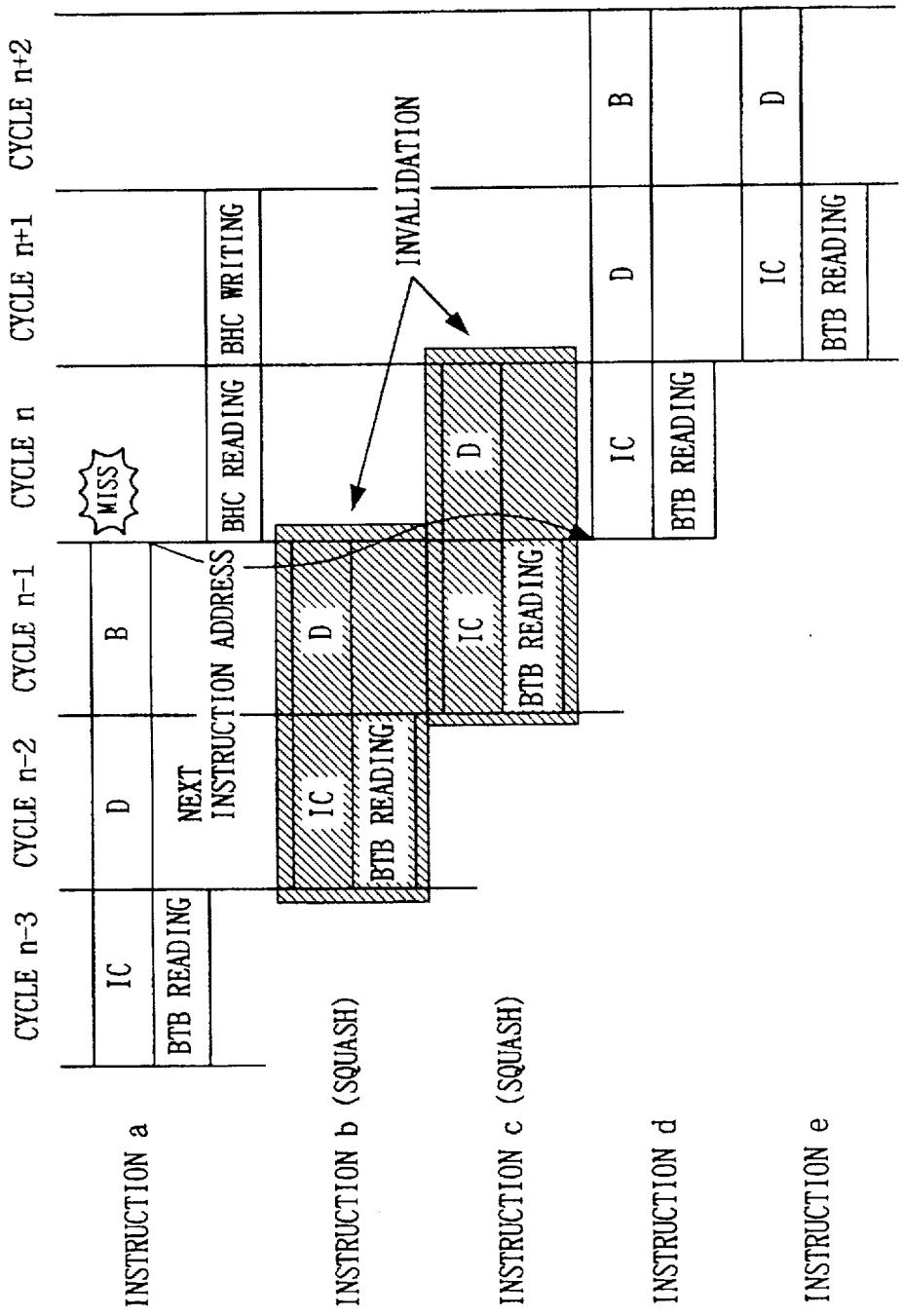
FIG. 34 is a timing chart representing operations of the seventh embodiment of the present invention.

(iv) In the case of taken prediction/Not-Taken execution with next prediction of taken prediction (see FIG. 34):

An operation identical to that shown in FIG. 33 is carried out up to a cycle n. Next prediction which is decided in accordance with hysteresis information read from the branch hysteresis counter is taken prediction, and no writing in the branch target buffer is carried out. In a cycle (n+1), therefore, only a write operation for updating the hysteresis information of the branch hysteresis counter is carried out (BHC writing), the instruction e following the instruction d is read from the instruction memory, and the content of the corresponding entry of the branch target buffer is read (IC and BTB reading). In this case, no content updating is carried out in the branch target buffer in the cycle (n+1), whereby reading can be carried out with respect to the branch target buffer in this cycle (n+1).

As clearly understood from the aforementioned series of operations, a cycle next to that in which a certain branch instruction is executed is allotted as that utilizing the branch hysteresis counter with respect to the branch instruction. In the case of taken prediction/Not-Taken execution, however, the branch instruction a utilizes two cycles for reading from and writing in the branch hysteresis counter. The cycle n is allotted to the branch instruction a as a cycle utilizing the branch hysteresis counter. When the branch instruction a utilizes the branch hysteresis counter also in the next cycle (n+1), contention in utilization of the branch hysteresis counter may be caused between the instruction a and the instruction b which rightfully utilize the branch hysteresis counter in this cycle. However, such a situation occurs in a prediction miss of the branch instruction a, and the instruction b is invalidated and never utilizes the branch hysteresis counter in the cycle (n+1). Therefore, no contention is caused in access to the branch hysteresis counter.

[In the case of A Different Pipeline Structure]

Figure 35:
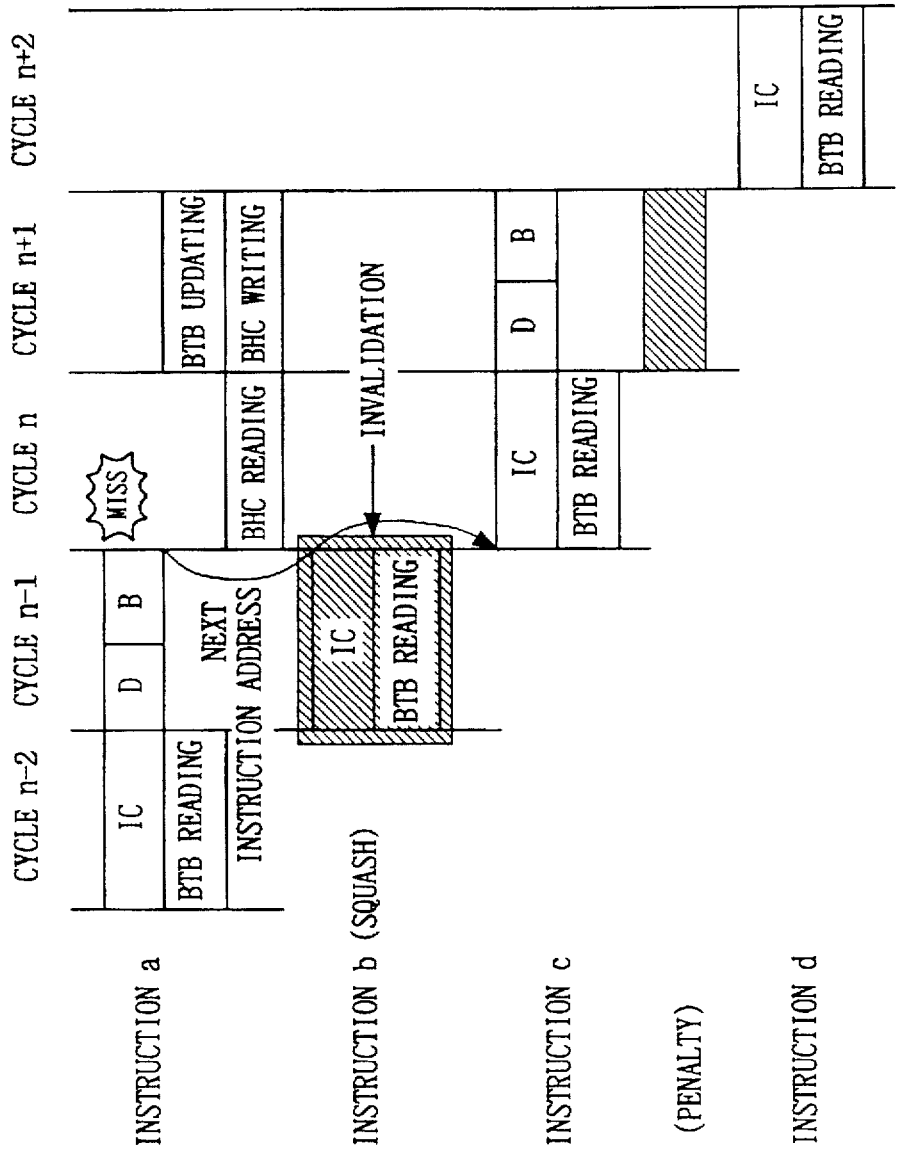
FIG. 35 is a timing chart representing operations of the seventh embodiment of the present invention.

FIG. 35 illustrates operations of the branch hysteresis counter and the branch target buffer in the case of taken prediction/Not-Taken execution. The timing chart of FIG. 35 shows such a state that next prediction of the branch instruction a is not-taken prediction. In the structure shown in FIG. 35, the instruction decoding stage (D stage) and the branch instruction execution stage (B stage) are executed in a common one cycle, dissimilarly to the aforementioned case shown in FIG. 33. Also in the case of the different pipeline structure, the next instruction b is invalidated when a prediction miss of the instruction a is decided upon completion of the cycle (n−1), so that the instruction c is fetched and the information is read from the branch target buffer in the cycle n (IC and BTB reading).

The hysteresis information stored in the corresponding entry of the branch hysteresis counter is read in the cycle n, while updating (resetting) of the content of the branch hysteresis counter and writing (invalidation) in the branch target buffer are carried out in the cycle (n+1). In this case, no reading of the branch target buffer can be carried out, and one-cycle penalty is caused. Also in the case of this different pipeline structure, merely one-cycle penalty is caused only when next prediction is not-taken prediction in the case of taken prediction/Not-Taken execution, the probability of occurrence of such a state is small, the probability of occurrence of cycle penalty is also small as a whole, and reduction of processing performance is suppressed.

Figure 36:
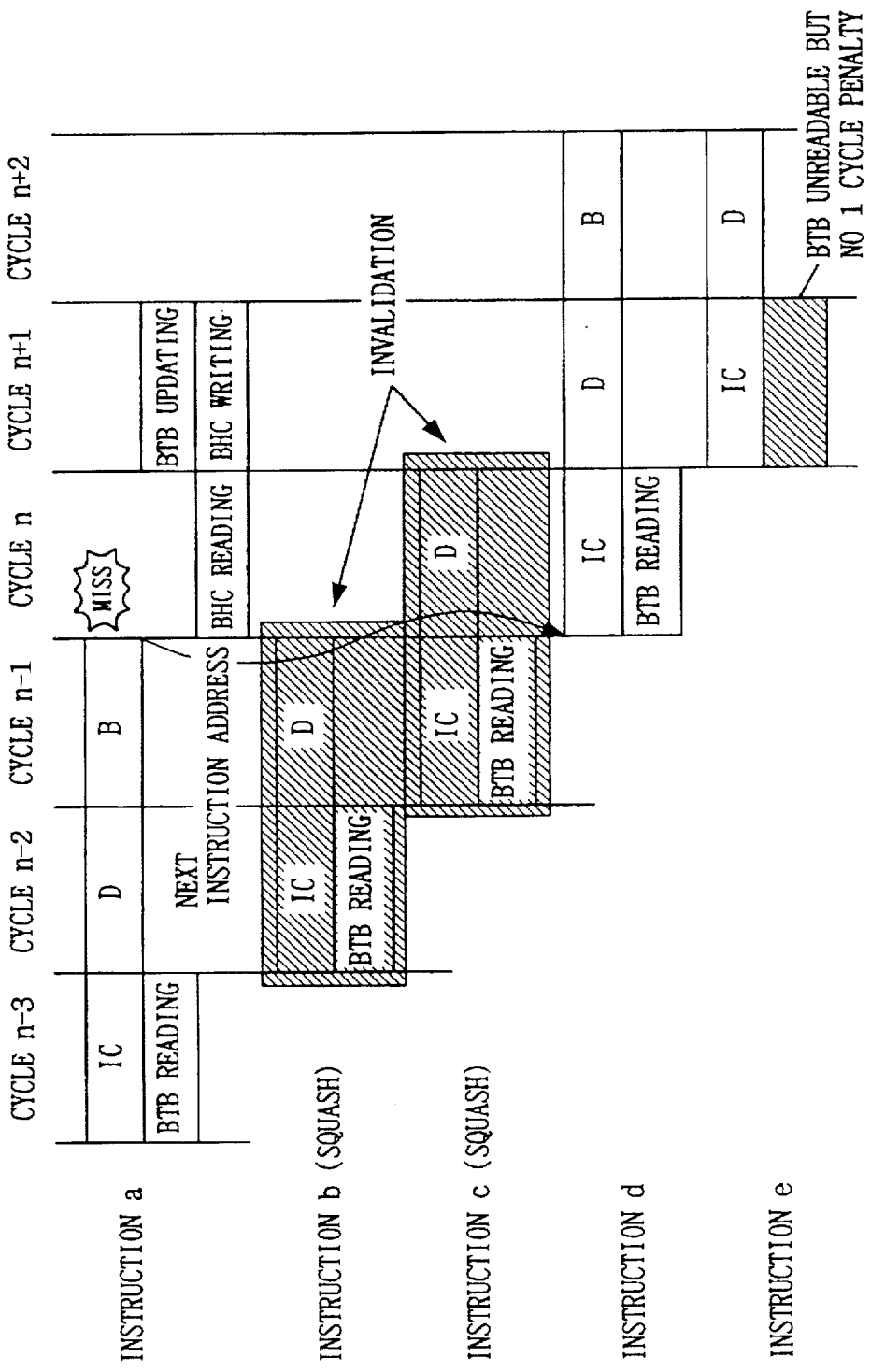
FIG. 36 is a timing chart representing operations of the seventh embodiment of the present invention.

FIG. 36 is a timing chart showing operations of the branch target buffer and the branch hysteresis counter in the case of simultaneously carrying out branch target buffer updating and an instruction fetch operation. This figure shows operations in the case of taken prediction/Not-Taken execution with next prediction of not-taken prediction. Each of the instruction decoding stage (D stage) and the branch instruction execution stage B requires one cycle. The operations are substantially identical to those shown in FIG. 33. In a cycle (n+1), an operation for fetching the instruction e is carried out in parallel with an update operation for the branch target buffer. At this time, no reading from the branch target buffer is carried out and hence no branch prediction is executed. However, the operation for fetching the instruction e is carried out and it is not necessary to provide an empty cycle of one cycle for reading the branch target buffer, whereby occurrence of one-cycle penalty is prevented.

According to the structure of the seventh embodiment of the present invention, as hereinabove described, the independently controllable branch hysteresis counter is provided independently of the branch target buffer so that each of the branch target buffer and the branch hysteresis counter may simply carry out either a read operation or a write operation in one cycle as a whole, whereby these can be readily implemented. Further, the branch prediction is made referring to multibit hysteresis information, whereby a prediction hit rate which is close to that of the conventional multibit hysteresis system can be implemented.

[Embodiment 8]

Figure 37:
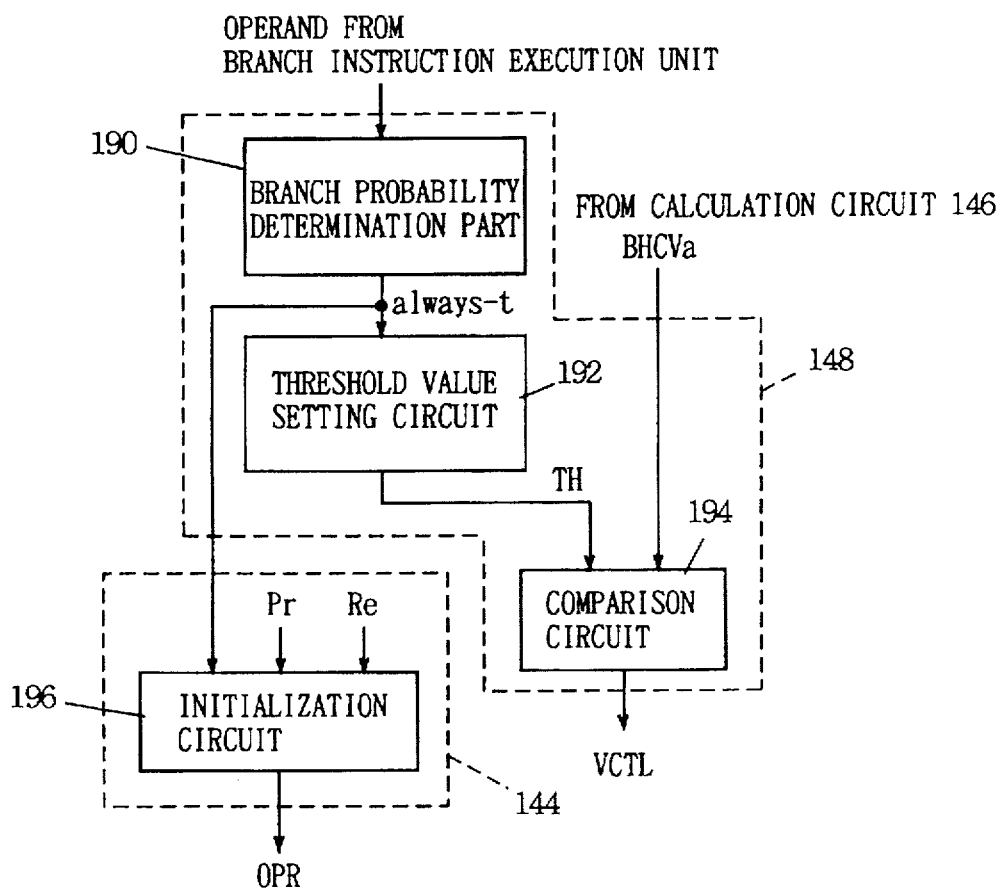
FIG. 37 illustrates the structure of a principal part of an instruction processing apparatus according to an eighth embodiment of the present invention.

FIG. 37 illustrates the structure of a principal part of an instruction processing apparatus according to an eighth embodiment of the present invention. This figure typically shows structures of the invalid registration detection part 148 and the operation decision executing part 144 shown in FIG. 26. Referring to FIG. 37, the invalid registration detection part 148 includes a branch probability determination part 190 which receives an operand from the branch instruction execution unit 102 (see FIG. 25), identifies whether the branch instruction is a backward branch instruction or a forward branch instruction, and sets the value of a branch probability flag always-t in accordance with the type of the branch instruction, a threshold value setting circuit 192 which sets a threshold value in accordance with the branch probability flag always-t, and a comparison circuit 194 which compares a threshold value TH outputted from the threshold value setting circuit 192 and an updated hysteresis information value BHCVa received from the predicative value calculating part 146 shown in FIG. 26.

The branch probability determination part 190 sets the branch probability flag always-t at "1" when the supplied operand indicates a branch instruction having a high branch probability such as a backward branch instruction, while the part 190 sets the branch probability flag always-t at "0" when the operated indicates another type of branch instruction such as a forward branch instruction. The branch probability determination part 190 may include a structure of deciding the value of the branch probability flag always-t in accordance with whether the immediate value of the operand is positive or negative.

The threshold value setting circuit 192 selects a low threshold value when the branch probability flag always-t is at "1" indicating a high branch probability, while the circuit 192 selects a high threshold value when the flag always-t is "0". The comparison circuit 194 sets an invalid registration detecting signal VCLT thereof at "0" when the hysteresis information value BHCVa from the calculating circuit 146 is in excess of the threshold value TH, while the circuit 194 sets the output signal VCTL at "1", i.e., a state indicating invalid registration, when the hysteresis information value BHCVa is smaller than the threshold value TH.

An initialization circuit 196 included in the operation decision executing part 144 sets an initial state of a branch instruction to be registered in accordance with the branch probability flag always-t, a branch prediction signal Pr and a branch instruction execution result indicating signal Re. Namely, the initialization circuit 196 selects the initial state of the hysteresis information in accordance with the branch probability flag always-t in the case of not-taken prediction/Taken execution, and writes the selected initial state (value) in a corresponding entry of a branch hysteresis counter. An output signal OPR from the initialization circuit 196 may have a maximum count value set by a set signal and a minimum count set by a reset input where each entry is formed by an updown counter as shown in FIG. 28. When each entry of the branch hysteresis counter is formed by a register as shown in FIGS. 29 and 30, on the other hand, the initialization circuit 196 may set and write the initial hysteresis information value to the register of the corresponding entry.

Figure 38A:
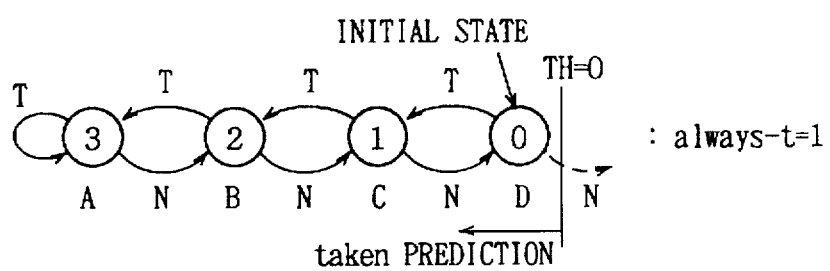
FIGS. 38A and 38B illustrate operations of the eighth embodiment of the present invention.
Figure 38B:
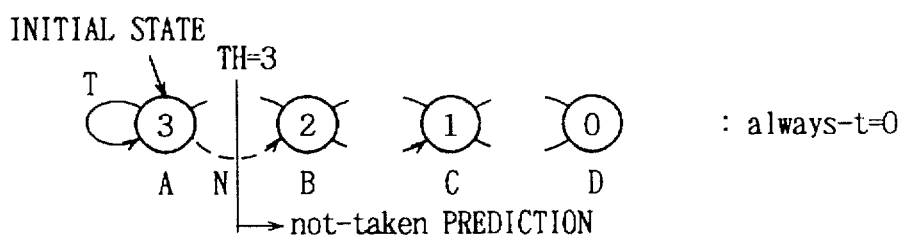

FIGS. 38A and 38B illustrate correspondence between the threshold value TH set by the threshold value setting circuit 192 and the initial state of hysteresis information of the branch instruction to be registered. Referring to FIGS. 38A and 38B, the hysteresis information is expressed in two bits, and each branch instruction takes any one of four states A to D, for example. When the branch probability flag always-t is "1", the threshold value TH is set at "0" as shown in FIG. 38A, and the initial state of the hysteresis information is set in the state D in this case. The values of the hysteresis information are indicated by decimal numbers in correspondence to the respective states in FIGS. 38A and 38B. In this initial state, taken prediction takes place when the branch instruction is subsequently executed. When no branch is caused by the subsequently executed instruction, the hysteresis information is decremented from the initial state of 0 to a negative value, the invalid registration detecting signal VCTL is set in a state indicating invalidation of registration, and registration of this branch instruction in the branch target buffer is invalidated. When the branch probability flag always-t is "1", however, the branch probability thereof is high, the possibility of the aforementioned state is small and this branch instruction generally causes a branch over a plurality of times of execution and is converted to the states C, B and A in the order, whereby taken prediction is reliably executed and the branch prediction accuracy is improved.

The branch probability flag always-t is set at "0" with respect to a branch instruction having a low branch probability, and the threshold value TH is set at 3 at this time. Further, the initial state of the hysteresis information of the newly registered branch instruction is set in the state A (3), as shown in FIG. 38B. In the case of the branch instruction having a low branch probability, next prediction is taken prediction while a probability of Not-Taken execution is high. In this case, the next prediction is not-taken prediction since the hysteresis information is then in the state B. In this case, the invalid registration detecting signal VCTL from the comparison circuit 194 is set in a state indicating invalidation of registration, so that the branch instruction is removed from registration in the branch target buffer. When a branch instruction having a low branch probability is registered by an accidentally caused branch, such a branch instruction is immediately removed from registration in the branch target buffer and hence reduction of the branch prediction accuracy is prevented.

According to the eighth embodiment of the present invention, as hereinabove described, it is possible to reduce the possibility of registration of a branch instruction having a low branch probability caused by accidental change of the branch direction and invalidation of a branch instruction having a high branch probability by carrying out next branch prediction in accordance with the threshold value reflecting the branch probability of the branch instruction, thereby suppressing reduction of the prediction hit rate.

[Embodiment 9]

Figure 39A:
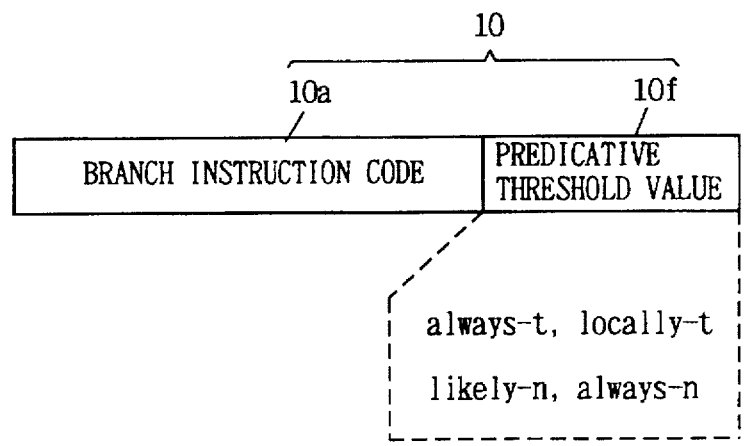
FIGS. 39A, 39B, 39C, 39D and 39E illustrate operations of a ninth embodiment of the present invention.

FIGS. 39A to 39E schematically illustrate the structure and operations of a branch prediction mechanism according to a ninth embodiment of the present invention. As shown in FIG. 39A, a branch instruction code 10a is additionally provided with a field 10f for storing a predicative threshold value in the ninth embodiment. The predicative threshold value is set in the field 10f by a compiler in accordance with a branch probability of a branch instruction. As to the predicative threshold value, a flag always-t is applied to a branch instruction which is determined by the compiler as substantially causing a branch, a flag locally-t is applied to a branch instruction which is determined by the compiler as frequently causing a branch, a flag likely-n is applied to a branch instruction which is determined as frequently changing its branch direction, and a flag always-n is applied to a branch instruction which is determined by the compiler as hardly causing a branch. The level of the branch probability of the branch instruction is illustrated in the aforementioned literature by Lee et al., for example.

The field 10f having the predicative threshold value shown in FIG. 39A is supplied to the branch probability determination part 190 shown in FIG. 37. In this case, it is not necessary to supply the branch probability determination part 190 with an operand indicating the type of the branch instruction. The branch probability determination part 190 generates a signal indicating the predicative threshold value which is stored in the predicative threshold value field 10f, and supplies the same to the threshold value setting circuit 192 shown in FIG. 37. Alternatively, the predicative threshold value data of the field 10f may simply be directly supplied to the threshold value setting circuit 192. The threshold value setting circuit 192 sets a threshold value TH in accordance with the predicative threshold value, and supplies the set threshold value TH to the comparison circuit 194. The initialization circuit 196 decides the initial state of the hysteresis information of the branch instruction in accordance with the predicative threshold value in a branch instruction registering operation, and writes the decided initial state in the branch hysteresis counter. Next prediction is performed in accordance with the corresponding threshold value and hysteresis information. Description is now made on such a case that 2-bit hysteresis information is employed as to the threshold value TH and the initial state of the hysteresis information and the branch instruction assumes four states, for example.

Figure 39B:
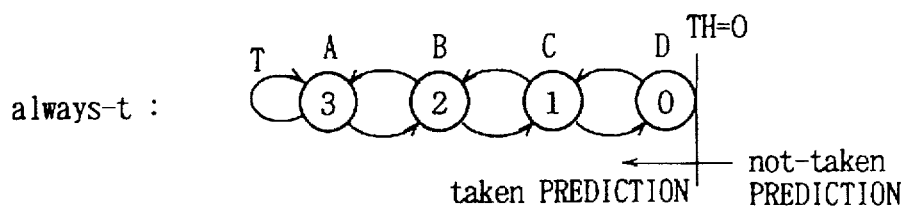

As shown in FIG. 39B, the flag always-t is set in the field 10f for a branch instruction almost always causing a branch. In this case, "0" is selected as the threshold value TH, and the initial state of the hysteresis information is set in a state D (0 state). In this case, next branch prediction is taken prediction so far as the branch instruction is registered in the branch target buffer, unless Not-Taken execution takes place in the state D.

Figure 39C:
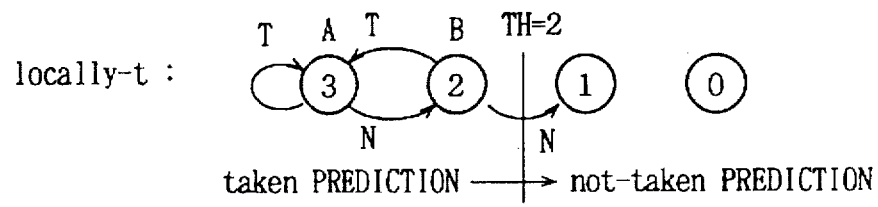

The flag locally-t is applied to a branch instruction which is determined having a relatively high branch probability, as shown in FIG. 39C. In this case, "2" is set as the threshold value TH, and a state B is selected as the initial state of the hysteresis information. In this state, not-taken prediction takes place when a hysteresis information value BHCVa indicates a state C or D. However, the branching probability is relatively high, a probability of remaining in the state A is high, and a probability of taken prediction is high. In this case, therefore, the hysteresis information is merely transitioned to the state B even if Not-Taken execution takes place, and taken prediction is made as next time branch prediction, whereby it is possible to correctly cope with a relatively high branch probability.

Figure 39D:
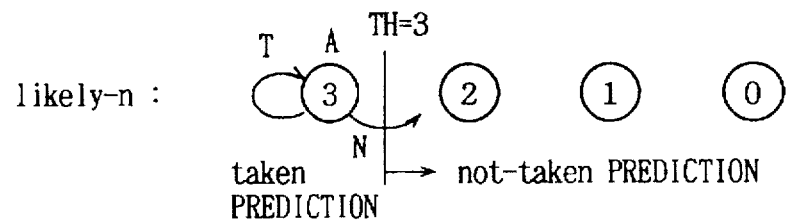

The flag likely-n is applied to a branch instruction whose branch direction is frequently changed, and the state A is set as the initial state as shown in FIG. 39D. Once Not-Taken execution is carried out, this instruction is removed from the registration in the branch target buffer, or not-taken prediction takes place. Thus, it is possible to carry out branch prediction with respect to a branch instruction whose branch direction is frequently changed while correctly following the change of the branch direction.

Figure 39E:
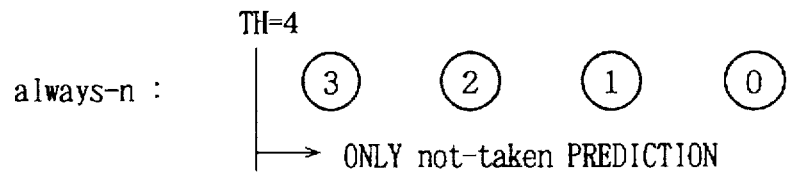
Figure 42:
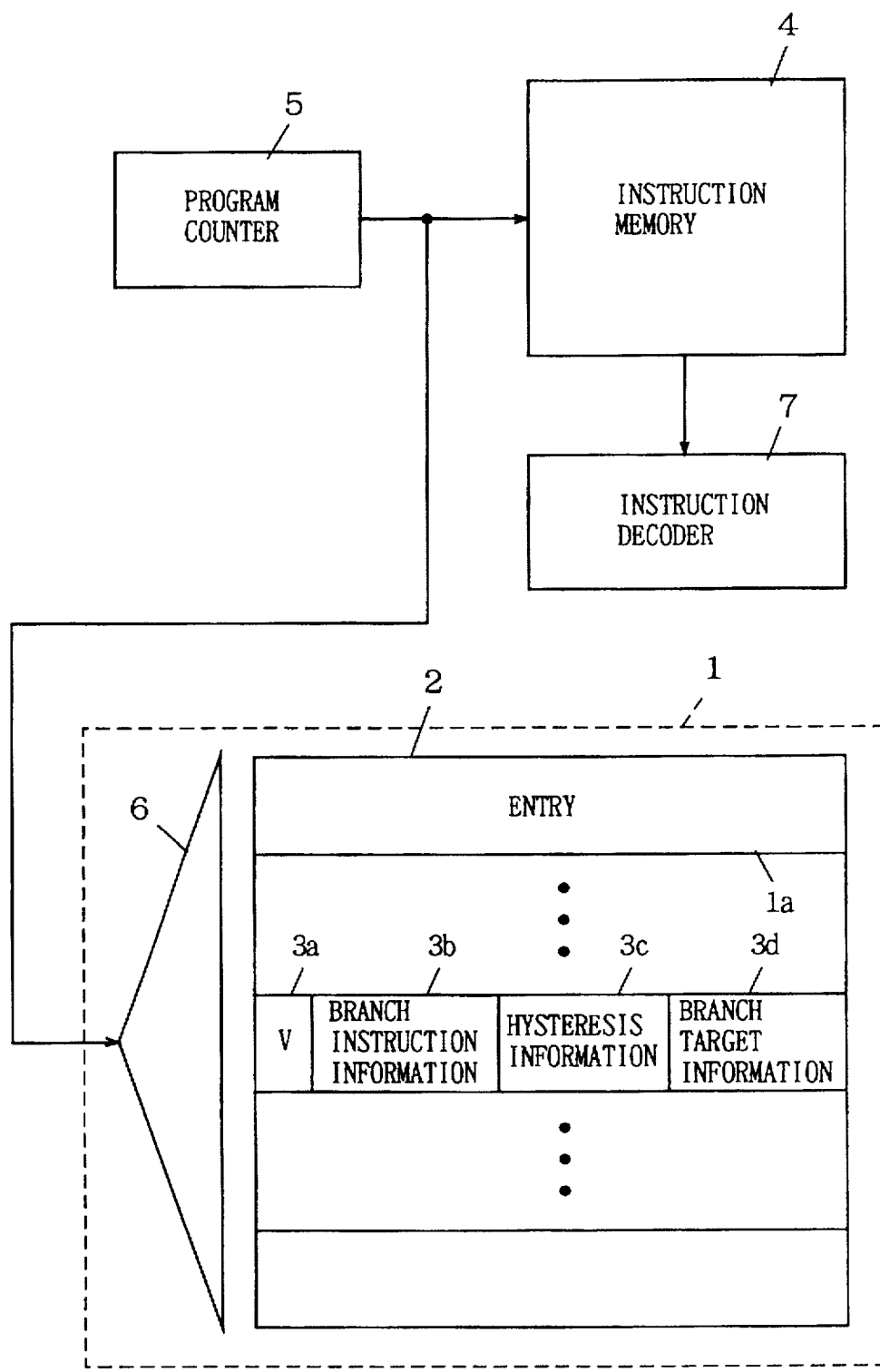
FIG. 42 schematically illustrates the overall structure of a conventional instruction processing apparatus employing a branch target buffer.
Figure 43:
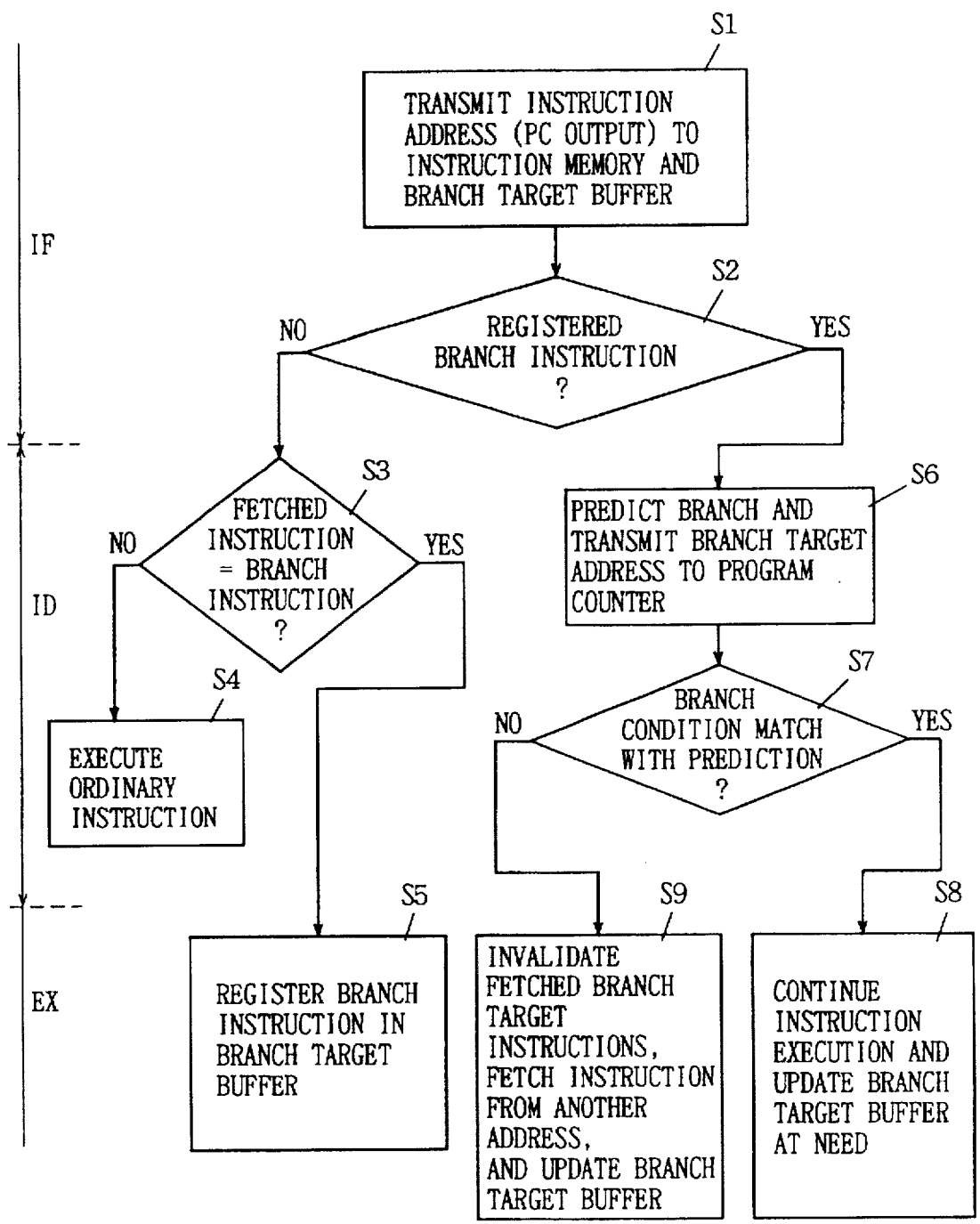
FIG. 43 is a flow chart representing an update/registration operation of the branch target buffer in the conventional instruction processing apparatus.
Figure 44:
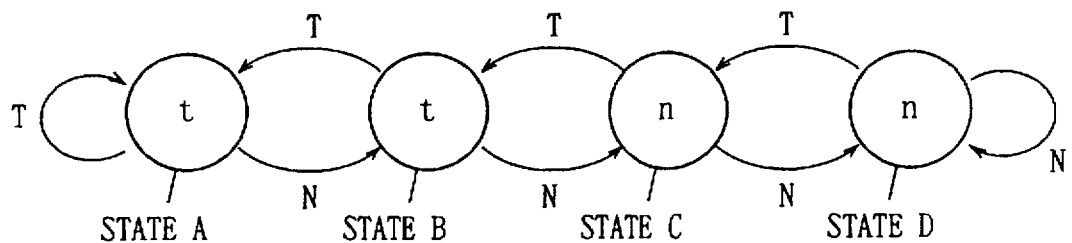
FIG. 44 illustrates state transitions of hysteresis information in the conventional instruction processing apparatus employing a branch target buffer.
Figure 45:
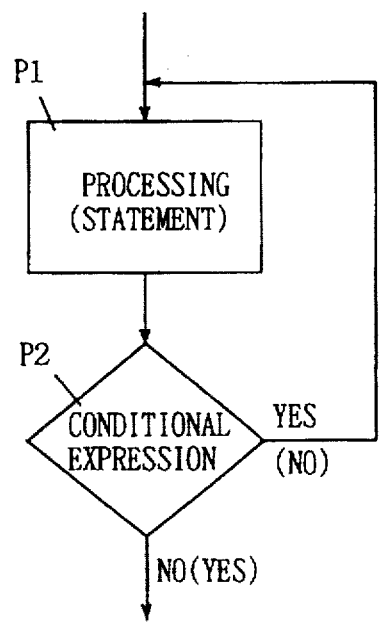
FIG. 45 illustrates a backward branch instruction.

The flag always-n is applied to a branch instruction hardly causing a branch, as shown in FIG. 39E. In this case, "4" is applied as the threshold value TH. The initial state of the hysteresis information is arbitrary. Since the threshold value TH is "4", each next prediction is not-taken prediction. Therefore, next prediction is not-taken prediction even if registration is once carried out, whereby registration in the branch target buffer is immediately deleted (when combined with the seventh embodiment). Even if a branch instruction hardly causing a branching accidentally causes a branching, this branch instruction can be immediately removed from registration in the branch target buffer so that branch prediction can be correctly made also with respect to such a branch instruction hardly causing a branching. The branch instruction of always-n may be structured not to be registered in the branch target buffer.

Each of the flags always-t etc. can be expressed by 2-bit information.

The system of setting hysteresis information by a threshold value is also applicable to a conventional multibit hysteresis system branch target buffer. In this case, branch prediction is made by comparing a predicative threshold value with hysteresis information.

According to the ninth embodiment, as hereinabove described, a threshold value reflecting the branch probability in further detail is set with respect to each branch instruction through the compiler so that next branch prediction is made in accordance with the threshold value, whereby it is possible to suppress reduction of the prediction hit rate resulting from registration/invalidation of the branch instruction caused by accidental change of the branch direction.

According to the present invention, as hereinabove described, the content of the corresponding entry is invalidated in the branch target buffer when a branch prediction mishit is caused and a possibility of a branch caused by the branch instruction is small, whereby only branch instructions having high branch probabilities are stored in the branch target buffer in a high possibility, whereby the branch prediction accuracy is improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An instruction processing apparatus comprising:
   a branch target buffer having a plurality of entries each storing branch instruction specifying information and a validity bit indicating one of validness and invalidness of a related branch instruction;
   prediction means for predicting presence/absence of a branch caused by a branch instruction in accordance with said validity bit included in information read out from a corresponding entry of said branch target buffer when a supplied instruction is said branch instruction;
   branch determination means executing said branch instruction for determining whether or not the prediction said prediction means is correct in accordance with the result of the execution, said branch instruction including an instruction part indicating processing to be executed and a branch probability indicating part indicating a possibility with which a branch is caused by said branch instruction is high; and change means for changing the content of said corresponding entry of said branch target buffer in accordance with data of said branch probability indicating part included in said branch instruction when the result of the determination made by said branch determination means indicates that said prediction by said prediction means is incorrect, said change means including means for setting said validity bit in an invalid state when said validity bit in said corresponding entry indicates validness and said branch probability indicating part indicates that a possibility of branching is small.

2. The instruction processing apparatus in accordance with claim 1, wherein said change means includes means for keeping said data of said corresponding entry unchanged when the result of said determination made by said branch determination means indicates that said prediction is incorrect, said validity bit indicates validness and said branch probability indicating part indicates that the possibility of branching is high.

3. The instruction processing apparatus in accordance with claim 1, further comprising:

identity determination means for determining whether the supplied branch instruction is identical to that stored in said corresponding entry, and means for changing the content of said corresponding entry by said supplied branch instruction when the result of said determination of said identity determination means indicates a mismatch, a branch is caused by said supplied branch instruction, and said branch probability indicating part of said supplied branch instruction indicates that the possibility of branching is high.

4. The instruction processing apparatus in accordance with claim 1, further including an instruction cache memory for simultaneously addressing a plurality of instructions by an individual tag address, said branch target buffer having a plurality of entries simultaneously specified by a single said tag address, the tag addresses of said branch target buffer being identical to those of said instruction cache memory, and means for invalidating the contents of said entries of said branch target buffer corresponding to branch instructions included in an instruction group of said cache memory to be substituted when a cache miss is caused in said instruction cache memory and the contents thereof are substituted by new contents.

5. The instruction processing apparatus in accordance with claim 1, further comprising inhibition means for inhibiting a changing operation by said changing means when said supplied branch instruction causes a branching, the supplied branch instruction is not registered in said branch target buffer, and the supplied branch instruction includes the branch probability indicating part indicating a high possibility of branching.

6. The instruction processing apparatus in accordance with claim 1, wherein said branch probability indicating part includes an immediate value indicating a branch target address.

7. An instruction processing apparatus comprising:

determination means for determining whether a supplied instruction is a branch instruction, said supplied instruction including an immediate value indicating a branch target address of said branch instruction;

sign identifying means for identifying a sign indicating positiveness or negativeness of said immediate value when said determination means indicates that said instruction is a branch instruction;

a branch target buffer having a plurality of entries each including branch instruction specifying information and a validity bit indicating validness/invalidness of a related branch instruction;

branch prediction means for reading the content of said entry corresponding to said branch instruction from said branch target buffer for predicting one of occurrence and non-occurrence of a branch caused by said branch instruction in accordance with said validity bit included in read said information;

branch determination means for executing said branch instruction for generating a signal indicating whether a branch is caused by said branch instruction; and change means for changing a value of the validity bit of said corresponding entry of said branch target buffer in accordance with said signal indicating a sign from said sign identifying means when the result of said determination of said branch determination means mismatches with the result of said prediction of said branch prediction means.

8. The instruction processing apparatus in accordance with claim 7, wherein said change means includes means for maintaining the content of said corresponding entry when said sign identifying means indicates that said immediate value is negative.

9. The instruction processing apparatus in accordance with claim 7, wherein said branch prediction means includes means for predicting that a branch is taken when the read out validity bit indicates validness.

10. An instruction processing apparatus comprising:

a branch target buffer including a plurality of entries each storing branch instruction specifying information and a validity bit indicating validness/invalidness of a related branch instruction;

branch execution means executing a branch instruction when a supplied instruction is said branch instruction for generating a signal indicating whether a branch is caused, said branch instruction including branch probability indicating information indicating a possibility of branching; and means for inhibiting change of data stored in a corresponding entry of said branch target buffer when said signal supplied from said branch execution means indicates an occurrence of branching and said branch probability indicating information of said branch instruction indicates that the possibility of branching is low, and no branch instruction specifying information indicates the supplied branch instruction.

11. The instruction processing apparatus in accordance with claim 10, further comprising means for invalidating the validity bit of a corresponding entry when branch specifying information in the corresponding entry indicates the supplied branch instruction.

12. An instruction processing apparatus comprising:

a branch target buffer including a plurality of entries each at least storing branch instruction specifying information and an expected value of a branch caused by a related branch instruction;

branch execution means executing a branch instruction when a supplied instruction is said branch instruction for generating a signal indicating whether a branch is caused by said branch instruction, said branch instruction including information indicating an expected value of branching;

registration determination means for determining whether said branch instruction is registered in said branch target buffer;

validity registration determination means for determining whether information for another branch instruction is validly stored in a corresponding entry of said branch target buffer when said registration determination means indicates non-registration of said branch instruction in said branch target buffer and said signal outputted from said branch execution means indicates branching;

comparison means for comparing the expected value of said branch instruction with that of said another instruction stored in said branch target buffer when said validity registration determination means makes a determination of valid storage of said another branch instruction; and write means for writing said branch instruction in the entry storing said another branch instruction with the expected value information thereof when said comparison means indicates that said expected value of said branch instruction is in excess of that of said another branch instruction.

13. The instruction processing apparatus in accordance with claim 12, wherein each said entry of said branch target buffer includes hysteresis information indicating a past branch hysteresis of a corresponding branch instruction, and the expected value information in said branch target buffer is provided by said hysteresis information.

14. The instruction processing apparatus in accordance with claim 12, wherein said write means includes means for initializing said hysteresis information in accordance with the expected value of branching information accompanying said branch instruction.

15. The instruction processing apparatus in accordance with claim 13, further comprising:

prediction means for predicting a branching of said branch instruction through comparison of related hysteresis information with a threshold value, the threshold value being determined according to the expected value included in said branch instruction.

16. An instruction processing apparatus comprising:

a branch target buffer including a plurality of entries each at least storing branch instruction specifying information and hysteresis information indicating a hysteresis of a branch caused in a past by a related branch instruction;

determination means for determining whether information related to a supplied branch instruction is stored in said branch target buffer and the supplied branch instruction is registered;

branch execution means executing said supplied branch instruction for generating a signal indicating whether a branch is caused by said supplied branch instruction in accordance with the result of the execution, said supplied branch instruction including information indicating a predicative expected value of a branch caused by said supplied branch instruction; and means deciding hysteresis information related to said supplied branch instruction in accordance with said predicative expected value of said supplied branch instruction when said determination means indicates non-registration of said supplied branch instruction in said branch target buffer and said signal outputted from said branch execution means indicates branching, for storing said decided hysteresis information as an initial state value in said branch target buffer with information specifying said branch instruction.

17. An instruction processing apparatus comprising:

a branch target buffer including a plurality of entries each storing branch instruction specifying information and branch target information;

a branch hysteresis buffer provided independently of said branch target buffer and having locations corresponding to said plurality of entries of said branch target buffer for storing hysteresis information indicating a hysteresis of presence/absence of a branch caused in a past by branch information stored in a corresponding entry in each respective location;

branch prediction means for reading the content of an entry corresponding to a supplied branch instruction from said branch target buffer and predicting one of occurrence and non-occurrence of a branch caused by said supplied branch instruction;

branch execution means executing said supplied branch instruction for generating a signal indicating whether or a branch is caused by said supplied branch instruction in accordance with the result of the execution; and change means for changing the value stored in the corresponding location of said branch hysteresis buffer in accordance with output signals of said branch prediction means and said branch execution means, wherein said branch prediction means includes means for predicting one of occurrence and non-occurrence of a branch by said branch instruction in accordance with whether said branch target buffer stores information corresponding to said supplied branch instruction.

18. The instruction processing apparatus in accordance with claim 17, wherein said change means includes:

means for decrementing the value to be stored in said corresponding location when said branch prediction means predicts branching and said branch execution means indicates non-branching, and means for invalidating the content of said corresponding entry of said branch target buffer when the value of said corresponding location indicates a predetermined minimum value.

19. The instruction processing apparatus in accordance with claim 17, wherein said change means includes means for setting into said corresponding location of said branch hysteresis buffer an initial value when said branch prediction means predicts non-branching and said branch execution means indicates branching.

20. The instruction processing apparatus in accordance with claim 19, further including means for storing said information related to said supplied branch instruction in said corresponding entry of said branch target buffer when said branch prediction means predicts non-branching and said branch execution means indicates branching.

21. An instruction processing apparatus comprising:

branch information storage means including a plurality of storage positions each storing branch instruction specifying information, information indicating a branch probability of a related branch instruction, and hysteresis information indicating a hysteresis of past branch caused by said branch instruction, said branch instruction including information indicating an expected value of a branch caused by said branch instruction;

threshold value setting means for setting a threshold value in accordance with expected value information in a supplied branch instruction;

branch prediction means for predicting one of occurrence and non-occurrence of branching in accordance with said branch probability information included in the content of storage position of said branch information storage means corresponding to said supplied branch instruction;

branch execution means executing said supplied branch instruction for determining whether a branch is caused by said supplied branch instruction; and means for setting the value of corresponding hysteresis information in the branch information storage means in accordance with corresponding hysteresis information in said supplied branch instruction and said threshold value when the prediction by said branch prediction means mismatches with the result of the determination of said branch execution means and writing the set hysteresis information in said corresponding storage position.

22. The instruction processing apparatus in accordance with claim 21, wherein said branch information storage means comprises buffer means including entries each for storing said branch instruction specifying information, branch target information and said branch probability information, and hysteresis buffer means provided independently of said buffer means for storing said hysteresis information of said branch instruction in correspondence to each entry of said buffer means.

23. The instruction processing apparatus in accordance with claim 21, further including means for deciding a predicted value of branching of said supplied branch instruction in accordance with said threshold value set by said threshold value setting means and said corresponding hysteresis information, in response to occurrence-of-branching prediction by said branch prediction means and non-branching indication by said branch execution means, and storing the decided predicted value in said branch information storage means as said branch probability information in association with information specifying said supplied branch instruction.

24. The instruction processing apparatus in accordance with claim 23, wherein the branching predicted value is a validity bit indicating validness or invalidness of the related and stored branch instruction.

25. The instruction processing apparatus in accordance with claim 21, wherein said hysteresis information setting means includes means for initializing said corresponding hysteresis information of said supplied branch instruction in accordance with said threshold value when said branch prediction means indicates non-branching and said branch execution means indicates branching.

26. The instruction processing apparatus in accordance with claim 21, wherein the expected value indicating branching by said supplied branch instruction is an immediate value indicating an address of a branch target instruction included in said supplied branch instruction.

27. The instruction processing apparatus in accordance with claim 21, wherein said information indicating said expected value of branching is set in a form of a specific code in each branch instruction in advance.

* * * * *